US011768934B2

(12) United States Patent
Van Dyke et al.

(10) Patent No.: US 11,768,934 B2
(45) Date of Patent: Sep. 26, 2023

(54) DATA BREACH SYSTEM AND METHOD

(71) Applicant: Breach Clarity, Inc., Pleasanton, CA (US)

(72) Inventors: James Van Dyke, Pleasanton, CA (US); Alphonse Pascual, Benicia, CA (US)

(73) Assignee: Sontiq, Inc., Nottingham, MD (US)

( * ) Notice: Subject to any disclaimer, the term of this patent is extended or adjusted under 35 U.S.C. 154(b) by 165 days.

(21) Appl. No.: 17/080,556

(22) Filed: Oct. 26, 2020

(65) Prior Publication Data
US 2021/0042408 A1 Feb. 11, 2021

Related U.S. Application Data

(63) Continuation-in-part of application No. 16/638,046, filed as application No. PCT/US2018/047237 on Aug. 21, 2018, now Pat. No. 11,593,476.

(60) Provisional application No. 62/926,467, filed on Oct. 26, 2019, provisional application No. 62/548,656, filed on Aug. 22, 2017.

(51) Int. Cl.
| G06F 21/55 | (2013.01) |
| G06F 21/62 | (2013.01) |
| G06F 21/56 | (2013.01) |
| G06F 21/31 | (2013.01) |
| G06Q 40/03 | (2023.01) |

(52) U.S. Cl.
CPC .......... G06F 21/554 (2013.01); G06F 21/552 (2013.01); G06F 21/566 (2013.01); G06F 21/6245 (2013.01); G06F 21/6272 (2013.01); G06F 21/31 (2013.01); G06Q 40/03 (2023.01)

(58) Field of Classification Search
CPC ...... G06F 21/55; G06F 21/552; G06F 21/554; G06F 21/556; G06F 21/62; G06F 21/6218; G06F 21/6245; G06F 21/6272; G06Q 40/025
See application file for complete search history.

(56) References Cited

U.S. PATENT DOCUMENTS

| 9,558,346 | B1 * | 1/2017 | Koi | G06F 21/577 |
| 10,313,342 | B1 * | 6/2019 | Caldwell | H04L 63/102 |
| 11,288,359 | B1 * | 3/2022 | Caldwell | G06F 21/45 |
| 2013/0091574 | A1 | 4/2013 | Howes et al. | |
| 2014/0142988 | A1 | 5/2014 | Grosso et al. | |
| 2015/0073981 | A1 * | 3/2015 | Adjaoute | G06Q 20/4016 705/39 |
| 2015/0254661 | A1 | 9/2015 | Lanc | |
| 2017/0161520 | A1 * | 6/2017 | Lockhart, III | G06F 21/6263 |
| 2017/0161746 | A1 | 6/2017 | Cook et al. | |
| 2017/0195310 | A1 * | 7/2017 | Tyler | H04L 63/083 |
| 2017/0213037 | A1 | 7/2017 | Toledano et al. | |
| 2018/0026996 | A1 * | 1/2018 | Park | H04L 63/1416 726/23 |
| 2018/0124091 | A1 * | 5/2018 | Sweeney | G06F 21/554 |
| 2018/0183827 | A1 | 6/2018 | Zorlular et al. | |
| 2019/0228415 | A1 | 7/2019 | Adjaoute | |

FOREIGN PATENT DOCUMENTS

WO 2019040443 A1 2/2019

OTHER PUBLICATIONS

International search report for international application No. PCT/US2020/057396 dated Jan. 22, 2021.

* cited by examiner

*Primary Examiner* — D'Arcy Winston Straub
(74) *Attorney, Agent, or Firm* — Quinn IP Law

(57) ABSTRACT

A method and system for generating a consumer breach history profile of a consumer over an electronic network includes receiving via the network consumer profile information including at least one consumer information element corresponding to the consumer, generating a consumer breach history profile in a database using the consumer profile information, and associating the consumer breach history profile with the consumer profile information in the database. The database includes breach events, each breach event associated with at least one breached information element. Consumer profile information is matched to a respective breach event by determining a match between the consumer information element and the breached information element associated with the respective breach event. The respective breach event is associated in the database with the consumer breach history profile and a mitigation action. A notification to the consumer of the breach event and mitigation action is generated.

20 Claims, 34 Drawing Sheets

BREACH CLARITY                                          About  FAQ  Resources  Blog  Contact

Been Breached? Demystify Your Risks Now

🔍 equifax
⎵
70

( SEARCH )
⎵
124

5 Results...
70A —— Equifax (reported on 2/8/2017)
70B —— Equifax #1 - Name, D.O.B., SSN, address (AFFECTED THE MOST VICTIMS)
70C —— Equifax #2 - 'Equifax #1' + phone, D.L.
70D —— Equifax #3 - Equifax #1 + Equifax #2 + email, payment card, tax ID
70E —— Ricoh USA, INC / Equifax

BREACH CLARITY — 59, 59D

- Overview
- Breach entity
- Customer search
- Build-a-breach
- Fraud Analysis
- Admin

124

🔍 ( SEARCH )

Recently Viewed — 70

Equifax #1 - Name, D...
Breach Clarity Score
4 out of 10
Top Risks
11 total risks
Action Steps
11 action steps
Bank customers affected
375,000 affected
View

Home Depot (2014)
Breach Clarity Score
3 out of 10
Top Risks
12 total risks
Action Steps
10 action steps
Bank customers affected
110,000 affected
View

T-Mobile (2018)
Breach Clarity Score
2 out of 10
Top Risks
11 total risks
Action Steps
4 action steps
Bank customers affected
67,000 affected
View

77

Clear

Sign Out

*FIG. 23*

BREACH CLARITY — 59, 59F

- Overview
- Breach entity
- Customer search
- Build-a-breach
- Fraud Analysis
- Admin

*Created Breaches*

( SEARCH )

| Computational Breach | View | Cell Phone Breach | View | Banking Breach (2019) | View | Breach 1k2ek3 | View |

Breach (2019) | View

+ Create New

47

Sign Out

*FIG. 26*

BREACH CLARITY

⇅ Overview
⌸ Breach entity
⤹ Customer search
⌸ Build-a-breach
⚙ Fraud Analysis
⚙ Admin Created Breaches

| Computational Breach | View | Cell Phone Breach | View | Banking Breach (2019) | View | Breach 1k2ek3 | View |

Breach (2019) | View

SEARCH

+ Create New

New Breach — 68

Select Compromised Credentials
Select ID records
☑ Date of birth
☑ Name
☐ Email address personal
☐ Income/wage info
☑ Home address current
☐ Phone account #
☑ Debit cardholder name
☐ Debit card expiry date

⇧⇩

Selected

91

Calculate Breach

Sign Out 59, 59F

BREACH CLARITY

- Overview
- Breach entity
- Customer search
- Build-a-breach
- Fraud Analysis
- Admin 59, 59F

Created Breaches

| Computational Breach | View | Cell Phone Breach | View | Banking Breach (2019) | View | Breach 1k2ek3 | View |

| Breach (2019) | View |

+ Create New

SEARCH

New Breach — 47

Select Compromised Credentials — 68

Select ID records
- ☐ Email address personal
- ☐ Income/wage info
- ☐ Phone account #
- ☐ Debit card expiry date
- ☐ Credit card # full
- ☐ Credit card code
- ☐ Challenge/secret Q&A's
- ☐ Email login personal

Selected — 91
- ☐ Date of birth
- ☐ Name
- ☐ Home address current
- ☐ Debit cardholder name Calculate Breach Sign Out

*FIG. 29*

BREACH CLARITY — 59, 59H

- Overview
- Breach entity
- Customer search
- Build-a-breach
- Fraud Analysis
- Admin

Users  Reports  Requests  Disabled Users

103 → Account Type

| Account Status | User Name | Email | Account Type | Actions |
|---|---|---|---|---|
| ☐ Active | Seth Figueroa | Seth.Figueroa@institution.com | Admin | ✏ 🗑 |
| ☐ Active | Mike Schultz | Mike.Schultz@institution.com | User | ✏ 🗑 |
| ☐ Active | Matthew Maxwell | Matthew.Maxwell@institution.com | Admin | ✏ 🗑 |
| ☑ Active | Bobby Franklin | Bobby.Franklin@institution.com | User | ↩ 🗑 |
| ☐ Active | Adele Brewer | Adele.Brewer@institution.com | Super Admin | ✏ ⊕ |
| ☐ Active | Katie Peterson | Katie.Peterson@institution.com | Super Admin | ✏ 🗑 |
| ☐ Active | Bess Baldwin | Bess.Baldwin@institution.com | Admin | ✏ 🗑 |
| ☐ Active | Jerry Ramos | Jerry.Ramos@institution.com | User | ✏ 🗑 |
| ☐ Active | Dominic Munoz | Dominic.Munoz@institution.com | User | ✏ 🗑 |

[Apply]

← 101

Sign Out

*FIG. 32*

| PII Type / Examples of Harms (Fraud or Other Misuse Type): | Social Security no. | Date of birth | Birthplace | Passport # | Credit report | Tax ID | Employer | Email address | Pmt. cardholder name | Pmt. card number | Pmt. card expiry date | Pmt. card CVV code | Pmt. card PIN | Medical acct. number | Medical diagnoses | Medical procedures | Medical prescriptions | Home address | Name (with other PII) | (Additional fields continue...) |
|---|---|---|---|---|---|---|---|---|---|---|---|---|---|---|---|---|---|---|---|---|
| Tax Refund | 10 | 10 | 9 | 4 | 3 | 10 | 9 | 3 | 0 | 0 | 0 | 0 | 0 | 0 | 0 | 0 | 0 | 7 | 7 | ... |
| New Account Creation | 10 | 10 | 9 | 2 | 6 | 0 | 10 | 5 | 3 | 2 | 2 | 0 | 0 | 0 | 0 | 0 | 0 | 8 | 9 | ... |
| Existing Payment Card Account | 3 | 2 | 1 | 0 | 4 | 0 | 1 | 3 | 9 | 9 | 10 | 10 | 10 | 0 | 0 | 0 | 0 | 10 | 9 | ... |
| Existing non-Card Financial Account | 6 | 7 | 8 | 1 | 6 | 0 | 1 | 3 | 0 | 1 | 0 | 1 | 3 | 0 | 0 | 0 | 0 | 8 | 9 | ... |
| Existing non-Financial | 6 | 7 | 7 | 0 | 2 | 1 | 3 | 2 | 0 | 1 | 0 | 1 | 3 | 2 | 3 | 3 | 2 | 7 | 8 | ... |
| Privacy Violations | 6 | 9 | 7 | 3 | 6 | 0 | 2 | 5 | 0 | 0 | 0 | 0 | 0 | 6 | 10 | 8 | 10 | 8 | 7 | ... |
| Legal Action | 9 | 10 | 10 | 1 | 2 | 3 | 0 | 0 | 0 | 0 | 0 | 0 | 0 | 0 | 0 | 0 | 0 | 8 | 9 | ... |
| Employment Verification Fraud | 8 | 8 | 10 | 0 | 2 | 1 | 5 | 2 | 0 | 0 | 0 | 0 | 0 | 0 | 0 | 0 | 0 | 6 | 7 | ... |
| ...etc. | ... | ... | ... | ... | ... | ... | ... | ... | ... | ... | ... | ... | ... | ... | ... | ... | ... | ... | ... | ... |

In this illustrative example, a Social Security number—known to be amongst the most potent of PII fields—is assigned a '10' (for example, the highest possible) yet this applies to just two harms: tax refund and new account fraud. Also illustrating how each type of PII enables unique patterns of harm that are neither widely understood or applied, Social Security numbers rank lower (a '3' on a 0-10 scale, for instance) for the most prevalent form of identity fraud: existing payment card account fraud.

In this illustrative example, the most common form of identity theft or harm—existing payment card account fraud—is shown to be primarily enabled by just a few PII records (mostly those appearing on the identity-holder's actual payment card, plus the home address). Home addresses are vital because they enable one of criminals' preferred ways of misusing payment cards: buying goods online and then citing the home address to take criminal possession of goods elsewhere.

FIG. 36

DATA BREACH SYSTEM AND METHOD

CROSS-REFERENCE TO RELATED APPLICATIONS

This continuation-in-part application claims priority to and the benefit of U.S. Provisional Application No. 62/926,467 filed Oct. 26, 2019, U.S. patent application Ser. No. 16/638,046 filed Feb. 10, 2020, PCT Application No. PCT/US2018/047237 filed Aug. 21, 2018, and U.S. Provisional Application No. 62/548,656 filed Aug. 22, 2017, which are each hereby incorporated by reference in their entirety.

TECHNICAL FIELD

The present disclosure pertains to a system and methods for aggregating, searching and analyzing data breach information from multiple breach events to generate an aggregate breach profile of a consumer and to use the aggregated data breach information for data breach risk analysis and harm mitigation.

BACKGROUND

Data breaches and data compromises are very different from one another with regard to both total relative risk and the specific nature of that risk to a consumer-victim of the breach, and as a result require prioritized and unique action steps be taken by a consumer-victim in response to notification of each breach or compromise of the consumer-victim's data. The accumulated risk and nature of harm to a consumer which has been a victim of multiple breaches may not be evident from analysis of each individual breach or compromise of the consumer-victim's data. As such, systems and tools are needed to analyze, predict, and mitigate risks and harms which can result from multiple breaches or compromises of a consumer-victim's data.

SUMMARY

A system and methods for analyzing, predicting, and mitigating risks and harms which can result from multiple breaches or compromises of a consumer-victim's data is provided herein. In a non-limiting example, the system and methods described herein for aggregating and analyzing the risks and harms from multiple breaches utilize outputs generated by a data breach assessment system and methods as described in International Patent Application Number PCT/US2018/047237, published as WO 2019/040443, having common ownership and inventorship with the present disclosure, the contents of which are incorporated herein by reference. The data breach assessment system is also referred to herein as a data breach system, as a Breach Clarity™ (BC) system, and/or as a BC system. The outputs generated by the data breach assessment system described in WO 2019/040443 include, for example, an overall risk score generated for a specific breach and breach victim, which is also referred to herein as a data breach score and/or as a Breach Clarity™ (BC) score; a prioritized list of particular harms (such as tax refund fraud or existing credit card fraud) that are generated by an algorithm as the most likely, e.g., most probable, harms which can occur as a result of a particular breach event or combination or breach events, based on the unique characteristics of that particular breach or that particular combination of breach events; an element risk score for a harm associated with a breached information element, where the element risk score is generated using one or more algorithms applied to data associated in a data structure, and/or industry research including qualitative, quantitative and non-quantitative research, and stored in a data structure of the BC system; and a prioritized list of particular consumer fraud-mitigation action steps, which can include, for example, actions such as obtaining a credit freeze, setting a fraud alert, initiating credit monitoring, etc. that are ranked to generate an action set prioritized to identify the relatively strongest protective actions against the identified risks and harms for the particular breach. The outputs generated by the BC system are presented, e.g., displayed and/or outputted, to the consumer-victim via a user interface designed in one example, such that the consumer can view a consolidated display showing a BC score, identified risks, mitigation actions, and in one example, can action the mitigation actions and/or additional information via the user interface. This consolidation of outputs presented for the consumer's viewing and use presents an advantage to the consumer, in contrast with ad-hoc, unconsolidated, unprioritized, and/or generalized consumer data breach information which may not clearly identify to the consumer the severity of a breach action and/or the appropriate mitigation actions which should be taken in response.

A method and system for generating a consumer breach history profile of a consumer over an electronic network via a computer server is provided. In one example, the method includes receiving, via a network, consumer profile information corresponding to a consumer, generating, in a database and using the consumer profile information, a consumer breach history profile, and associating, in the database, the consumer breach history profile with the consumer profile information. The method further includes accessing, via a network, an electronic transaction account associated with the consumer, where the electronic transaction account is configured to execute a consumer transaction between the consumer and a party to the consumer transaction. Electronic transaction information associated with the consumer transaction is generated via the electronic transaction account, and retrieving via the network, where in an illustrative example, the electronic transaction information includes a consumer identifier corresponding to the consumer, a party identifier corresponding to the party, and a transaction time corresponding to the time the consumer transaction was executed via the electronic transaction account.

The method further includes associating, in a database, the electronic transaction information with the consumer, where the database includes breach information corresponding to a plurality of data breaches. The electronic transaction information is compared with the breach information of the plurality of data breaches by determining a match between the electronic transaction information and the breach information of a respective data breach. The consumer breach history profile is appended when a match is determined by associating, in the database, the respective data breach with the consumer breach history profile. In one example, appending the consumer breach history profile further includes generating a breach notification to the consumer, and transmitting the breach notification to the consumer via an electronic message and/or by displaying the breach notification to the consumer via a breach system interface. In one example, the transaction time includes the date on which the consumer transaction occurred, for comparison with breach event information in the database.

In one example, the consumer profile information includes account credentials corresponding to the electronic transaction account, and the method includes accessing the electronic transaction account using the account credentials. The account credentials can include one or more of an account identifier such as an account number or account name, an account password, an account authentication code, etc. as required for the breach system to access the electronic transaction account and/or retrieve electronic transaction information from the electronic transaction account. In one example, accessing the electronic transaction account includes receiving, via the network, a plug-in for accessing the electronic transaction account and executing the plug-in to transmit the transaction account information via the network such that the electronic transaction information is retrieved from the account via the account plug-in.

In an illustrative example, the electronic transaction account is an email account, the consumer transaction is an email transaction between an email sender and an email recipient, and the party to the consumer transaction is one of the email sender and the email recipient and comparing the electronic transaction information with the breach information includes determining a match between the breach information of the respective data breach and at least one of the email sender or the email recipient. In one example, the consumer identifier is an email address associated with the consumer.

In an illustrative example, the electronic transaction account is an electronic payment account, the consumer transaction is an electronic payment transaction between a payor and a payee, and the party to the consumer transaction is one of the payor and the payee such that comparing the electronic transaction information with the breach information includes determining a match between the breach information of the respective data breach and at least one of the payor and the payee. In one example, the consumer identifier is a payment account number associated with the consumer, which can be a payment card number.

In one example, a method and system for generating a consumer breach history profile of a consumer over an electronic network includes receiving via the network consumer profile information including at least one consumer information element corresponding to the consumer, generating a consumer breach history profile in a database using the consumer profile information, and associating the consumer breach history profile with the consumer profile information in the database. The database includes a plurality of breach events, each breach event associated with at least one breached information element. The consumer profile information is matched to a respective breach event of the plurality of breach events by determining a match between the consumer information element and the breached information element associated with the respective breach event. The respective breach event is associated in the database with the consumer breach history profile.

The method further includes selecting, via the server, at least one mitigation actions defined by the at least one breached information element and associating, in the database, the at least one mitigation action with the consumer breach history profile. A notification to the consumer is generated and includes the at least one mitigation action. The method can include displaying, via a user device, a breach system interface, and displaying, via the breach system interface, the at least one mitigation action. The at least one mitigation action can be associated in the breach system interface with an interface element, and displayed such that the interface element is actuable via the breach system interface to complete the at least one mitigation action. In one example, the method includes displaying, in the breach system interface, a visual indicator configured to indicate whether the at least one mitigation action is completed or incomplete. In one example, the mitigation action is removed from the breach system interface when the mitigation action is completed.

The method can include indicating a completion status of the mitigating action in the consumer breach history file and generating, via the consumer breach history file, a consumer identity score defined by a combination of the at least one breached information element and the one or more mitigation actions associated with the breach clarity history profile. A notification can be generated reporting the consumer identity score to the consumer via the network. In one example, the consumer identity score can be displayed to the consumer via the breach system interface. The breach system is operable to update the consumer identity score based on a change in the information associated with the consumer breach history profile, where the change can include a change in a breach event or breach information associated with the consumer breach history profile, a change in the completion status of a mitigation action, changes in the breached information elements or harms associated with the consumer breach history profile.

In one example, a method of generating a consumer breach history profile of a consumer over an electronic network via a computer server includes receiving via a network, consumer profile information corresponding to a consumer, generating in a database and using the consumer profile information, a consumer breach history profile, and associating in the database, the consumer breach history profile with the consumer profile information. The method further includes retrieving, via the network, breach event information from a breach information source and comparing the breach event information with the consumer profile information by determining a match between the breach event information and the consumer profile information and appending the consumer breach history profile when a match is determined. Appending the consumer breach history profile includes associating in the database, the respective data breach with the consumer breach history profile. In one example, the breach information source is the consumer, where the consumer may input the breach event information to a breach system interface via a consumer user device in communication with the network.

In one example, the breach information source is a dark web service provider, the method including identifying, via the dark web service provider, dark web content including a breached information element and retrieving, via the network, the dark web content, for example, via the dark web service provider. The method can include excerpting the breached information element from the Dark Web content, which may be saved to the database, and comparing the breached information element with the consumer profile information by determining a match between the breached information and the consumer profile information. The method includes appending the consumer breach history profile when a match is determined by generating, in the database, a breach event including the breached information element and associating, in the database, the breach event with the consumer breach history profile.

The above noted and other features and advantages of the present disclosure are readily apparent from the following detailed descriptions when taken in connection with the accompanying drawings.

BRIEF DESCRIPTION OF THE DRAWINGS

FIG. 8 is a schematic illustration of the exemplary user interface of FIG. 7 displaying the search outputs for an exemplar breach search;

FIG. 20 is a schematic illustration of the BreachFeed display of FIG. 19, showing geographic impact of the breach event activity in the reporting time period and customer credentials breached in the reporting time period;

FIG. 23 is a schematic illustration of an exemplary BC Professional interface displaying a summary of searched breach events;

FIG. 26 is a schematic illustration of an exemplary BC Professional interface for constructing a breach event, also referred to herein as Build-a-Breach, including a listing of breach types for selection in the breach event building process;

FIGS. 28-29 are schematic illustration of the Build-a-Breach interface 59F of FIG. 27, further illustrating selection of information elements in the breach event building process;

FIG. 32 is a schematic illustration of an administrative interface for administrating access given to institution users accessing BC Professional;

FIG. 36 is a schematic illustration of an exemplary data table showing a listing of harms, a listing of breachable information elements, and an exemplary element risk score generated by an algorithm of the BC system of FIG. 1 for each harm-information element combination.

DETAILED DESCRIPTION

Figure 1:
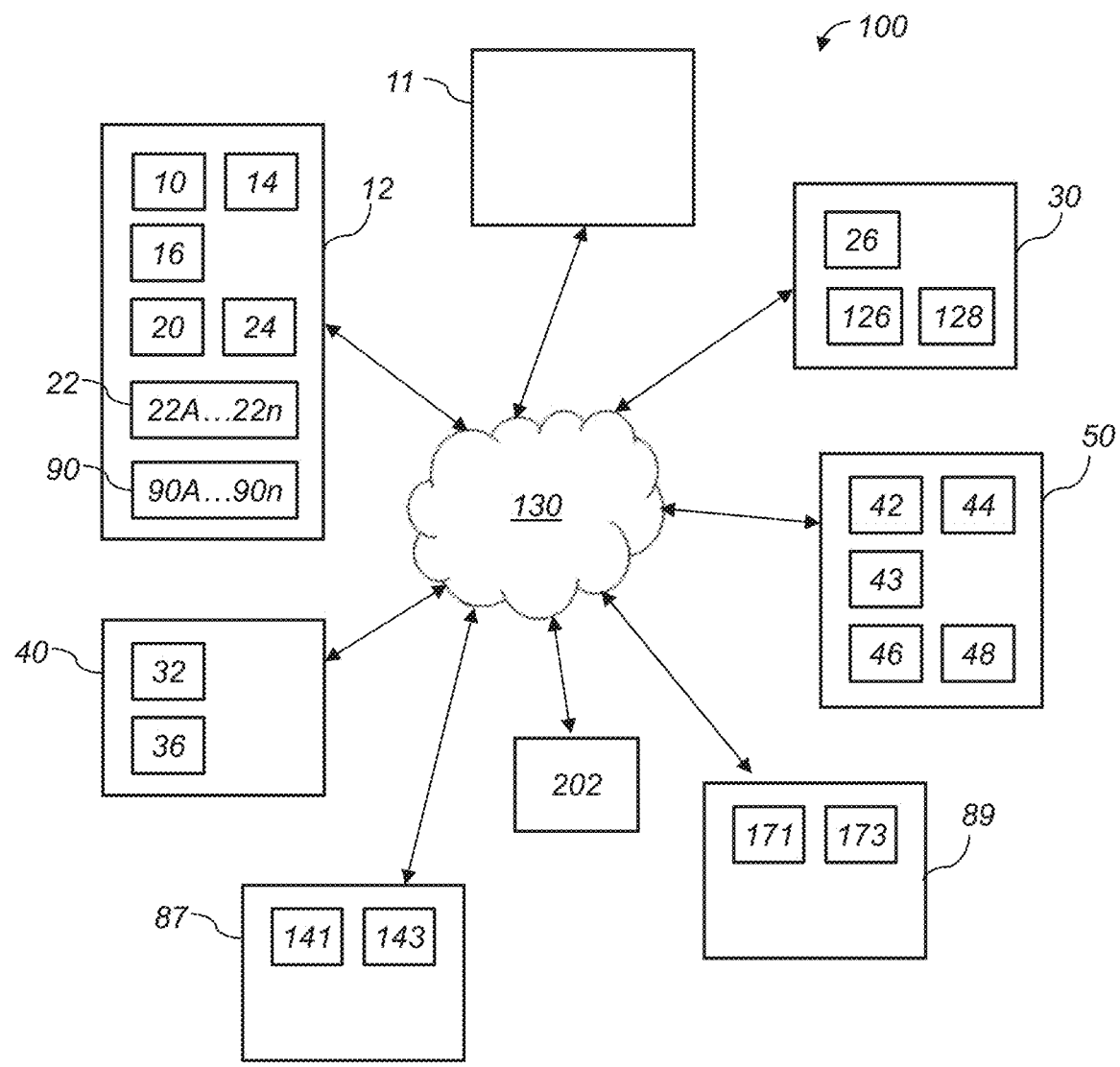
FIG. 1 is a is a schematic illustration of an exemplary data breach system, also referred to herein as a Breach Clarity™ (BC) system.

A system and methods for analyzing, predicting, and mitigating risks and harms which can result from multiple breaches or compromises of a consumer-victim's data is provided herein. In a non-limiting example, the system and methods described herein for aggregating and analyzing the risks and harms from multiple breaches utilize outputs generated by a data breach assessment system and methods as described in International Patent Application Number PCT/US2018/047237, published as WO 2019/040443, having common ownership and inventorship with the present disclosure, the contents of which are incorporated herein by reference. The outputs generated by the data breach assessment system described in WO 2019/040443 include, for example, an overall risk score 80 generated for a specific breach 70 and breach victim, which is also referred to herein as a data breach score 70 and/or as a Breach Clarity™ (BC) score 70; a prioritized list of particular harms 72 (such as tax refund fraud or existing credit card fraud) that are generated by an algorithm as the most likely, e.g., most probable, harms 72 which can occur as a result of a particular breach event 70 or combination or breach events 70, based on the unique characteristics of that particular breach 70 or that particular combination of breach events 70; an element risk score 74 for a harm 72 associated with a breached information element 68, where the element risk score 74 is generated using one or more algorithms applied to data associated in a data structure 22, and/or industry research including qualitative, quantitative and non-quantitative research, and stored in a data structure 22 of the BC system 100; and a prioritized list of particular consumer fraud-mitigation action steps 116, which can include, for example, actions such as obtaining a credit freeze, setting a fraud alert, initiating credit monitoring, etc. that are ranked using an action prioritization factor 136 to generate an action set for the breach event 70 which is prioritized to identify the relatively strongest protective actions 116 against the identified risks and harms 72 for the particular breach event 70. The outputs generated by the BC system 100 are presented, e.g., displayed and/or outputted, to the consumer-victim via a consumer user interface 90 designed in one example, such that the consumer can view a consolidated display showing a BC score 80, identified risks and harms 72, and mitigation actions 116. In an illustrative example, the consumer-victim can action the mitigation actions 116 by actuating an interface element 31 of the consumer user interface 90 and/or retrieve additional information via the consumer user interface 90. This consolidation of outputs presented for the consumer's viewing and use presents an advantage to the consumer, in contrast with ad-hoc, unconsolidated, unprioritized, and/or generalized consumer data breach information which may not clearly identify to the consumer the severity of a breach action and/or the appropriate mitigation actions which should be taken in response.

Referring to the drawings wherein like reference numbers represent like components throughout the several figures, the elements shown in FIGS. 1-37 are not necessarily to scale or proportion. Accordingly, the particular dimensions and applications provided in the drawings presented herein are not to be considered limiting. As used herein, the terms "a," "an," "the," "at least one," and "one or more" are interchangeable and indicate that at least one of an item is present. A plurality of such items may be present unless the context clearly indicates otherwise. All numerical values of parameters, quantities, or conditions in this disclosure, including the appended claims, are to be understood as being modified in all instances by the term "about" or "approximately" whether or not "about" or "approximately" actually appears before the numerical value. "About" and "approximately" indicate that the stated numerical value allows some slight imprecision (e.g., with some approach to exactness in the value; reasonably close to the value; nearly; essentially). If the imprecision provided by "about" or "approximately" is not otherwise understood with this meaning, then "about" and "approximately" as used herein indicate at least variations that may arise from methods of measuring and using such parameters. Further, the terminology "substantially" also refers to a slight imprecision of a condition (e.g., with some approach to exactness of the condition; approximately or reasonably close to the condition; nearly; essentially). In addition, disclosed numerical ranges include disclosure of all values and further divided ranges within the entire disclosed range. Each value within a range and the endpoints of a range are all disclosed as separate embodiments. The terms "comprising," "includes," "including," "has," and "having" are inclusive and therefore specify the presence of stated items, but do not preclude the presence of other items. As used in this disclosure, the term "or" includes any and all combinations of one or more of the listed items.

The term "data breach" as used herein is not to be limiting, and is to be construed broadly to comprise any incident in which data has been exposed in a manner which creates a possibility or potential for harm, hurt, loss and/or injury to the data owner, including, for example, identity theft, financial loss, loss of privacy, extortion, etc. A "data breach" as that term is used herein, may also be referred to, and/or comprise, one or more of a data theft, data compromise, unauthorized data access, unauthorized data exposure, a data hack, a data intrusion, a data penetration, physical lost or stolen personally identifiable information, etc. A "data breach" may also be referred to herein as a "data compromise" and/or as a "breach event." In an illustrative example, the information elements 68 which can be breached and/or compromised can include one or more of personally identifiable information (PII), protected health information (PHI), payment card industry (PCI) data, and other such information which can, if breached and/or compromised, expose the breached victim to risk, injury, and/or harm.

The data breach system 100 described herein uses a plurality of data structures 22, tabulation formats, quantitative and qualitative research, and algorithms 10 that are used in combination to compute risk-related outputs designed to minimize risk for consumers, which can be outputted to a consumer via a consumer user interface (UI) 128 of a consumer user device 30, and/or to an sponsoring entity or institution 50, such as a banking institution or other financial services provider, health services provider, or other resource provider 50 engaged in providing a service or product to consumers, via one or more institution user interfaces (UI) described herein as BC Professional interfaces 59. The cumulative data structures 22, tabulation formats, quantitative and qualitative research, and algorithms 10 that are used in combination to compute risk-related outputs, perform fraud analysis, generate aggregated consumer breach histories 57, analyze, accumulate and report data breach events 70, etc. are referred to herein as a Breach Intelligence Network™. In an illustrative example, the system 100 described herein is referred to as the Breach Clarity™ (BC) system, and includes applications 20 and interfaces 90 directed to consumers and referred to herein as Breach Clarity Freemium, applications 20 and interfaces directed to consumers and referred to herein as Breach Clarity Premium, and applications 20, 45, APIs 24, 43, and user interfaces 59 directed to institutions referred to herein as Breach Clarity Professional.

In a non-limiting example, BC Freemium can be accessed and utilized by a consumer via a user device 30 without registration or identification of the consumer to the BC system 100. In one example, access to BC Premium can be offered by a sponsoring entity, such as a resource provider, to customers of the resource provider, where in an illustrative example, the sponsoring entity interface 25 can be accessed via the BC Premium interface 90, and the BC Premium interface 90 can be accessed by a customer of the sponsoring entity via the sponsoring entity's interface 25. In this example, a breach profile 57, also referred to herein as a My Breach Clarity History profile, can be created for each customer/consumer via a BC Premium interface 90Z, where the customer/consumer's breach profile 57 includes a history of each breach 70 to which the customer/consumer has been subjected, such that the breach history 57 for that consumer can be analyzed for additional risks attributable to the accumulated breaches to which the consumer has been subjected, and such that mitigation actions 116 customized to the cumulative breach history 57 of that customer/consumer can be identified and/or implemented by the sponsoring entity 50, thus reducing risk to the customer/consumer and to the sponsoring entity as related to the customer/consumer's data held by and/or transactions conducted with the sponsoring entity. In a non-limiting example, the features, interfaces and applications of BC Freemium are included in BC Premium, and BC Freemium and BC Premium can also be referred to individually and/or collectively herein as a consumer user interface 90, a consumer interface 90, a customer interface 90, and/or a subscriber interface 90 to the BC system, which can include a plurality of user interfaces 90A, 90B . . . 90n, configured such that the consumer use can interact with the BC system 100 to access the BC system 100, view and/or enter breach information including breach events 70, view the consumer's risk profile 57, identity roadmap 218, and/or consumer identity score 216, and/or activate mitigation actions 116 to reduce the consumer's identity risk, as further described herein.

Figure 25:
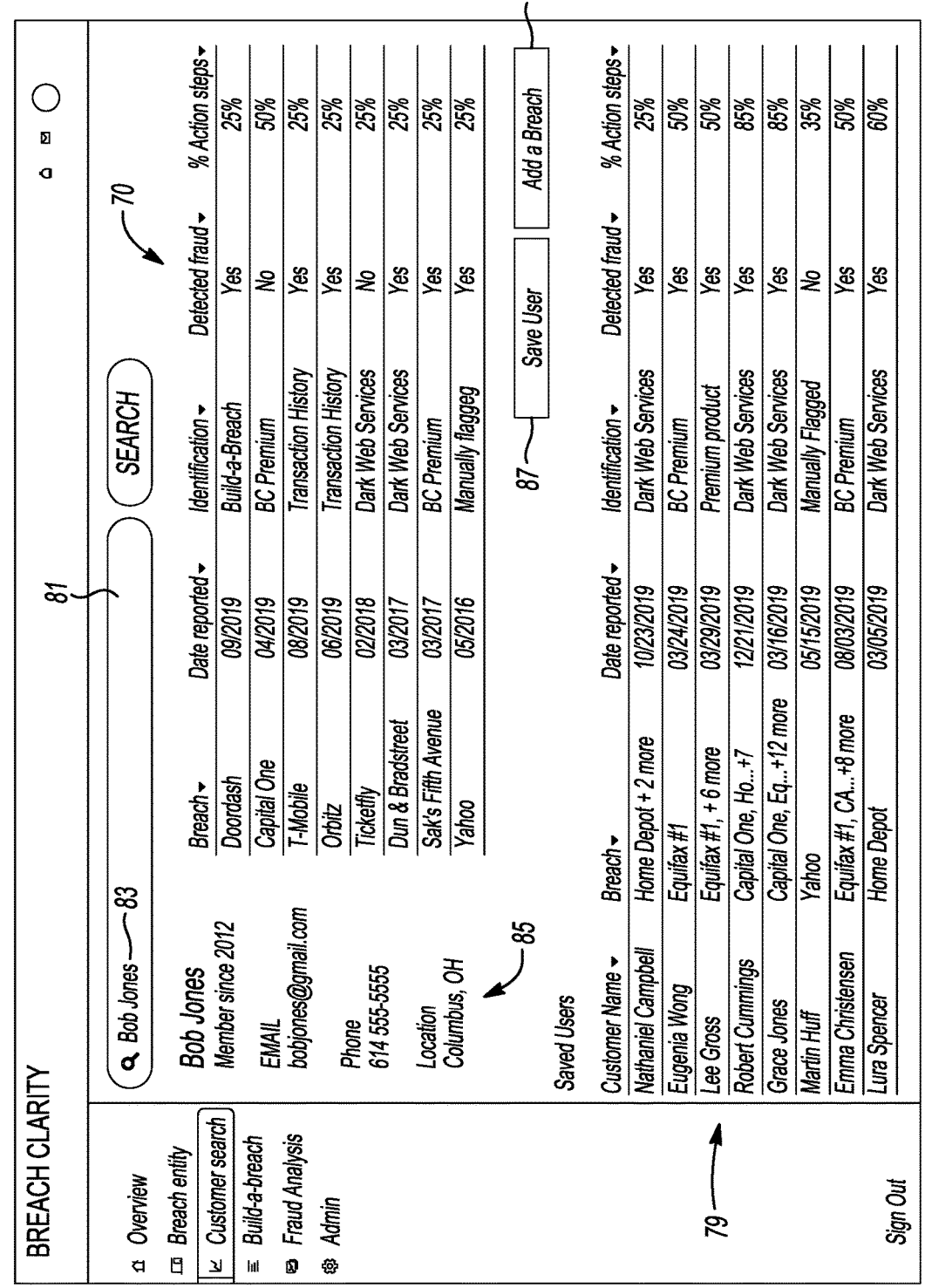
FIG. 25 is a schematic illustration of an exemplary BC Professional interface displaying the output from the customer search shown in FIG. 24, incorporating the My Breach Clarity History of the searched customer and the mitigation and harm status of the customer for each of the listed breach events.
Figure 27:
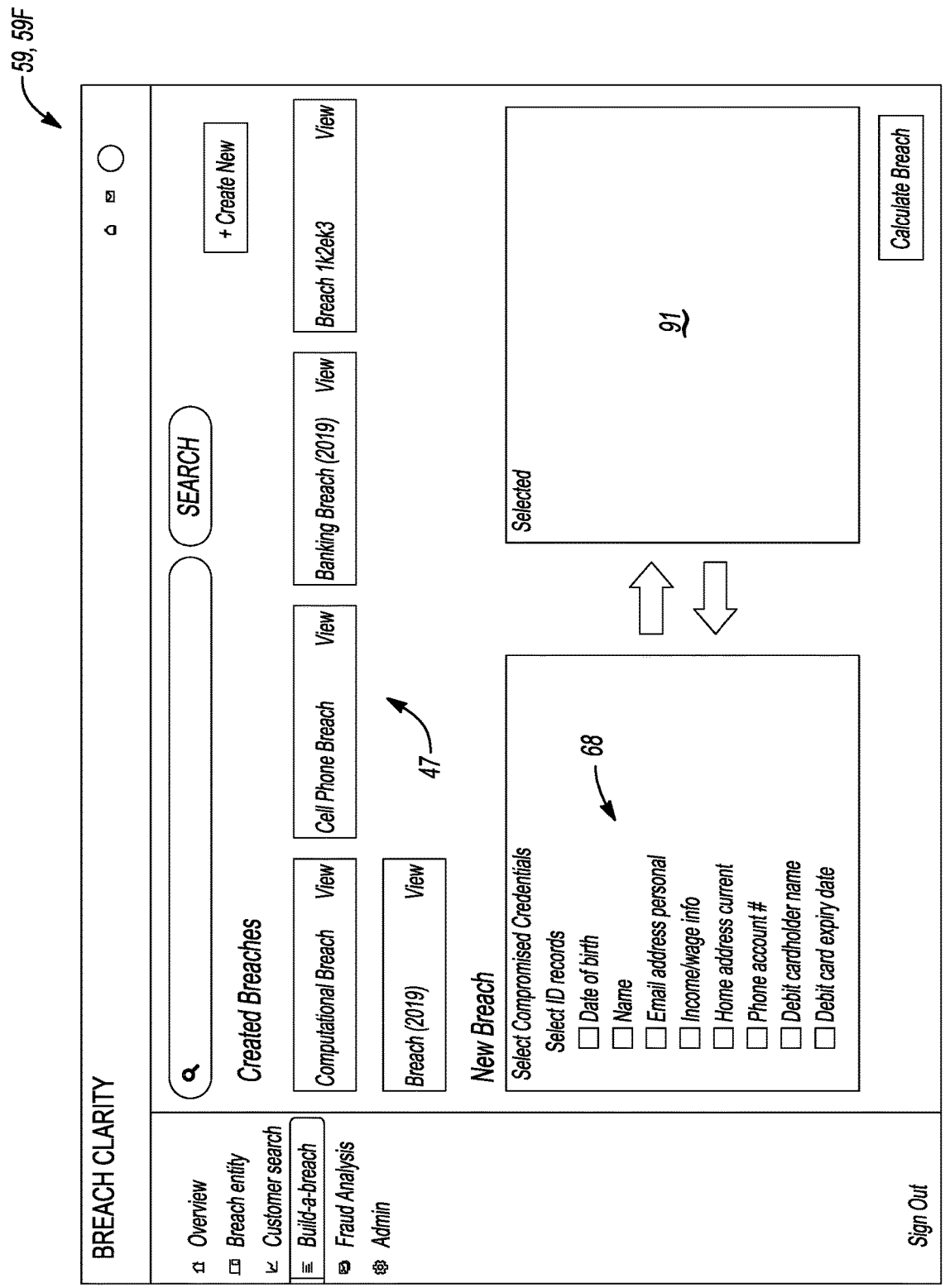
FIG. 27 is a schematic illustration of the Build-a-Breach interface 59F of FIG. 26, further illustrating a listing of information elements for selection in the breach event building process.
Figure 30:
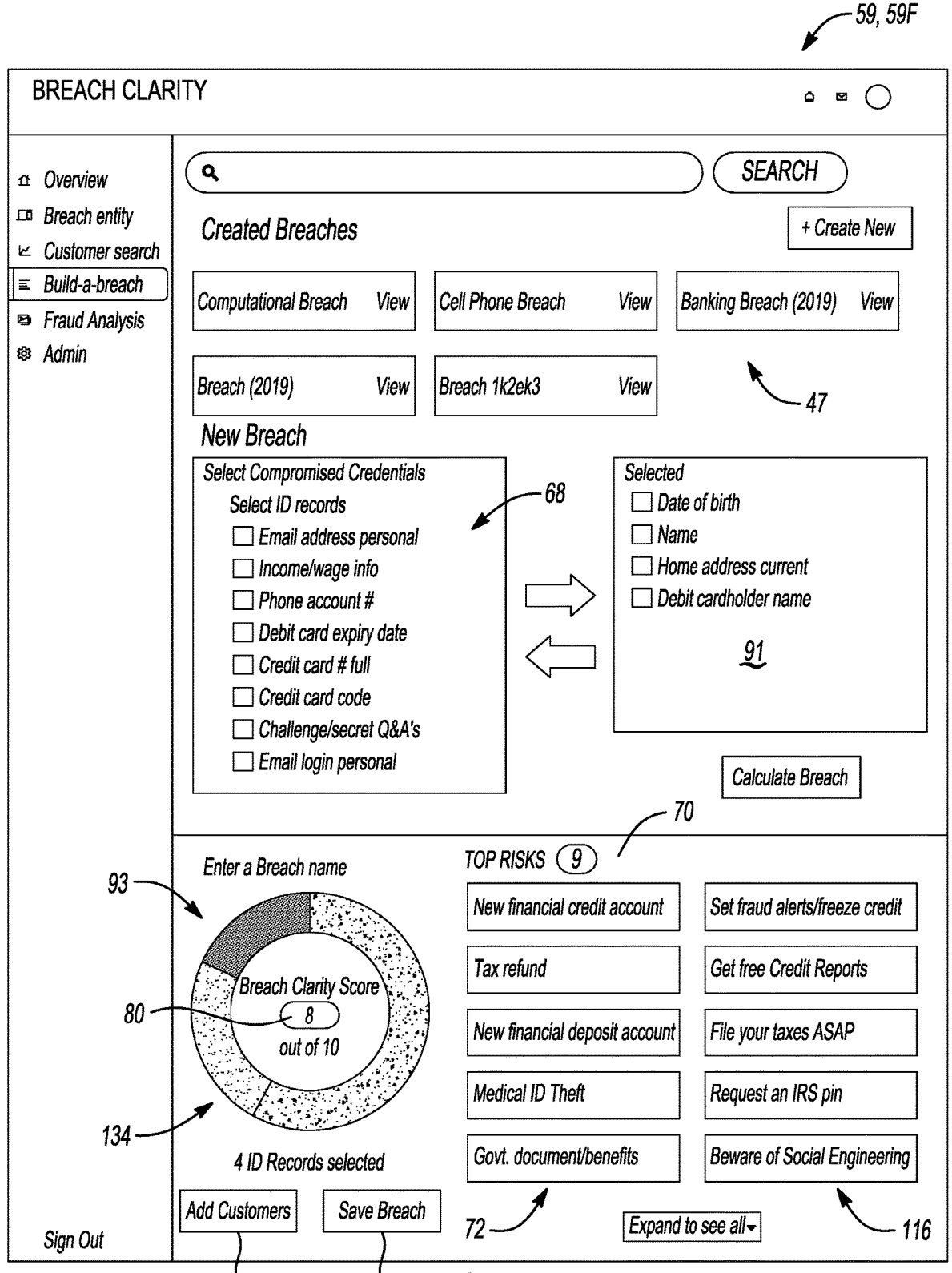
FIG. 30 is a schematic illustration of an exemplary display of a built breach generated by the Build-a-Breach application and including a Breach Clarity score, harms and mitigation actions determined for the built breach event by the BC system.
Figure 33:
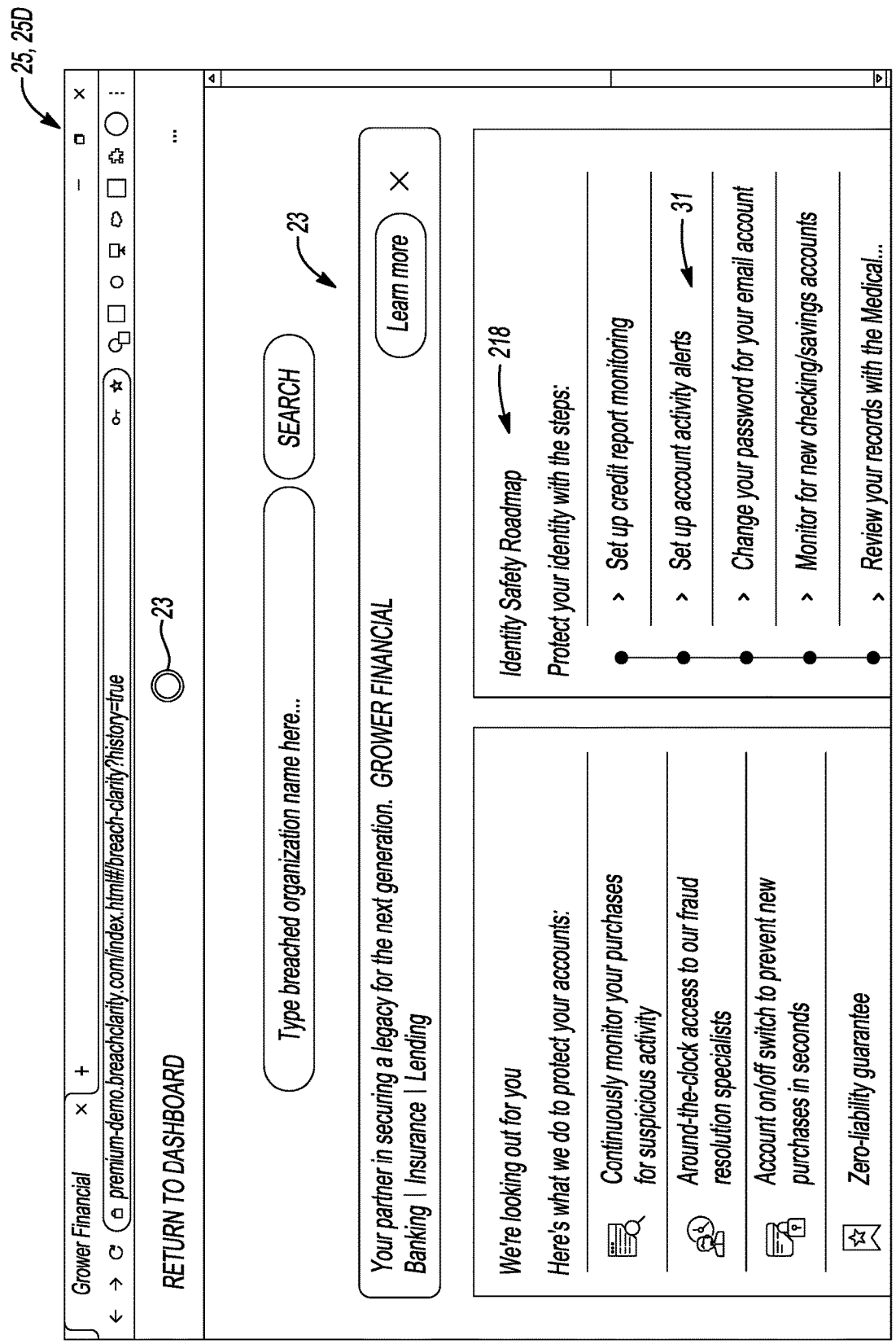
FIG. 33 is a schematic illustration of an exemplary identity roadmap interface generated by BC Professional displaying an identity roadmap generated for an institution customer including mitigation actions specific to the institution customer as defined by the customer's consumer risk profile (My Breach Clarity History profile) and via which the customer can actuate the mitigation actions.
Figure 34:
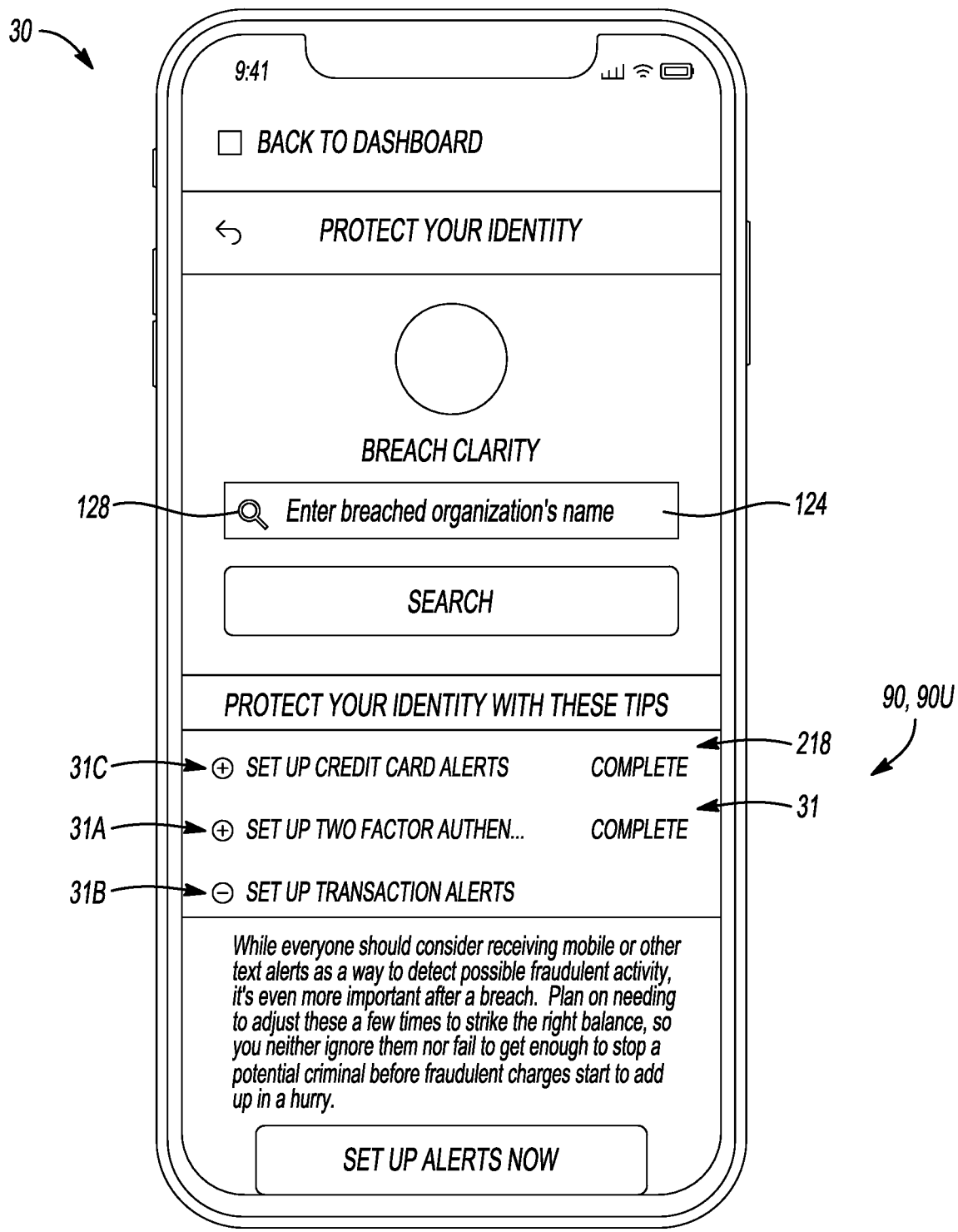
FIG. 34 is a schematic illustration of an exemplary BC Professional interface configured to display via a consumer user device, including displaying an exemplary identity roadmap and a breach event search interface.

In one example, one or more application program interfaces (APIs) 24, 43 are used to interface consumer breach data 22 from the BC system server 12, with customer data 46 from the sponsoring entity server 50, via BC Premium interfacing with BC Professional via a network 130. Using the breach data, customer data, and/or other data inputted by the consumer/customer to the BC system 100, an individualized breach history profile 57 can be generated and maintained in the BC system 100 for the consumer/customer, which can be referred to herein as a consumer breach profile, and/or in an illustrative example can be referred to herein as the consumer's My Breach Clarity History. In one example, the breach history profile 57 for each customer of a sponsoring entity 50 can be provided via the interfaces 90, 59 between BC Premium and BC Professional to the sponsoring entity 50, which can combine the breach history profile 57 for each customer with the sponsoring entity's data for that customer, to generate a risk profile for that customer, where the combination of the consumer's breach history and risk profile can be referred to herein as the consumer's breach profile, and/or in illustrative examples as the consumer's My Breach Clarity History. In one example, the customer breach profile 57 can include information such a listing of each breach event 70 the customer has been victimized by, an identifier of the breached entity such as the entity's name, the information source from which the breach was identified, whether a fraud event was experienced by the customer related to the breach event, to what extent the customer has completed mitigation actions 116 related to each breach event, etc., where mitigation action tracking, in one example, is performed via a consumer identity roadmap 218 as shown in FIGS. 25, 33 and 34.

In one example, the BC system 100 includes an application and/or application interface referred to herein as BreachedID™, which is API enabled via the BC system 100 and an institution's system 50, to analyze account requests received by the institution related to a consumer/customer account. Using the BreachedID application and consumer/customer identifying information, such as the customer's email address, the account related request is analyzed using the BC System 100 and BC Breach Intelligence Network including data structure 22 to determine the risk associated with the account request, for example, to determine whether the account related request is an attempted fraudulent account application by a third party using consumer/customer's identifying information which has been breached. The BreachedID application and/or the institution can, in response to fraudulent account application attempt identified by BreachedID™, identify and/or implement mitigation actions 116 to prevent the fraudulent account application from being approved without sufficient proof that the application is being completed by the legitimate owner of the identity, the value and frequency of transactions from the new account for an initial period after the application is approved, increasing the authentication requirements for future transactions on the customer/consumer's account, etc.

As further described herein and in the accompanying figures, BC Professional is configured for use by an institution, which can also be referred to herein as a resource provider 50, which may be financial organization, commercial entity, health services organization or the like providing services and products to a customer which involve the use of the customer's personal identification information (PII), and/or where the customer can also be a consumer which has been the victim of a breach. In one example, the institution 50 can be a breached entity. In one example, the institution 50 can be an entity which has not been breached, however provides services and products to customers of the institution 50 which have had their (the customer's) personal data breached, such that the breach of the customer's data presents a potential risk to the institution 50, for example, in the form of fraud on the institution, account takeover, etc. BC Professional, as further described herein, can include one or more applications, methods and/or processes which can be used by the institution via the BC Professional interface, also referred to as an institution interface 48 to the BC system 100, in understanding, evaluating and analyzing the impact of multiple data breaches on their customer population, and/or for identifying and/or implementing mitigation actions to reduce risk and/or harm to the customer and/or to the institution due to data breaches which have affected, e.g., victimized, their customer population. BC Professional can include, by way of non-limiting example, a BreachFeed™ application, which is a "news feed" style information compiling and reporting tool that displays to the institution user 50 new breaches reported in real-time, where the breach information associated with the new breaches is aggregated from multiple sources including Breach Clarity Premium, dark web monitoring, common point of purchase (CPP) analysis, etc., where new breach information can be reported separately and/or can be aggregated with known breach information to report and provide breach exposure analysis for a selected period of time, for example, to display information from breaches reported within the last day, week, or month. In one example, breach event information can be analyzed in conjunction with information known by the institution and/or available from the BC system databases, regarding the institution's customer population, to determine and/or estimate the impact of a particular breach or breaches on the institution's customer population, as shown in the figures accompanying this disclosure.

Figure 22:
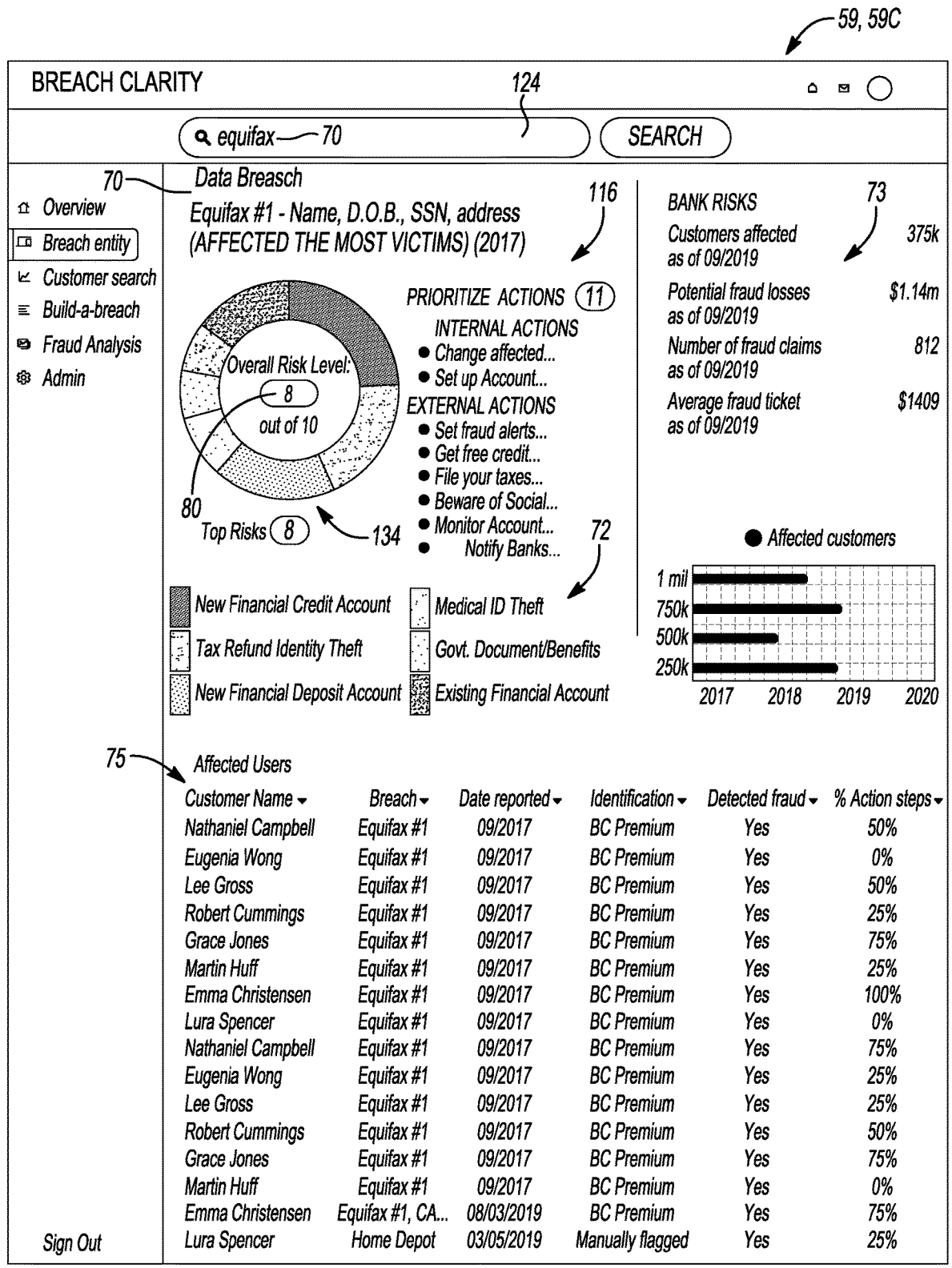
FIG. 22 is a schematic illustration of an exemplary BC Professional interface displaying the output from a breach search conducted through BC Professional, including a listing of institution customers affected by the searched breach event and an institution risk assessment generated for the searched breach event.

In one example shown in FIG. 22, the institution user interface BC Professional 59 includes a search engine executable via an interface 59C to search a particular breach 70 in the BC database 22 for detail information for that particular breach 70 including the Breach Clarity score 80, the information elements 68 breached, the potential harms 72, and the recommended mitigation actions 116 associated with that particular breach 70 in the BC system 100. In one example shown in FIGS. 24-25, BC Professional includes a search engine executable via an interface 59E and APIs 24, 43 operable such that an institution user can search for breach events 70 which have impacted a particular customer of the institution 50, which can include customer information for the particular customer provided by the institution 50 to BC Professional via the BC server 12, for example, through one or more APIs 24, 43, which can be used by BC Professional and/or the BC system 100 to associate the customer information provided by the institution 50 with identifying consumer information stored to the BC database 22 and/or within the BC Breach Intelligence Network, and to provide to the institution 50 one or more reports showing the breach history profile 57, also referred to herein as My Breach Clarity History, for the particular customer. The example is non-limiting, such that the interface between BC Professional and the institution 50 can be used to execute other configurations of customer-related searches and analysis, for example, to generate the customer specific information reported to the institution 50, for example, via a BreachFeed interface and reports. A particular breach 70 in the BC database 22 can be searched for detail information for that particular breach 70 including the Breach Clarity score 80, the information elements 68 breached by the breach event 70, the potential harms 72 associated with the breach of those information elements 68, and the recommended mitigation actions 116 associated with that particular breach 70 in the BC system 100. In one example, BC Professional includes applications 20 and/or algorithms 10 such that the institution 50 via BC Professional can "Build-a-Breach™" to generate a breach event 70 and/or assess the impact of a breach event 70 on the institution's customer population. In an example method 165 shown in FIG. 5 and in an illustrative example shown in FIGS. 26-30, the institution 50 can select inputs to the Build-a-Breach application which include the breach type 47, for example, a corporate data breach, a personal user device (tablet, cell phone) breach, user disclosed information, etc., and the information elements 68 to be inputted as breached information elements. Building the built breach event 70 generated by the Build-a-Breach application can include inputting at 49 impacted customers from the institution's customer base that have been associated by the institution's resource database 46, the BC server 12 and/or Breach Intelligence Network data structure 22 with the built breach event 70, and generating ranked risks 72 and mitigation actions 116 for the built breach. The built breach event 70 can be saved to the institution's BC Professional profile for use with further analysis and/or can be submitted to the BC Breach Intelligence Network and saved to the BC data structure 22 for use by the BC system 100 and/or for use by other institutions 50 accessing the BC system 100 via the BC Professional institution interface. In one example, BC Professional can include other fraud analysis tools which can be used to assess the estimated real and/or projected harm and/or risk to the institution 50 and/or to the institution's customer population associated with one or more breach event 70, for example, to analyze the potential benefits of implementing certain mitigation actions such as modifications to customer authentication requirements, transaction controls, security alerts, etc. A non-limiting example is shown in FIG. 32.

Figure 4:
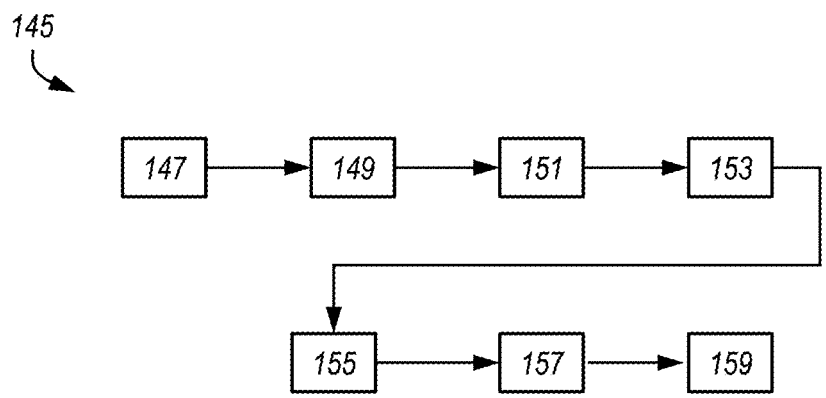
FIG. 4 is a schematic illustration of a flowchart of an exemplary process for analyzing an account request using a fraud risk assessment application of the BC system, also referred to as a BreachedID application.
Figure 24:
FIG. 24 is a schematic illustration of an exemplary BC Professional interface for conducting a search of an institution customer.

As previously described and further illustrated herein by the process shown in FIG. 4 and by FIGS. 24-25, the BC system 100 can include an API based service to determine the identity risks associated with new customer applications and/or account requests made on existing accounts, to mitigate fraudulent account creation and/or account takeover, using an application and/or process referred to herein as BreachedID.

Figure 6:
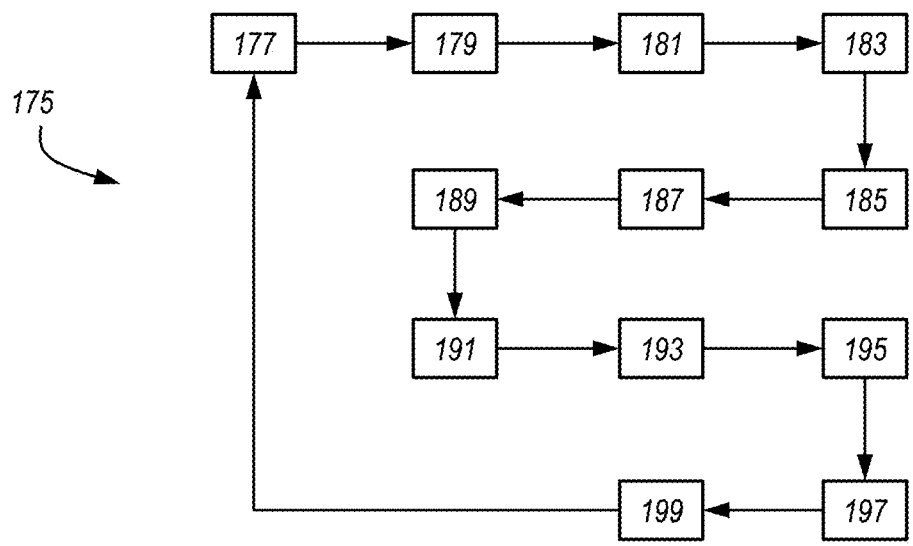
FIG. 6 is a schematic illustration of a flowchart of an exemplary process for integrated risk assessment and mitigation of data breach events using the BC system of FIG. 1.

The BC system 100 described herein includes, in an illustrative example, an apparatus 12, which may be referred to herein as a BC server or computing device 12, the computing device having a processor 14 and a non-transitory memory 16, the non-transitory memory storing instructions executable by the processor 14 such that the apparatus is configured and/or operable to execute methods and processes including methods and processes 105, 125, 145. 165, 175 and 205, and/or applications described herein which can also be referred to as Breach Clarity™ (BC) processes, including, for example, generating a Breach Clarity Score 80 (BC Score) for an identified breach, executing processes as described herein associated with BreachFeed, breach entity and/or institution 50 searches, customer searches, BreachedID, Build-a-Breach, Fraud Analysis processes, My Breach Clarity History and/or consumer risk profiles 57, consumer identity roadmaps 218 including mitigation actions 116, Consumer Identity Scores 216, etc., and processes as described herein associated with BC Freemium, BC Premium, and BC Professional applications and interfaces. In an illustrative example, and as shown in FIG. 6 and described in related International Patent Application Number PCT/US2018/047237 published as WO 2019/040443, the contents of which are incorporated herein by reference, the methods described herein can include populating, via a BC server 12, a data structure 22 with breach information, where the breach information can include information related to one or more breach events 70, which can include identifying information identifying consumers which have been victimized by the breach, information elements 68 breached in the breach event 70, the information source from which the breach event 70 was reported, information indicating whether fraud or other harm has been detected from use of the breached information, etc. The breach information can further include a plurality of information elements 68 breached by the breach event 70 and a plurality of harms or other risks 72 which may be resultant from a breach of information elements 68. In a non-limiting example shown in FIG. 1, the information source from which a breach event 70 can be reported can include a self-reporting entity reporting information related to a breach which has been experienced by the self-reporting entity, which may also be a resource institution 50 as further described herein. The information source providing the breach information can be a regulatory or government organization or other organization configured to receive and report breach event information, such as the U.S. Federal Trade Commission or a private entity such as the Identity Theft Resource Center (ITRC), as examples of reporting entities 40 described further herein. In one example, the information source can be an individual consumer user 30 entering breach information into the BC system 100, for example, via the BC Freemium and/or BC Premium consumer interfaces 90, and/or via interfaces provided by BC Professional and/or BC sponsor institution interfaces 59, 25. In one example, an information source of breach information can be a dark web service provider 11, which may be an entity which is configured to monitor the dark web 202, also referred to as the Darknet to detect breach events, breached information, and/or data markets offering stolen, compromised, breached or unauthorized personal information and/or credentials for sale. The dark web service provider 11 provides the detected information to the BC system 100, where the detected information is normalized into the Breach Intelligence Network and/or BC data structure 22 as further described herein, including being scored with a BC score 80 and associated in the BC data structure 22 with the BC Score and other breach information associated with the information detected by the dark web service provider 11, including, for example, consumer personal information and/or credentials of consumers associated with the breach information retrieved from the dark web 202. In another example, a source of breach information can be payment account data for a consumer user retrieved via the consumer user's payment service provider 89, including bill payment and payment card transaction data and associated payment dates in the consumer user's payment account, and retrieved into the Breach Intelligence Network data structure 22 for risk analysis related to known breach events, as further described herein. In another example, a source of breach information can be email account data for a consumer user retrieved via the consumer user's email service provider 87, including recipient name identifier, sender name identifier, receipt and/or sent date of each email message in the consumer user's email account, and retrieved into the Breach Intelligence Network data structure 22 for risk analysis related to known breach events 70, as further described herein.

Referring to FIG. 1, a system, which can be described herein as a data breach scoring, search, and analysis system is generally indicated at 100. In an illustrative example, the system 100 is also referred to herein as a Breach Clarity™ (BC) system, and/or as a BC system 100. The BC system 100 includes a BC server 12, which includes one or more data structures generally indicated at 22, one or more applications 20, one or more application program interfaces (APIs) 24 and/or one or more algorithms 10 configured to execute the applications 20 described herein. In a non-limiting example, the applications 20 executable by the BC system 100 can include one or more of BC Freemium, BC Premium, BC Professional, BreachFeed, BreachedID, Build-a-Breach, My Breach Clarity History, as further described herein, applications for generating a consumer risk profile 57 also referred to as a My Breach Clarity History profile, a Consumer Identity Roadmap 218 and/or a Consumer Identity Score 216, and search applications for searching one or more of a breach event 70 or combination of breach events 70, a consumer breach profile 57, a consumer population to determine breach impact of one or more breach events on the consumer population. In a non-limiting example, the applications 20 executable by the BC system 100 include breach scoring and risk assessment applications for computing risk-related outputs designed to minimize risk for consumers which have been the victim of a breach event 70. The cumulative data structures 22, tabulation formats, quantitative and qualitative research, and algorithms 10 that are used in combination to compute risk-related outputs, perform fraud analysis, generate aggregated consumer breach histories, analyze, accumulate and report data breach events, etc. are referred to herein as a Breach Intelligence Network, which is integrated into the BC system 100.

As used herein, the risk 72 to a consumer as a result of a data breach can also be referred to herein as a harm 72 or as an injury 72, such that the terms risk, harm, and injury are to be broadly construed to include all types of damage to the consumer which can result from a data breach, including but not limited to the harms 72 described herein and shown in the figures. Each of the risk-related outputs can be generated by the BC system 100 for each breach event 70, and/or as a summary output for a plurality of breach events 70 experienced by a consumer-victim. A breach event 70 can also be identified herein by a breach descriptor, e.g., by a name or description by which the breach event 70 is identified. The risk-related outputs can include, in an illustrative example and described in further detail herein, one or more breach descriptors 70, a set of breachable information elements 68, one or more of a set of harm descriptors 72, and an overall data breach score 80 also referred to herein as a Breach Clarity™ (BC) score 80 generated for the particular breach event 70.

As shown in FIG. 1, the BC server 12 includes a memory 16 and a central processing unit (CPU) 14. The memory 16 of the BC server 12 can include, by way of example, Read Only Memory (ROM), Random Access Memory (RAM), electrically-erasable programmable read only memory (EEPROM), etc., i.e., non-transient/tangible machine memory of a size and speed sufficient for storing the data structure 22, the algorithms 10, the APIs 24, tabulation formats included in the data structure 22, quantitative, qualitative and other industry and/or breach related research, breach event data, mitigation action information, one or more BC applications 20, etc. The memory 16 is of a size and speed sufficient for manipulating the data structure 22, for executing algorithms 10, APIs 24, and/or BC applications 20 to generate the risk-related outputs, to simulate breach events, to interface with institution APIs 43, to generate one or more consumer user interfaces (UI) 90 including for example, consumer user interfaces 90T, 90U, 90W, 90X and 90Z shown in the figures, to generate one or more professional user interfaces (UI) 59 including for example, professional user interfaces 59A, 59B, 59C, 59D, 59E, 59F, 59G, 59H shown in the figures. The BC server includes a BC interface 18, which in an illustrative example can be configured as a modem, browser, or similar means suitable for accessing a network 130. In one example, the network 130 is the Internet. The BC server 12, in a non-limiting example, is administered and/or operated by a BC service provider. In one example, a consumer-victim can access the risk-outputs and other services of the BC system 100 via a user device 30 and/or by personal contact with the BC service provider.

A consumer, also referred to herein as a consumer-victim, a consumer customer, a subscriber, and/or a customer, can access the BC system 100, for example, via a user device 30 and breach system interfaces such as BC Freemium, BC Premium and/or customer interfaces of BC Professional, to view breach information including risk outputs generated by the BC system 100 for one or more breach events 70. In one example, the consumer accessing the BC system 100 can be a consumer-victim of a breach event 70 accessing the BC system 100 to view information outputted by the BC system 100 related to that breach event 70. In another example, the consumer is not required to be a victim of a breach 70, e.g., any consumer can access the BC system 100 to view breach information, including the risk outputs 72 generated by the BC system 100 for one or more breach events 70. In one example, the BC system 100 can be configured such that a consumer is not required to input identifying information, and/or to identify themselves as a victim of a breach event 70 as a prerequisite to accessing the BC system 100. In another example, the BC system 100 is configured to provide an option to a consumer to subscribe to the BC system 100, such that subscription information for the subscriber-consumer can be stored in the memory 16 of the BC server 12 in the data structure 22, for example, in a consumer profile created in the data structure 22 for the subscriber-consumer. The term "subscription" is intended to have a broad meaning including, for example, one or more actions such as creating an account, creating a log-in name and password, enrolling and/or registering as a user of the BC system 100 and/or to receive notifications from the BC system 100, creating a consumer profile, etc. The term "subscription" can include, but is not limited to, a subscription whereby the subscriber is assessed a fee for accessing the BC system 100. In one example a consumer can subscribe without payment of a subscription fee. In another example, the BC system 100 and/or a subscription to the BC system 100 can be offered to consumer by a sponsoring entity 23, where the sponsoring entity 23 may be a resource provider 50 which may be a financial organization, commercial entity, or health services organization offering and/or providing products and/or services to the sponsored consumer.

In one example, the sponsored consumer can be a customer of the sponsoring entity 23 such that the sponsored consumer may be referred to herein as a customer, a consumer/customer, a subscribed customer, or the like. In one example, the sponsoring and/or other entity can host a portal 29 to the BC system 100 on the sponsor/other entity's website, through which a consumer can access the BC system 100. The sponsoring entity can also be referred to herein as a sponsoring institution 23 and/or as a resource institution 50. In an illustrative example, the sponsoring institution 23 is a resource provider 50 operating as a financial services provider such as a bank, offering to its customers a sponsored subscription to BC Premium which can be accessed through an institution interface 25 of the institution 23. In an illustrative example, the institution 23 utilizes the Breach Clarity application 20 referred to herein as BC Professional, such that the institution 23 communicates with the BC server 12 through one or more BC APIs 24 and institution APIs 43. In one example, the customer identifying information for one or more customers of the institution's customer population is associated via the APIs 24, 43 with breach information in the Breach Intelligence Network and/or data structure 22 of the BC server 12, such that customer specific breach history profiles 57 and/or customer specific risk evaluation and mitigation outputs such as Consumer Identity Roadmaps 218 can be generated by the BC system 100 and provided to the institution 23 and the institution's consumer customer via the BC Professional application 20.

In a non-limiting example, the subscriber-consumer's subscription information and/or the subscriber-consumer's consumer profile 57 is associated in the data structure 22 at least with each breach event 70 in which the subscriber-consumer has been a known victim, and with each of the subscriber-consumer's information elements 68 which has been breached or compromised. The consumer profile 57 can also be referred to herein as a consumer risk profile and/or as a subscriber risk profile, as a consumer breach profile, and in a non-limiting example, an individual consumer profile can be referred to herein as My Breach Clarity History. During the subscription process, the subscriber-consumer may input to the BC system 100 information elements 68 of the subscriber-consumer which have compromised and/or breached which are not associated with a publicly reported breach, for example, theft of credit card information from a stolen purse or wallet, loss of payment information by skimming, improper disposal of personal information records, etc. In a non-limiting example, the subscription information for a subscriber-consumer can include identifying information for identifying the subscriber-consumer including for example, the subscriber-consumer's name, address, e-mail address, phone, other social media contact information (Twitter®, Instagram®, etc.), a listing of the breach events 70 in which the subscriber-consumer has been victimized including the number, type, frequency and timing of each of these breach events 70, a listing of the subscriber-consumer's information elements 68 which have been breached or compromised by the breach events 70 in which the subscriber-consumer has been victimized, actual harm or injury incurred by the subscriber-consumer due to a data breach or compromise, behavioral and/or demographic-based information for the subscriber-consumer which, in one example, can be used by the BC system 100 and/or the algorithms 10 to generate, rank, weight, and/or otherwise prioritize mitigation actions 116 which can outputted to the subscriber-consumer. In this latter example, behavioral information can include, by way of non-limiting example, the subscriber-consumer's information security behaviors including for example, password behaviors including reuse of passwords, frequency of changing passwords, password security messages used by the subscriber-consumer, the subscriber-consumer's use of anti-virus, security, anti-malware products, the subscriber-consumer's use of identity theft tools such as credit score monitoring, the subscriber-consumer's frequency and breadth of on-line communication methods (private and public networks including Wi-Fi, e-mail, chat rooms, blogs, social media, instant messaging, etc.), the subscriber-consumer's frequency and breadth of on-line use and/or communication of PII personally identifiable information (PII), protected health information (PHI), payment card industry (PCI) data, including on-line accessing and manipulation of this information, the subscriber-consumer's data access mechanisms including the type, model, etc. of devices (mobile phones, personal computers, personal digital assistants, tablets, lap tops, modems, routers, smart appliances, smart home devices and systems, smart vehicles, etc.) used by the subscriber-consumer, etc. In this latter example, demographic information can include, by way of non-limiting example, the subscriber-consumer's geographic location, income demographic, age, gender, marital status, occupation, etc. One or more algorithms of the BC system 100 can be configured to incorporate the subscriber-consumer's subscription information in generating one or more of the risk outputs, for example, in generating an exposure rating 132, a listing of recommended mitigation actions 116, a rank ordering of harms 72, etc., where the subscription information can be used by the algorithm as a modifier and/or additional factor in the calculation and/or generation of the risk outputs by the BC server 12. The example of using subscriber information in the calculation and/or generation of the risk outputs is illustrative and non-limiting. For example, one or more algorithms of the BC system 100 can be configured to associate, in the data structure 22, a non-subscribing consumer's identifying information, with one or more of the breach events 70, breached information elements 68, etc., in generating one or more of the risk outputs, for example, in generating an exposure rating 132, a listing of recommended mitigation actions 116, a rank ordering of harms 72, etc., where the consumer information can be used by the algorithm as a modifier and/or additional factor in the calculation and/or generation of the risk outputs by the BC server 12.

In one example, the consumer breach profile, e.g., the consumer's My Breach Clarity History profile, can be matched to identifying customer information provided by an institution 23 to the BC system 100 via the BC Professional application, such that a customer risk profile can be compiled by the BC system 100 and/or by the institution 23 for the institution's customer/consumer. In one example, customer risk profile can be combined with customer risk profiles of other customers of the institution 23, and the BC Professional application can be used to analyze, evaluate, and generate a breach risk assessment for the institution based on the number and type of breaches impacting the customer population of the institution 23.

Referring again to FIG. 1, the user device 30 includes a memory 26, a central processing unit (CPU) 28, a communications interface 126, and an input/output interface 128. The user device 30 may be a user device such as a mobile phone, a personal digital assistant (PDAs), a handheld or portable device (iPhone, Blackberry, etc.), a notebook, tablet, personal computer, note pad or other user device configured for mobile communications, including communication with network 130. The user device 30 is configured to communicate with the network 130 through the communications interface 126, which may be a modem, mobile browser, wireless internet browser or similar means suitable for accessing network 130. The memory 26 of the user device 30 can include, by way of example, Read Only Memory (ROM), Random Access Memory (RAM), electrically-erasable programmable read only memory (EEPROM), etc., i.e., non-transient/tangible machine memory of a size and speed sufficient for executing a BC application 20 which may be activated on user device 30 including, for example, one or more consumer user interfaces 90, and/or for executing mitigation actions 116, as described in further detail herein. The input/output interface 128 of the user device 30 can include, for example, one or more of a keypad and display, a touch screen, or a combination thereof configurable to output and/or display, for example, one or more consumer user interfaces 90 associated with one or more BC applications 20 and/or one or more institution applications 45, and/or to display content received by the user device 30 from the BC server 12, a reporting server 40, and/or a resource server 50, including for example, webpages, images, information selected for output via the input/output interface 128, a consumer user interface 90 and/or an institution user interface 25 of the user device 30. Illustrative examples of consumer user interfaces 90 which can be generated by and outputted from the BC system 100 are included in the figures, and shown as consumer user interfaces 90T, 90U, 90W, 90X, and 90Z. These examples are non-limiting, and it would be understood that other configurations and/or arrangements of the risk outputs generated by the BC system 100 could be displayed via one or more consumer user interfaces 90 other than those shown in the figures for illustration.

The system 100 can include one or more reporting servers 40 configured and/or operable to report information related to a data breach, which can include, for example, a breach descriptor 70 of the breached entity, such as a company name (for example, "Equifax" or "Anthem"), breach event information including date(s) breached, information elements 68 breached and/or compromised by the breach (personally identifiable information (PII), protected health information (PHI), payment card industry (PCI) data, etc.), information relating to the breaching entity (hacker, criminal, etc.), post-breach exposure and/or use of the breached data (availability for sale in online criminal marketplaces), etc. Each of the reporting servers 40 is administered and/or operated by a reporting entity which is reporting a breach event. The reporting entity administering a reporting server 40 can be, by way of example, a breached entity reporting information related to a breach of its own data, a regulatory or government organization configured to receive information from breached entities and/or to report the information to consumer-victims, a financial institution, a government organization, a health organization, a retail entity, etc. reporting breaches of its respective data, etc. In one example, the reporting entity is an organization such as the Identity Theft Resource Center (ITRC) which maintains a database 36 of breach information. The BC system 100 collects breach event information, for example, via communication between the BC server 12 and one or more of the reporting servers 40, for use in generating the BC risk-related outputs described herein. In an illustrative example, the reporting server 40 includes a memory 32 and a central processing unit (CPU) 34. The memory 32 of the reporting server 40 can include, by way of example, Read Only Memory (ROM), Random Access Memory (RAM), electrically-erasable programmable read only memory (EEPROM), etc., i.e., non-transient/tangible machine memory of a size and speed sufficient for storing breach event information collected by the reporting entity related to a breach event 70 in a reporting database 36. The memory 32 is of a size and speed sufficient for the manipulation and reporting out of the breach event information by the reporting entity administrating the reporting server 40. In an illustrative example, the BC server 12 receives breach information regarding a breach event 70 at the time the breach is initially reported, and can continue to receive information periodically thereafter regarding the breach event 70, such that the breach information related to the breach event 70 can be periodically updated in the data structure 22 as additional breach information is learned and/or becomes available. The BC server 12 can continue to monitor and/or receive breach information periodically after occurrence of each particular breach event 70, related to the observed availability of the breached data (for that particular breach event 70) in unauthorized sites, e.g., in unauthorized circulation. In one example, the BC server 12 receives breach information as to the observed availability of the breached data on "dark" web sites, on the darknet, also referred to herein as the dark web 202, or other through other sources including non-network locations, including, for example, the availability of the breached data for sale or other distribution for unauthorized uses. The BC server 12 and/or algorithms 10, in response to the breach information as to the observed availability of the breached data, can, for example, modify the exposure rating 132, re-rank mitigation actions 116, and/or modify the likelihood of harm, e.g., the risk distribution 134 of the risks associated with that particular breach event 70.

The reporting server 40 includes a reporting interface 38, which in an illustrative example can be configured as a modem, browser, or similar means suitable for accessing a network 130. In one example, the BC server 12 collects breach event information from the one or more reporting servers 40 via the network 130 and stores the collected breach event information within the BC memory 16 and/or data structure 22 for use in generating the BC risk-related outputs using BC algorithms 10 and/or applications 20. The BC Breach Intelligence Network including the BC data structure 22 can include one or more data-mapping tables, functions, and/or BC applications 20 for mediating the importation of data from a reporting server 40 and/or reporting database 36, include BC applications 20 for mapping data fields from a particular reporting database 40 to the corresponding fields in the BC data structure 22. The BC Breach Intelligence Network and/or the BC data structure 22 can include a plurality of data-mapping applications, where each application can be configured for a specific reporting database 36, to improve the efficiency and effectiveness of data importation and consolidation into the BC data structure 22 from multiple reporting databases 36 administrated by multiple reporting entities. For example, the BC data structure 22 can include a first data mapping application for mediating the importation of data from a first reporting database 36 administrated by a government regulatory agency receiving reports of data breach events 70 from various types of organizations (banks, brokerages, etc.) in the financial industry, a second data mapping application for mediating the importation of data from a retail entity which has experience a data breach event 70, a third data mapping application for mediating the importation of breached data reported by an individual consumer, a fourth data mapping application for mediating the importation of breached data reported by a medical institution, and so on. As such, the BC data structure 22 and the BC methods for generating risk outputs provides a standardized database of breach information and an efficient and standardized approach to quantifying the risks and harms 72 to a consumer-victim associated with a data breach event 70, for that breach event 70 and relative to other breach events 70.

The system 100 can include one or more resource servers 50 configured to provide resources, including mitigation actions 116 (see FIG. 8), to consumer-victims of a data breach. Each of the resource servers 50 is administered and/or operated by a resource provider, which can also be referred to herein as an institution. A resource provider can be, by way of non-limiting example, a financial institution such as a bank or a brokerage institution providing a notification service to a consumer-victim subjected to a breach of the financial institution customer's information, a credit bureau or similar institution monitoring the consumer-victim's account for fraud and/or identity theft detection, a provider of identity protection software, and/or the breached entity for example, to change a password or other breached information such as a payment card account number, etc. In one example, the resource provider/institution is a sponsoring entity 23 which can be integrated with the BC system 100 via one or both of BC Premium and/or BC Professional. In an illustrative example, the resource server 50 includes a memory 42 and a central processing unit (CPU) 44. The memory 42 of the resource server 50 can include, by way of example, Read Only Memory (ROM), Random Access Memory (RAM), electrically-erasable programmable read only memory (EEPROM), etc., i.e., non-transient/tangible machine memory of a size and speed sufficient for the providing resource services, which can include mitigation actions 16, related to the breach event and/or breached information, which can be stored and/or accessed via a resource database 46. The resource server 50 includes a resource interface 48, which in an illustrative example can be configured as a modem, browser, website, or similar means suitable for accessing a network 130. In an illustrative example, the resource server 50 can be accessed via a consumer user interface 90 provided by the BC system to a consumer-victim's user device 30, to activate a mitigation action 116. In one example, the resource server 50 and the BC server 12 are interfaced via one or more application programming interfaces (APIs) 43, 24, respectively, such that one or more mitigation actions 116 can be automatically activated on a consumer's accounts based on breach status information and the consumer's and/or the resource provider's preferences, and/or such that breach data from the BC server 10 and/or customer data from the institution 23. By way of illustration, the resource server 50 can be an administrator of a consumer-specific account, such as a financial, healthcare, or other account including sensitive and/or private information (PII), where the administrative functions of the resource server 60 include consumer-specific account customization of alerts, threshold limits for transfers and other activities, etc., based on the consumer and/or resource provider's input and/or preferences. The BC server 12, in the present example, can be integrated with the resource server 50, for example, a banking institution or healthcare provider, such that the consumer-specific account settings can be made automatically based on the consumer's risk profile determined by the BC server 12. In one example, the integration of the BC server 12 with the resource server 50 for consumer-specific account customization can occur during a subscription process, during which the consumer subscribes to the BC system 100 and authorizes the integration and automatic updating of the resource provider's consumer-specific account settings by the BC server 12 based on the subscriber-consumer's BC risk profile. As changes occur in the consumer's risk profile in the BC server 12 over time, for example, as a consumer becomes a victim of a breach event 70 for which a harm 72 and/or a mitigation action 116 is identified by the BC system 100 related to the consumer-specific account administered by the resource server 50 and integrated with the BC server 12, the BC server 12 via the integration API automatically changes settings on the consumer-specific account, for example, to revise alert settings, change authorization thresholds, notify the integrated resource provider of breach information potentially affecting the consumer-specific account administered by the resource server 50, etc.

In another illustrative example, the resource server 50 can incorporate a third-party source of breach status information or other details, such as IDtheftcenter.org, a credit reporting agency, an activity monitoring system for monitoring online activity related to a consumer's online accounts, email addresses, etc. such as the website www.havelbeenpwned.com, a breached entity's own site established to for a consumer to obtain breach information from that breached entity such as the website https://trustedidpremier.com/eligibility/eligibility.html established for victims of the Equifax breach event. In this example, the resource server 50 can be integrated with the BC server 12, via an API or like system, such that the resource server 50 can automatically provide breach information to the BC server 12. In one example, the BC system 100 is operable and/or configured such that, when breach information related to a consumer-specific account is received by the BC server 12 from an integrated resource server 50, the BC server 12 updates the consumer's BC risk profile, including recommended mitigation actions 116, exposure ratings 132, and the like, and automatically provides notifications to the affected consumer.

In the example shown in FIG. 1, the BC server 12, the user device(s) 30, the reporting server(s) 40, and the resource server(s) 50 can selectively communicate with each other via a network 130, which in an illustrative example can be the Internet. In the example shown, one or more of email service provider servers 87, payment service provider servers 89, dark web service provider servers 11 can be in communication with the Internet, and as such, can selectively communicate via the network 130 with one or more of the BC server 12, the user device(s) 30, the reporting server(s) 40, and the resource server(s) 50. In a non-limiting example, the dark web service provider server 11 selectively communicates with, monitors, and/or accesses one or more dark websites 202, via the network 130, to retrieve information including breach event information from one or more of the dark websites 202. The dark websites 202 can be referred to individually or collectively herein as the dark web 202, and/or as the Darknet.

The example shown in FIG. 1 is non-limiting, such that one or more of the BC server 12, user device 30, reporting server 40, resource server 50 email service provider server 87, payment service provider server 89, and/or dark web service provider server 11 could be selectively connected directly, for example, to directly access each other, and/or for off-network communication of data between one or more of the BC server 12, user device 30, reporting server 40, resource server 50. The example shown in FIG. 1 is non-limiting, such that a consumer-victim could contact a BC provider, e.g., contact center, having access to the BC server 12 using means other than a user device 30, for example using one or more of in-person contact, telephone, facsimile, short message service (SMS), multimedia messaging service (MMS), written (mailed) correspondence, etc., to obtain the services and risk-outputs provided by the BC system 100 and/or the BC server 12. Similarly, a consumer-victim could contact a resource provider having access to the resource server 50 to obtain resource services which can include actioning one or more mitigation actions 116 and/or could contact a reporting provider having access to the reporting server 40 to obtain reporting services which can including determining whether the consumer has been a victim of a data breach event and/or reporting a data breach event, using a user device 30 and/or means such as one or more of in-person contact, telephone, facsimile, short message service (SMS), multimedia messaging service (MMS), written (mailed) correspondence, etc. In one example, one or more of the services provided by reporting server 40 and/or the resource server 50 could be integrated with the consumer's BC risk profiles and/or the BC server 12, via an API, etc., such that the consumer can receive notifications via the BC server 12 and/or the BC system 100 and/or access information from the reporting server 40 and/or resource server 50 via the BC server 12 and/or the BC system 100, including notifications of breach activity including breach events 70, advisements to activate mitigation actions 116, changes to observed activities including for example, fraudulent transactions, unauthorized distribution of the consumer's breached information, etc. For example, reporting of an occurrence of a particular type of harm on a consumer-specific account by a reporting provider to the BC system 100, such as a fraudulent transaction on the consumer's account, for example, via integration of the reporting server 40 with the BC server 12, could trigger a revision by the BC server 12 of the consumer's BC risk profile. The BC server 12, using the additional information, can apply algorithms 10 to update the consumer's mitigation actions 116 and/or rankings of these mitigation actions 116, and can output notifications to the consumer and/or to a resource server 50 or resource provider associated with and/or potentially affected by the reported occurrence. The BC system 100 can be operable in real time, such that, in real time with identification of a breach event 70 impacting a consumer, the BC system 100 can generate and output a breach notification to the consumer(s) affected by the breach event 70, via a consumer interface such as BC Freemium and/or BC Premium and/or via a institution user interface 90 such as BC Professional or a sponsor institution interface 25. For example, the occurrence of a fraudulent in-store payment card transaction using breached codes stored on the magnetic stripe of a consumer's payment card, and reported via a reporting server 40 to the BC server 12, can initiate a revision by the BC server 12 of the consumer's exposure rating 132 and/or mitigation actions 116, including outputting a notification to a resource server 50 of a resource provider such as the payment card issuer, to modify fraud alerts and/or authorization requirements for in-store transactions where the consumer's payment card is presented for use. The payment card issuer may provide a fraud alert notification to the affected consumer, or in one example, the BC server 12 may be operable to generate and output a fraud alert notification to the affected consumer. In another example, the BC system 100 can output a mitigation action 116 and/or provide a notification or alert to a consumer-victim of a breach event 70 that includes their phone number and/or email address as breached information elements 68, to advise the consumer-victim that they are at increased risk of receiving phone calls or emails from identity criminals.

Figure 2:
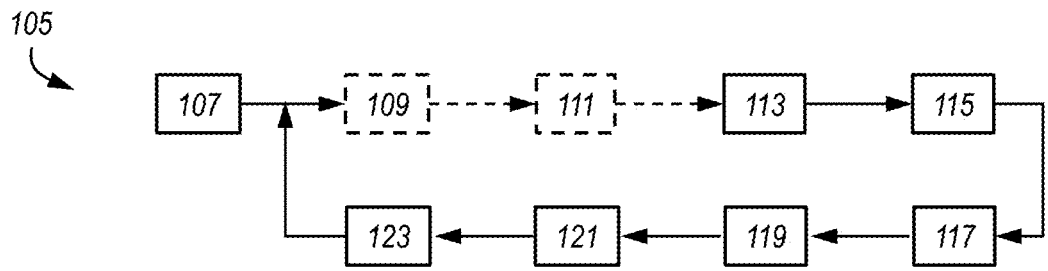
FIG. 2 is a schematic illustration of a flowchart of an exemplary process for a consumer user accessing a consumer interface of the BC system, also referred to herein as a BC Premium system (BC Premium) and generating a consumer breach profile, also referred to herein as a My Breach Clarity History profile.

Referring to FIGS. 1 and 2, FIG. 2 is a flowchart 105 illustrating a high-level overview of a method by which a consumer accesses the Breach Clarity™ system 100 and BC processes using the BC Premium application. In the example shown, the consumer at 107 accesses a BC Premium interface and creates a BC account, which includes for example, creating an BC account name such that the consumer is identifiable in the BC Breach Intelligence Network with the BC account name. The consumer at 107 may also provide consumer profile information which can include personally identifying information (PII) at 107, to be used by the BC system 100 at to create a consumer breach history profile 57, also referred to herein as a My Breach Clarity History profile. In one example, the consumer can be requested to create a password or provide other authenticating information for accessing the consumer's BC account. The consumer at 107 may access the BC Premium interface directly, or through a BC portal 29 integrated into a sponsoring institution 23 interface. In a non-limiting example, the consumer can be a customer of the sponsoring institution 23, and account creation at 107 can include associating the consumer's BC account name and with information identifying the consumer as a customer of the institution, for example, via BC Professional and/or via BC and/or institution APIs provided for that purpose.

At 109 and 111, the enrolled consumer can be requested, via a BC Premium interface 90, to provide account information related to one or more electronic transaction accounts associated with the enrolled consumer, and/or to provide access by the BC system 100 to one or more electronic transaction account associated with the consumer, for example, by providing account access credentials and/or executing or installing a plug-in or widget to allow retrieval of electronic transaction data by the BC server 12 from the transaction account. In an illustrative example, the electronic transaction account is configured to execute a consumer transaction between the consumer and a party to the consumer transaction. Electronic transaction information associated with the consumer transaction is generated via the electronic transaction account, and retrieved via the network 130, where in an illustrative example, the electronic transaction information includes a consumer identifier corresponding to the consumer, a party identifier corresponding to the party, and a transaction time corresponding to the time the consumer transaction was executed via the electronic transaction account.

In one example, the consumer profile information includes account credentials corresponding to the electronic transaction account, and the method includes accessing the electronic transaction account using the account credentials. The account credentials can include one or more of an account identifier such as an account number or account name, an account password, an account authentication code, etc. as required for the breach system 100 and/or the BC server 12 to access the electronic transaction account and/or retrieve electronic transaction information from the electronic transaction account. In one example, accessing the electronic transaction account includes receiving, via the network, a plug-in for accessing the electronic transaction account and executing the plug-in to transmit the transaction account information via the network such that the electronic transaction information is retrieved from the account via the account plug-in.

In an illustrative example, the electronic transaction account is an electronic mail (email) account, the consumer transaction is an email transaction between an email sender and an email recipient, and the party to the consumer transaction is one of the email sender and the email recipient and comparing the electronic transaction information with the breach information includes determining a match between the breach information of the respective data breach and at least one of the email sender or the email recipient. In one example, the consumer identifier is an email address associated with the consumer. The email account can be provided to the consumer and serviced by an email hosting service provider, which may also be referred to herein as an email hosting provider, a webmail provider, or as an email provider, and for example, via an email server 87 administered and/or operated by the email provider. Non-limiting examples of email service providers include Gmail, Outlook, Yahoo!, AOL Mail, and the like, and can further include non-public email service providers. As shown in FIG. 1, the consumer email account holder can access an email provider server 87 via the consumer's user device 30, via the network 130. The email server 87, in an illustrative example, includes a central processing unit (CPU) 141 and a memory 143. The memory 143 of the email server 87 can include, by way of example, Read Only Memory (ROM), Random Access Memory (RAM), electrically-erasable programmable read only memory (EEPROM), etc., i.e., non-transient/tangible machine memory of a size and speed sufficient for storing a database 161, and for storing algorithms, APIs, plugins, widgets, etc. as needed to provide email hosting services. The email server 87 includes an email interface 163, which in an illustrative example can be configured as a modem, browser, or similar means suitable for accessing a network 130. In one example, a consumer can access the consumer's email account and/or other services of the email service provider via a user device 30 in communication with the email server 87 via the network 130.

Referring to FIG. 2, at step 109 the consumer can be requested, via the BC Premium interface, to provide access to the consumer's email account for the BC server 12 to retrieve electronic transaction account information from the consumer's email account. In one example, the consumer provides sign in credentials, for example, the consumer's email address and account password, to the BC server 12, for use by the BC server 12 in retrieving electronic mail transaction information from the consumer's email account. In one example, a plug-in for accessing the email account is provided such that the BC server 12 can retrieve email transaction information from the consumer's email account by executing the plugin.

In use, the email plug-in provides, for email transactions occurring via the consumer's email account, for example, for each email sent from or received from the account, the name and/or email address of the email recipient, the name and/or email addressed of the email sender, and the date the email was received or sent. Additional transaction information, such as the time of day the email was received or sent, could also be retrieved. In the event the consumer has more than one email account, the process of enrolling the consumer's email account for retrieval of email transaction information from the email account can be repeated for each of the consumer's email accounts.

Once enrolled, the BC server 12 either continuously or at predetermined intervals, for example, hourly, daily, weekly, retrieves the email transaction information from the consumer's enrolled email account(s) and compares the email transaction information to a database of publicly reported breach events 70 and/or to other data breach information collected into the Breach Intelligence Network and/or data structure 22, to match the email transaction with breach information of a breach event 70, for example, by matching the names of senders and/or recipients with the name of a breached organization, and the dates of emails with date ranges know to be associated with compromised data in each breach event 70. Where a match is determined, the matching breach event 70 is then processed through the BC algorithm and assigned a BC score 80, and the consumer's My Breach Clarity History profile is appended with the matching breach event information at step 121. At 123, a notification can be generated and transmitted to the consumer, to advise of changes and updates to the consumer's My Breach Clarity History, including reminders to complete mitigation actions 116 associated with the matching breach event 70.

In an illustrative example, the electronic transaction account is an electronic payment account, the consumer transaction is an electronic payment transaction between a payor and a payee, and the party to the consumer transaction is one of the payor and the payee such that comparing the electronic transaction information with the breach information includes determining a match between the breach information of the respective data breach and at least one of the payor and the payee. In one example, the consumer identifier is a payment account number associated with the consumer, which can be a payment card number.

The payment account can be provided to the consumer and administered by a payment service provider, which may also be referred to herein as a payment processor, and which can be, for example, an issuing bank from which the consumer's payment card (Mastercard, Visa, etc.) has been issued, a third party payment online provider/processor such as PayPal, Square, etc., via a payment server 89 administered and/or operated by the payment service provider. As shown in FIG. 1, the consumer electronic payment account holder can access the payment provider server 89 via the consumer's user device 30, via the network 130. The payment provider server 89, in an illustrative example, includes a central processing unit (CPU) 171 and a memory 173. The memory 173 of the payment provider server 89 can include, by way of example, Read Only Memory (ROM), Random Access Memory (RAM), electrically-erasable programmable read only memory (EEPROM), etc., i.e., non-transient/tangible machine memory of a size and speed sufficient for storing a database 201, and for storing algorithms, APIs, plugins, widgets, etc. as needed to provide electronic payment transaction services. The payment provider server 89 includes an payment transaction interface 203, which in an illustrative example can be configured as a modem, browser, or similar means suitable for accessing a network 130. In one example, a consumer can access the consumer's payment transaction account and/or other services of the payment service provider via a user device 30 in communication with the payment provider server 89 via the network 130.

Referring to FIG. 2, at step 111 the consumer can be requested, via the BC Premium interface, to provide access to the consumer's payment account for the BC server 12 to retrieve electronic transaction account information, including bill payment and card transaction data, from the consumer's payment account. In one example, the consumer provides sign in credentials, for example, the consumer's account number and account password, to the BC server 12, for use by the BC server 12 in retrieving payment transaction information from the consumer's payment account. In one example, a plug-in, widget, or other software-based solution for accessing the payment account is provided to the payment provider server 89 such that the BC server 12 can retrieve payment transaction information from the consumer's payment account by executing the plugin. In one example, APIs and/or software code which is specific to the payment provider may be provided by the BC server 12 to the payment provider server 89 for use in accessing the consumer's payment account information.

In use, the BC server 12 retrieves and/or receives payment transaction information from the consumer's payment account, including transactions where the consumer payor has rendered payments, and analyzes users' payment histories to identify organizations where a payment was rendered at a period of time, comparing the names of those organizations with those associated with a breach event 70 in the data structure 22 and/or in the Breach Intelligence Network, and comparing the dates of those payments with when those organizations were known to have experienced a data breach event 70, to identify if the consumer was also using a payment account provided by the organization during the time of occurrence of the identified breach event 70.

In the event the consumer has more than one payment account, the process of enrolling the consumer's payment account for retrieval of payment transaction information from the payment account can be repeated for each of the consumer's payment accounts. As described for step 209, at step 111, once enrolled, the BC server 12 either continuously or at predetermined intervals, for example, hourly, daily, weekly, retrieves the payment transaction information from the consumer's enrolled payment account(s) and compares the payment transaction information to a database of publicly reported breach events 70 and/or to other data breach information collected into the Breach Intelligence Network and/or data structure 22, to match the payment transaction with breach information of a breach event 70, for example, by matching the names of payees with the name of a breached organization, and the dates of payment transactions with date ranges know to be associated with compromised data in each breach event 70. Where a match is determined, the matching breach event 70 is then processed through the BC algorithm and assigned a BC score 80, and the consumer's My Breach Clarity History profile is appended with the matching breach event information at step 121. One or more mitigation actions related to the breach event 70 may be identified for completion by the consumer related to the consumer's payment account, including, for example, changing an account password, changing an account number, implementing transaction limits and/or alerts, etc. In one example, where the payment provider 89 is also the subscriber institution through which the consumer has accessed BC Premium, the mitigation actions suggested to the consumer may be communicated to the consumer via the subscriber institution's website and/or through the BC Premium link accessible via the subsubscriber institution's website, for convenient access by the consumer and to encourage timely completion of the mitigation action 116 by the consumer. At 123, a notification can be generated and transmitted to the consumer, to advise of changes and updates to the consumer's My Breach Clarity History, including reminders to complete mitigation actions 116 associated with the matching breach event 70.

At 113, the enrolled consumer accesses the BC Premium interfaces 90 to, for example, search for breach information related to one or more breach events 70 of interest to the consumer, and/or by which the consumer has been victimized. At 115, a My Breach Clarity History profile 57 can be generated for the enrolled consumer, listing the breach events 70 associated with the consumer in the Breach Intelligence Network and/or the BC data structure 22. In one example, the consumer at 115 can enter breach information via a BC Premium interface 90, to be added to the consumer's My Breach Clarity History as a consumer reported breach event.

At 117, additional breach related information, including for example, a rank ordered listing of mitigation actions 116 which are recommended to the consumer based on the consumer's breach profile 57, can be displayed to the consumer. In one example <<describe Consumer Identity Roadmap 218>> can be generated at 117. In one example, the mitigation actions 116 may be linked via an interface element 118, URL, etc., to a resource provider 50, to facilitate consumer adoption and/or execution of the recommended mitigation actions 116. In the example of a sponsored enrollment, one or more of the mitigation actions 116 can be linked via an institution link 31 to the sponsoring institution 23, for activation of the mitigation action 116 via the sponsoring institution 23, as shown in a non-limiting example in FIGS. 11-17. The BC system at 121 updates the Breach Intelligence Network in real time, which can include updating the consumer's My Breach Clarity History based on breach information received to the BC system 100, which can include breach event information, mitigation action completion status, and/or consumer transaction information such as email and payment transaction information. At 123, a notification can be generated and transmitted to the consumer, to advise of changes and updates to the consumer's My Breach Clarity History, including reminders to complete mitigation actions 116 and updates to the consumer's identity roadmap 218. The method returns to 109 in a continuous manner, for example, each time the enrolled consumer accesses the BC Premium application 90, each time the Breach Intelligence Network receives additional breach event information, consumer transaction information, and/or revised mitigation action status, and/or at an established frequency, e.g., daily, weekly, etc.

Figure 7:
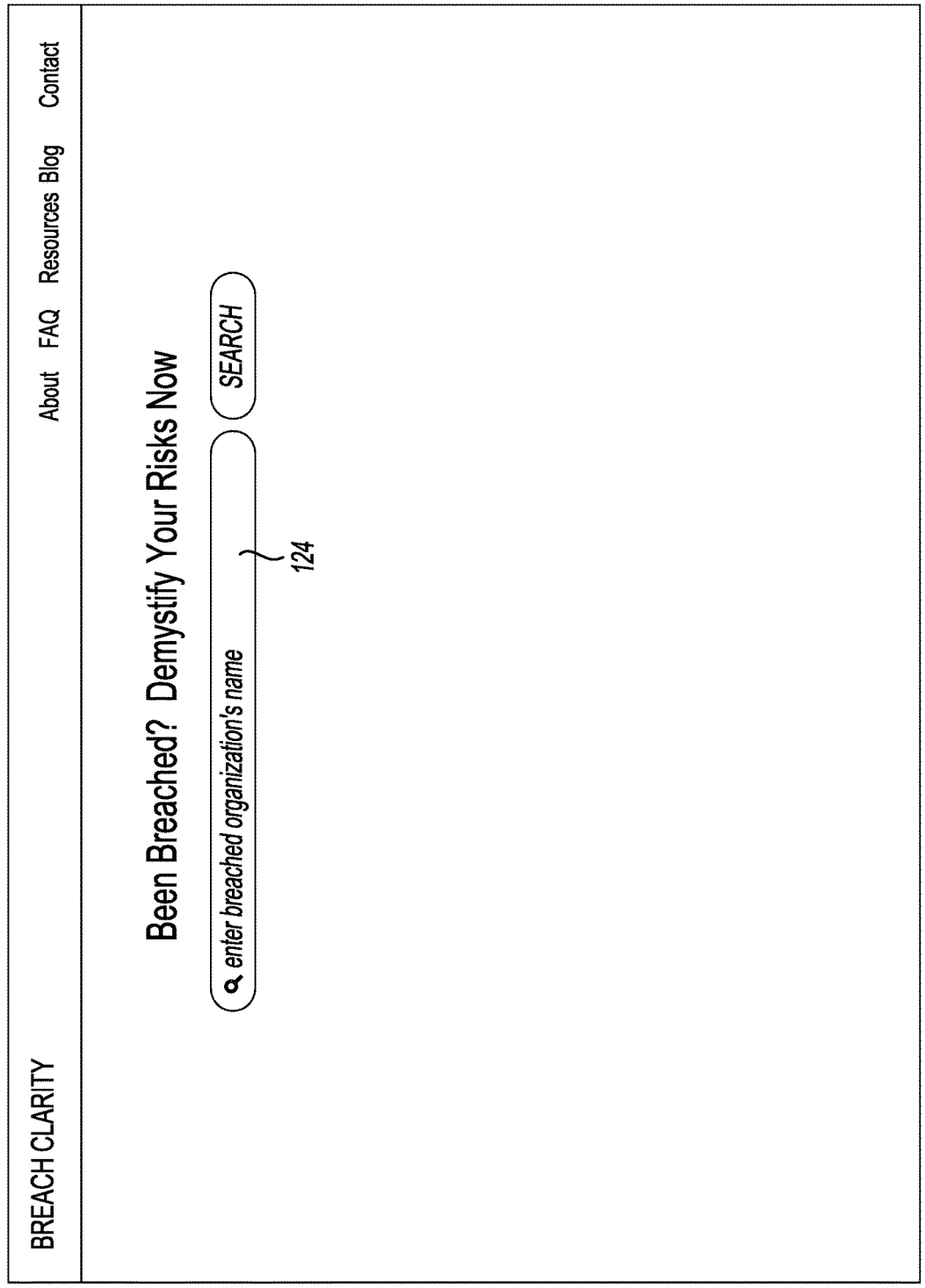
FIG. 7 is a schematic illustration of an exemplary user interface of BC Freemium including a breach input field for conducting a breach search.
Figure 9:
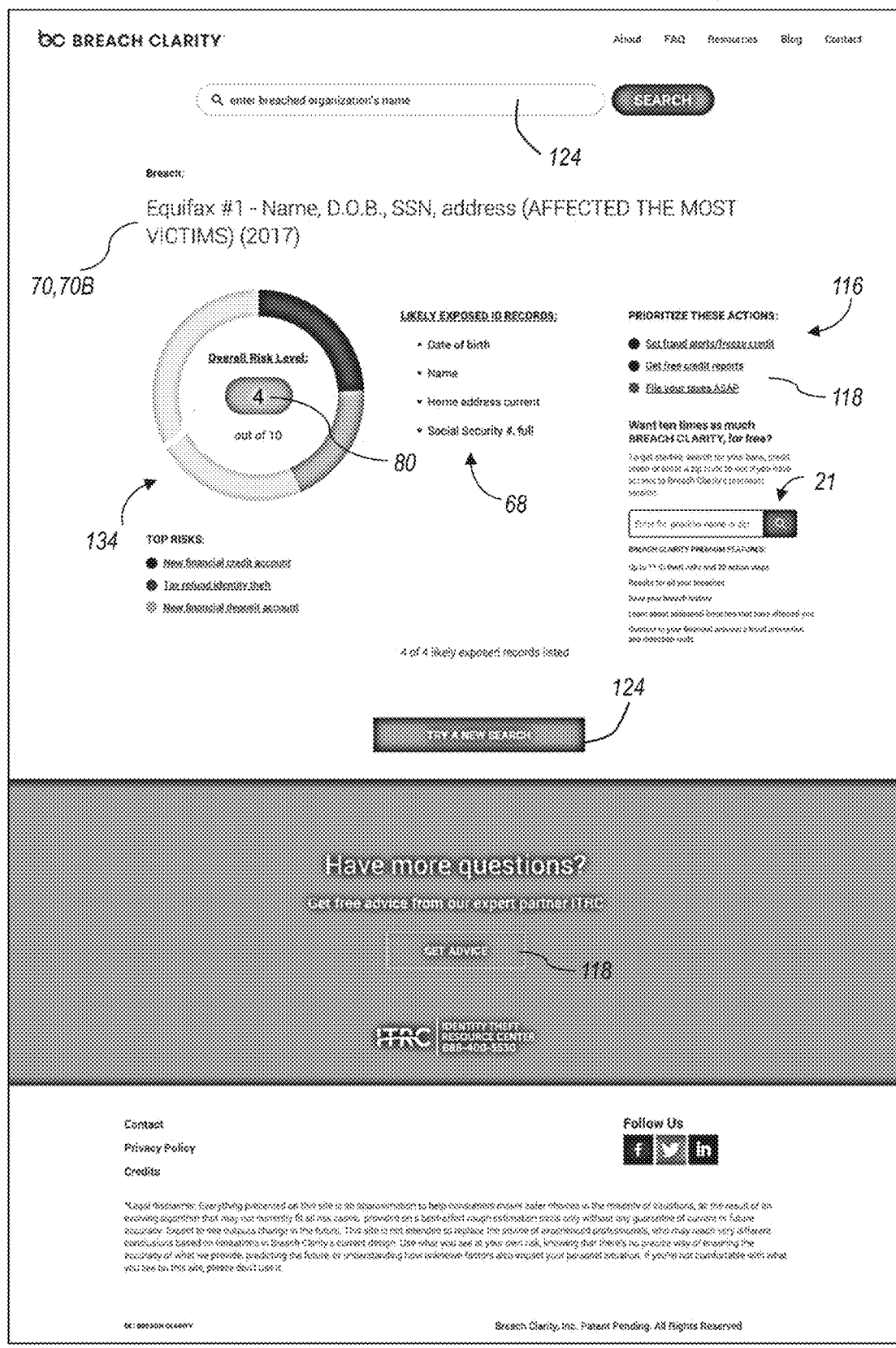
FIG. 9 is a schematic illustration of an exemplary BC Freemium user interface displaying the risk outputs for an example breach event selected from the search outputs of FIG. 8 and further including an institution input field for conducting a sponsoring institution search.
Figure 10:
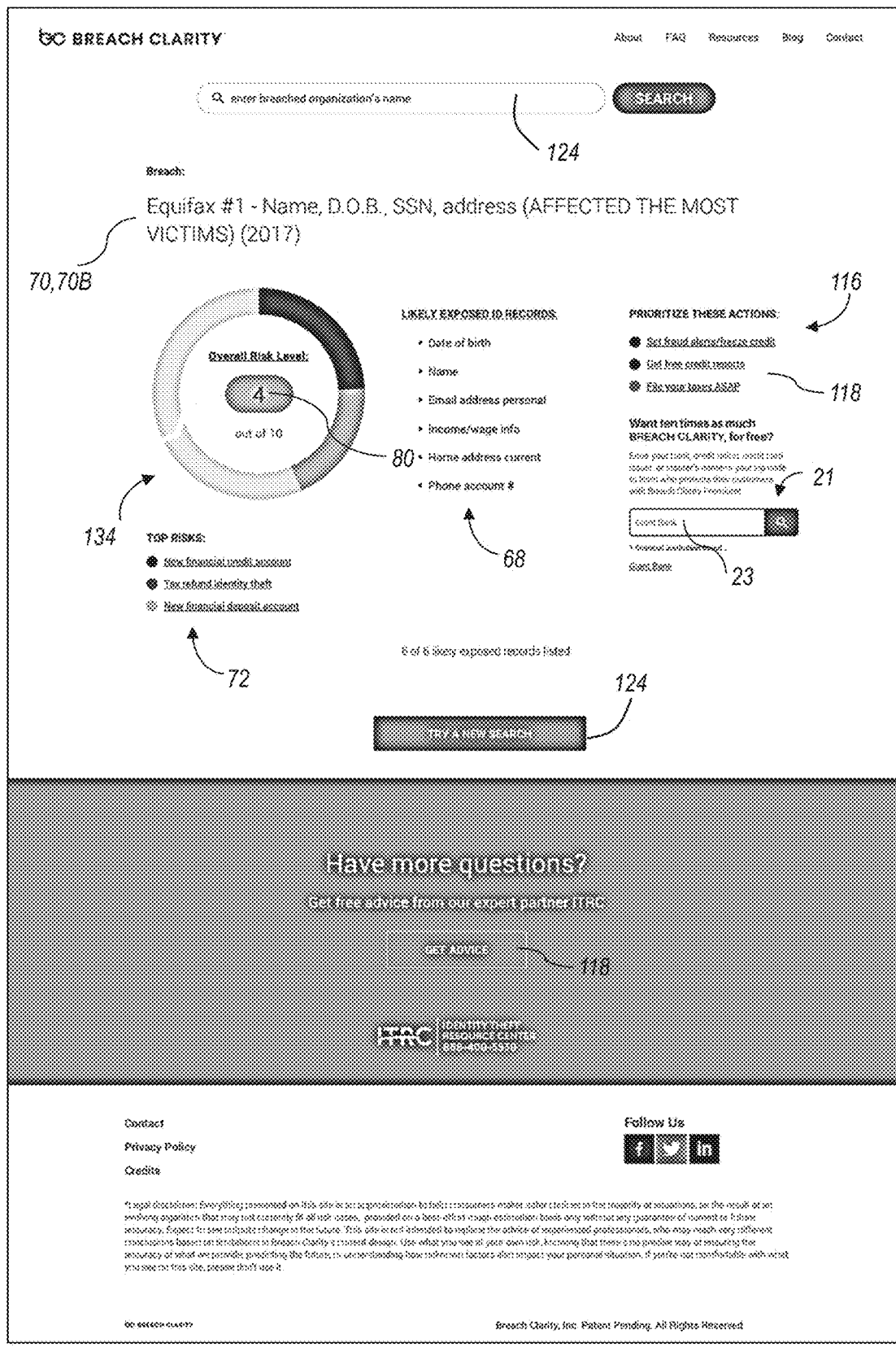
FIG. 10 is a schematic illustration of the BC Freemium user interface of FIG. 9 showing an exemplar institution search.
Figure 19:
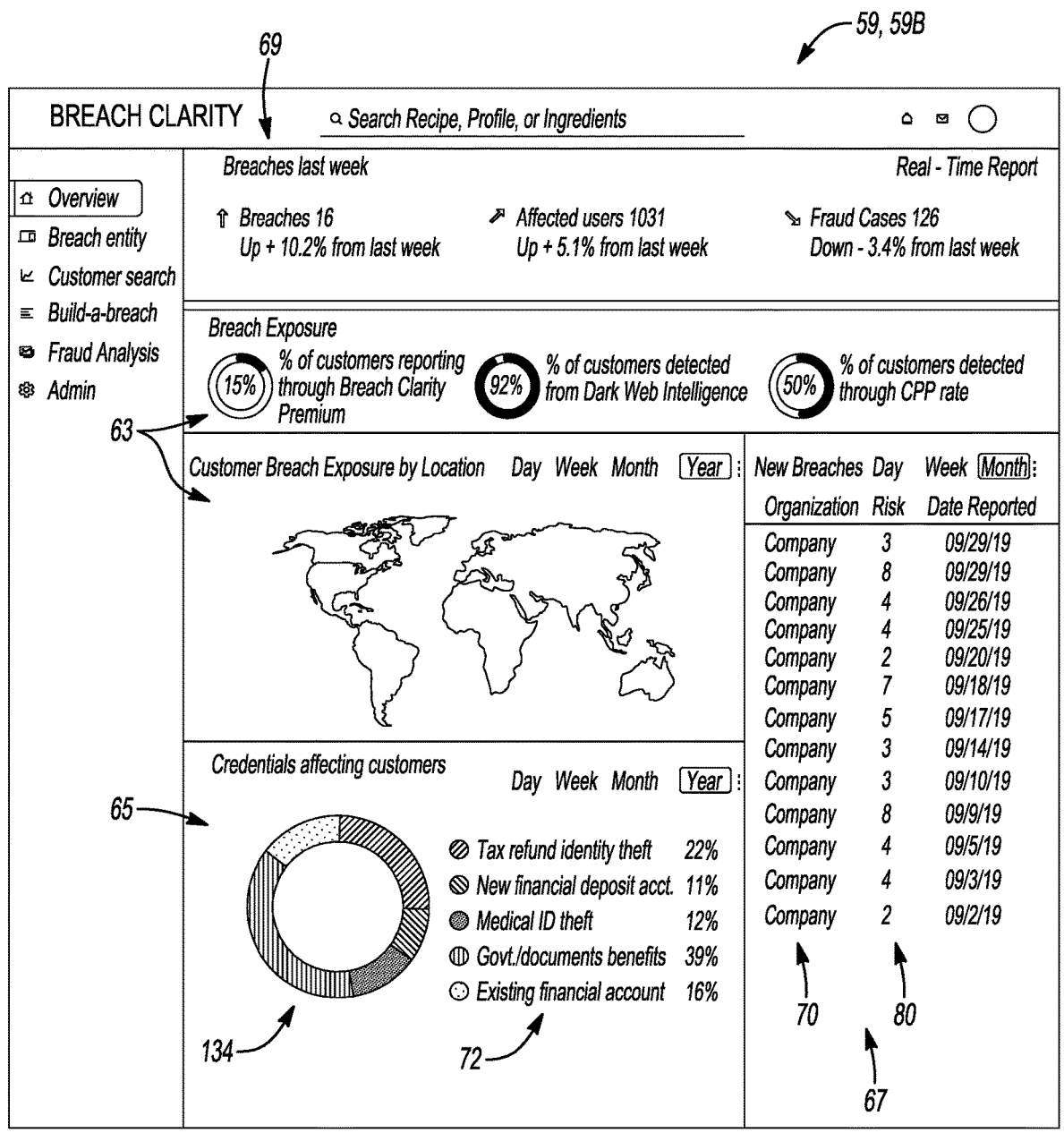
FIG. 19 is a schematic illustration of an exemplary BreachFeed display generated by BC Professional showing breach event activity in a reporting time period, including impact on institution customers.

FIGS. 7 through 17 provide illustrative examples of a consumer interaction with the BC Freemium and BC Premium applications. FIG. 7 illustrates an exemplary consumer user interface 90, 90T of the BC Freemium application which can be accessed from the BC interface 18, for example via a user device 30 and the network 130. The BC interface 90T includes a breach input field 124 for entering a breach identifier 70 of a breach event for which the consumer is seeking additional information. In the example shown in FIG. 8, the consumer enters "equifax" as the breach identifier 70 and in response, the BC system 100 outputs five breach events 70A, 70B, 70C, 70D, 70E which are associated in the BC data structure 22 with the breach identifier "equifax." The consumer selects breach event 70B and in response the BC Freemium application outputs the exemplary user interface shown in FIG. 9, which provides the consumer with a Breach Clarity score 80 of "4" out of "10" for the overall risk level assigned to the breach event 70B, where the Breach Clarity score 80 may be displayed in a graphic representation, in the present example, color coded on a Yellow-Orange-Red spectrum, based on the magnitude of and/or risk associated with the BC score of "4" being displayed for the selected breach event 70B. A consolidated risk distribution 134 can also be displayed, which in the present example is configured as a segmented annular ring color coded on a Yellow-Orange-Red spectrum to illustrate the relative severity of the top risks 72 displayed in ranked ordered adjacent to the consolidated risk distribution 134. Also included in the breach information interface 90T shown in FIG. 19 is a listing of the likely exposed records and/or elements of personal information 68 compromised by the breach event 70B.

Figure 11:
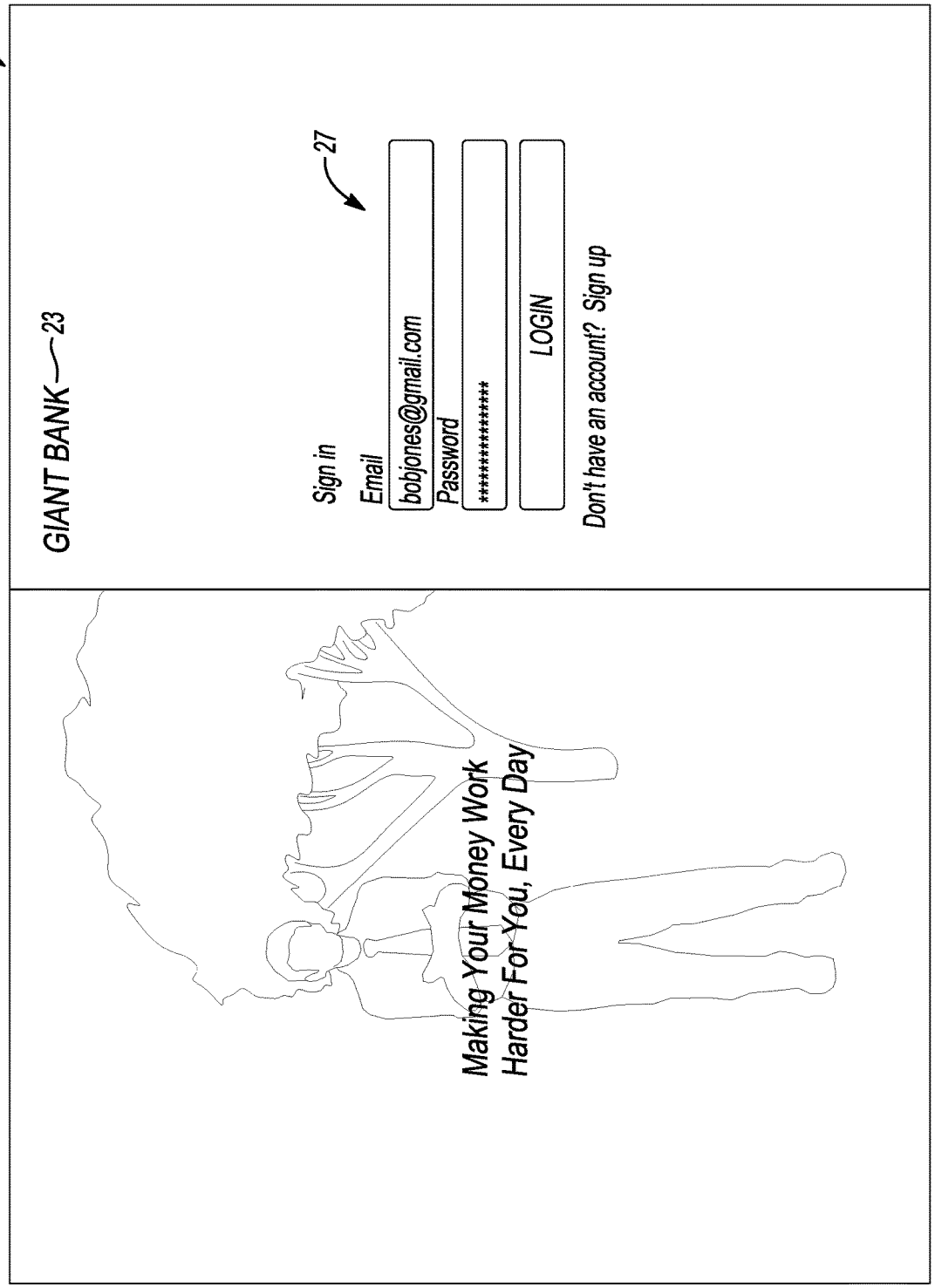
FIG. 11 is a schematic illustration of an exemplary BC Premium sponsoring institution interface outputted as a result of the institution search of FIG. 10 including a customer sign-in field for use in accessing an institution customer account.
Figure 12:
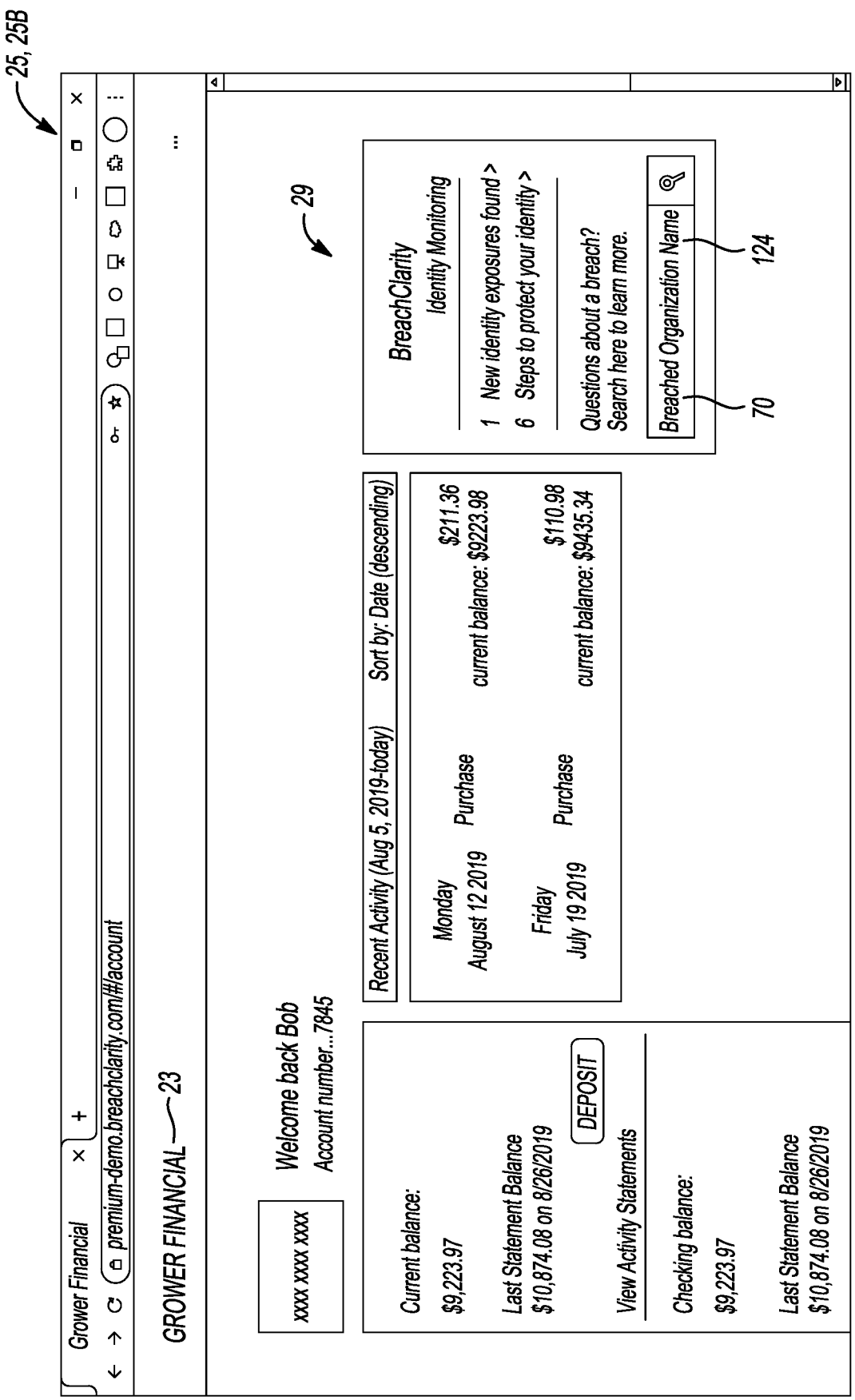
FIG. 12 is a schematic illustration of an exemplary customer summary interface for the customer account accessed via the institution interface of FIG. 11, including a Breach Clarity breach search input field integrated into the customer summary interface for accessing BC Premium.
Figure 13:
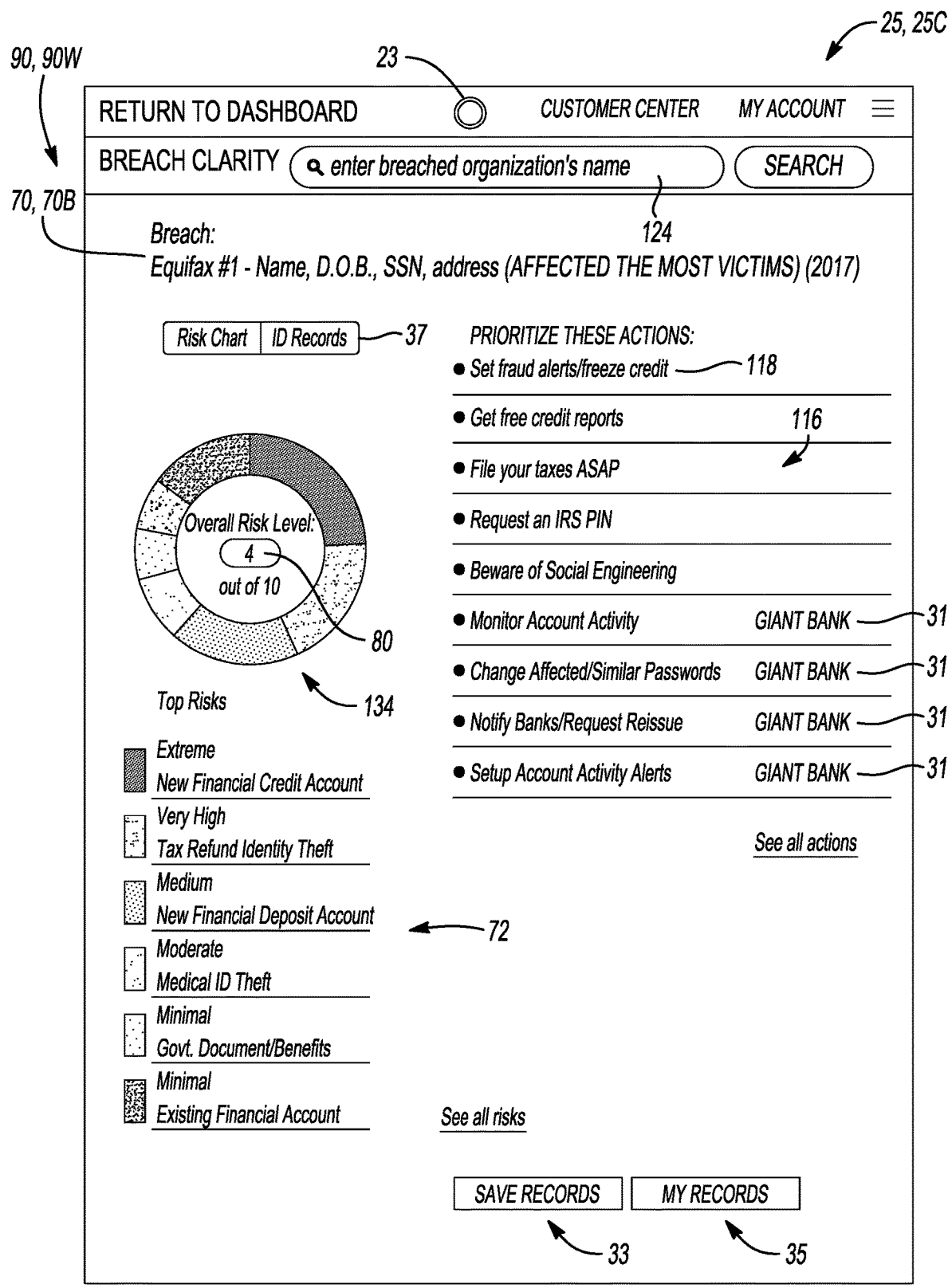
FIG. 13 is a schematic illustration of an exemplary user interface displaying the risk outputs for an example breach event selected from the search outputs of FIG. 8 and further including an institution input field for conducting a sponsoring institution search.

The breach information interface 90T further includes a listing of recommended mitigation actions 116, which can also be rank ordered according to rated effectiveness in mitigation harm from the selected breach event 70B. One or more of the mitigation actions 116 can be associated or linked to a user interface element 118 which when selected directs the user to a resource interface for actioning the recommended mitigation action 116. Referring again to FIG. 9, the breach information interface 90T can further include an input field 21 to search for an institution with which the consumer is associated. In an illustrative example shown in FIG. 10, the consumer enters the name of the consumer's financial institution, "Giant Bank", into the input field 21. The BC system 100 searches to determine whether the financial institution "Giant Bank" is a sponsoring institution 23, e.g., is an institution which has enrolled with BC Premium to offer the BC Premium application to its customer population. Upon determining that "Giant Bank" is a sponsoring institution 23, the consumer is directed to an institution user interface 25, 25A of the sponsoring institution 23, as shown in FIG. 11. In the example shown in FIG. 11, the consumer, in this example, "Bob Jones", also a customer of "Giant Bank" enters sign-in information into input field 27, and is directed to an institution interface 25, 25B which displays a summary of consumer/customer Jones's account. Included in the institution interface 25B is a Breach Clarity portal 29 which provide direct access from the institution interface 25B to the BC Premium application, under the sponsorship of the institution 23. In the example shown in FIG. 12, the customer again enters the breach identifier 70 "Equifax" into the breach input field 134, and in this instance, is directed to a BC Premium breach information display 90, 90W, which in the present example is displayed within the institution interface 25C. The BC Premium breach information display 90W includes additional information as compared with the BC Freemium breach information display 90T shown in FIG. 10, including, for example, extended listings of risks 72 and mitigation actions 116. The interface 25C includes an interface element 37 to toggle between screens shown in FIGS. 13 and 14, for example, to display additional breach information such as the listing of compromised information elements 68 shown in FIG. 14. The BC Premium information display 90W can further include interface elements 33, 35, which can be activated by the consumer/customer to save the displayed breach event 70B to the consumer/customer's breach history profile 57 (see FIG. 17) by activating interface element 33 to "Save Record" and/or to view the consumer/customer's breach history profile 57 by activating interface element 35.

Figure 14:
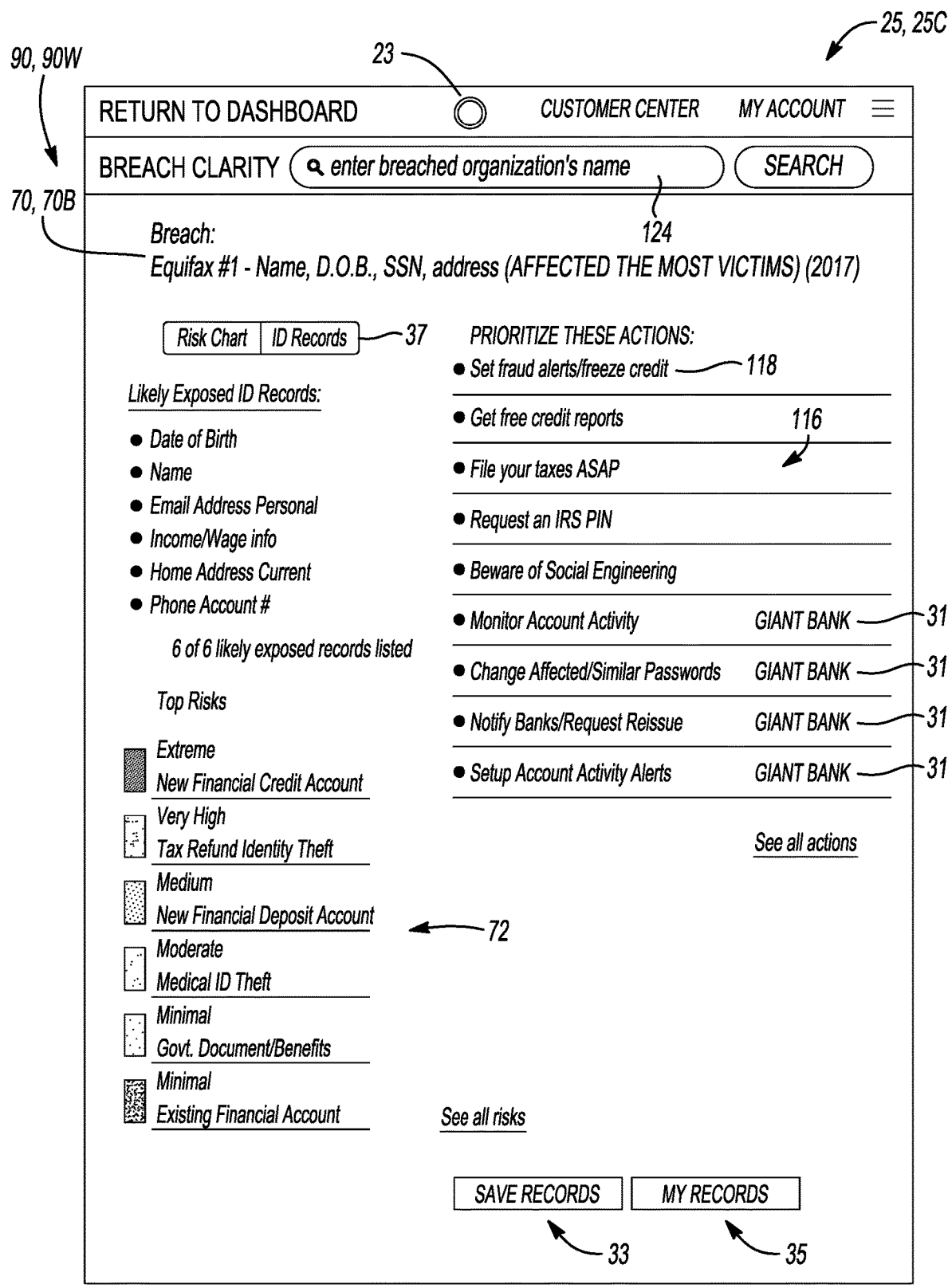
FIG. 14 is a schematic illustration of the exemplary BC premium user interface of FIG. 13, toggled to display information elements breached in the first breach event.
Figure 15:
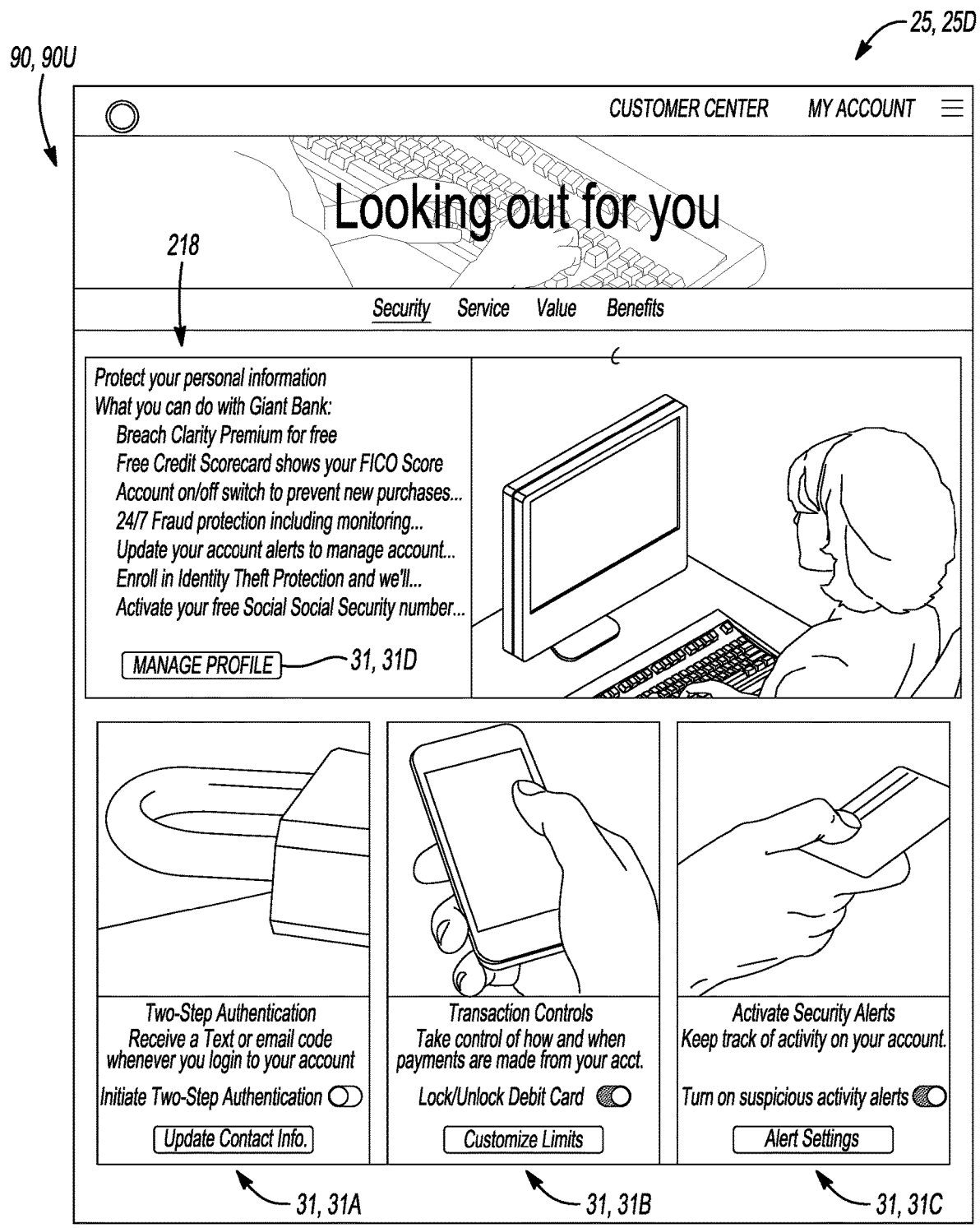
FIG. 15 is a schematic illustration of an exemplary institution interface displaying risk mitigation actions which can be selectively enabled by the customer.
Figure 16:
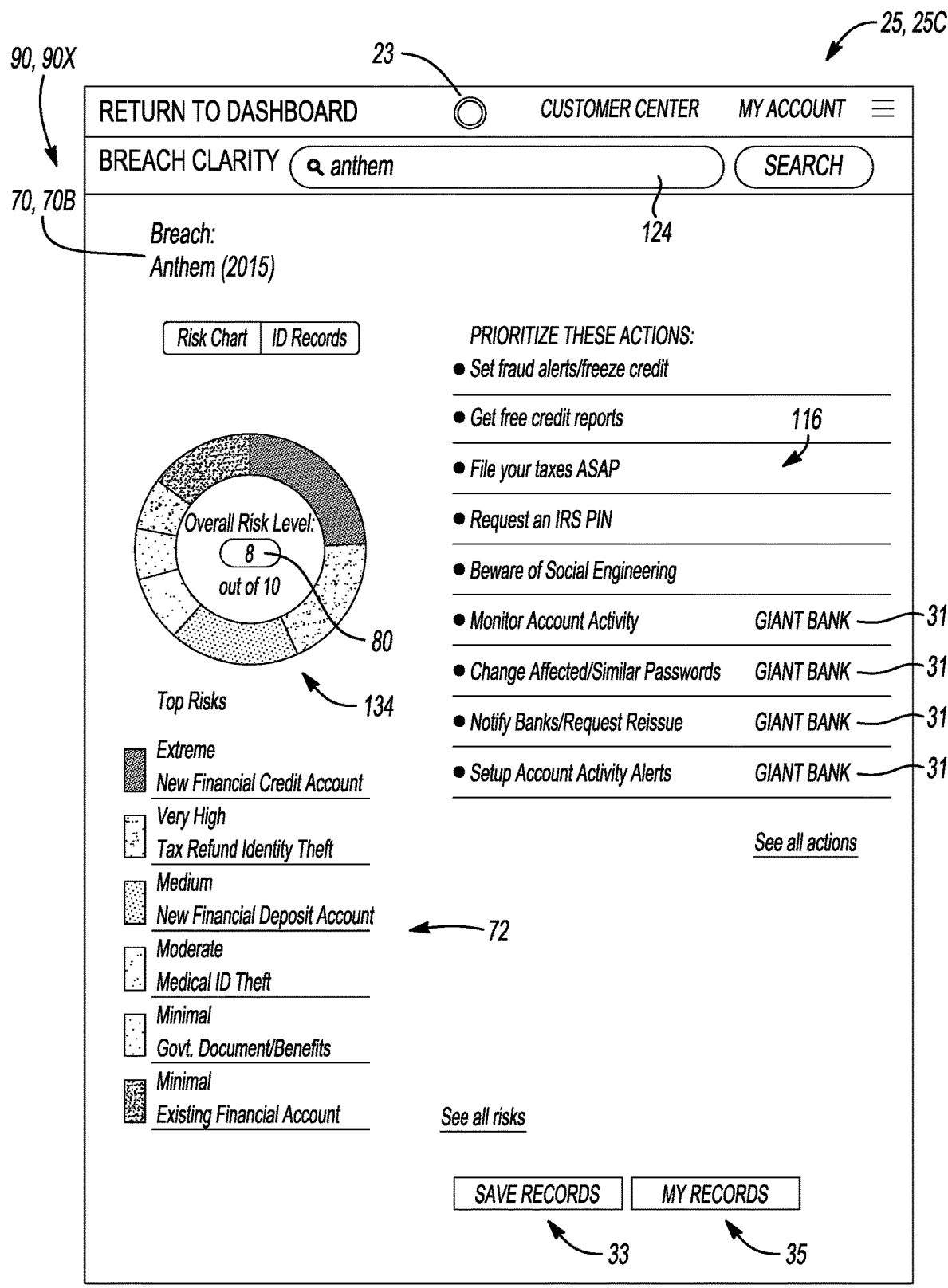
FIG. 16 is a schematic illustration of the exemplary BC Premium user interface of FIG. 14, illustrating a breach search of a second breach event.
Figure 17:
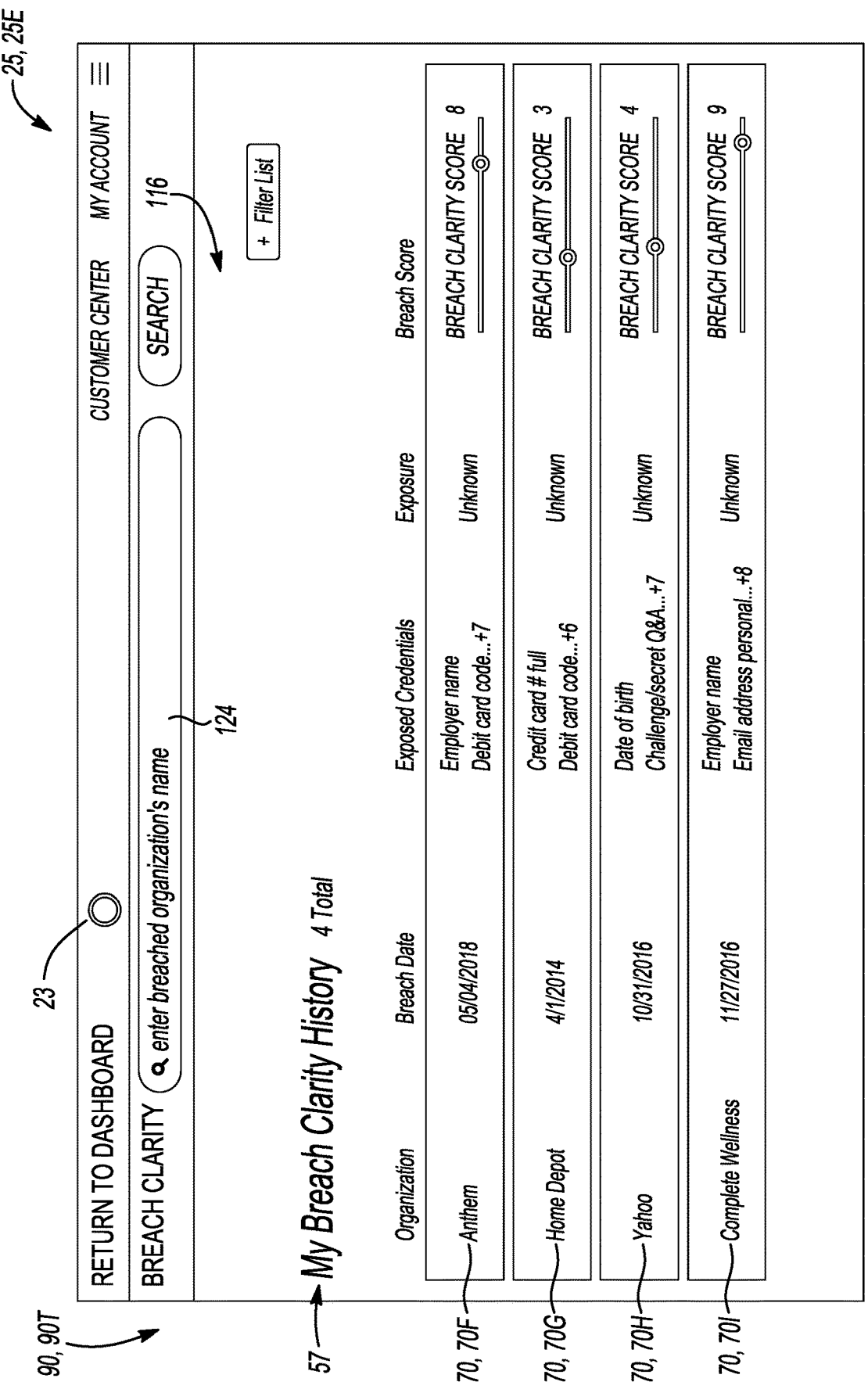
FIG. 17 is a schematic illustration of an exemplary BC Premium user interface showing a My Breach Clarity History profile generated for the customer.

In the examples shown in FIGS. 14, 14, 33 and 34, one or more of the mitigation actions 116 may be associated with an institution interface element 31, which when activated by the consumer/customer directs the consumer/customer to an exemplary institution interface 25D shown in FIG. 15, configured such that the consumer/customer can immediately determine whether the linked mitigation actions have been completed, and/or activate the recommended mitigation actions, via the interface elements 31A, 31B, 31C in the illustrative example. The institution interface 25D can display additional information and/or interface elements 31, 31D which can be activated to provide additional mitigation information and/or resources to the consumer/customer. Conveniently linking activation interfaces 31 for the mitigation actions 116 to the breach information display 90W allows the consumer/customer to activate the mitigation actions 116 without having to seek out additional resources, e.g., without having to leave the institution interface 25. As such, the adoption rate of the mitigation actions by the consumer/customer is likely to increase, thereby decrease risk of harm to the consumer/customer and to the sponsoring institution 23.

Further, by conveniently providing access to the BC Premium interface 90 within the consumer/customer's institution interface 25, the consumer/customer can expeditiously search for other breach events which have impacted the consumer/customer, and add these to the consumer/customer's breach history profile 57. In the example shown in FIGS. 16 and 17, the consumer/customer enters breach identifier 70F "anthem" into the breach search input field 124, and in response, the breach information display 90X is generated by BR Premium and displayed in the institution interface 25C for viewing by the consumer/customer. The consumer/customer can conveniently activate interface elements 35 and/or 33 to determine whether the Anthem breach event 70F has been added to the consumer/customers breach history profile 57 and if not, can completed this action immediately. As described for FIG. 14, a ranked listing of mitigation actions 116 is provided for the breach event 70F shown in FIG. 16, including interface elements 31 linking these mitigation actions to an institution interface 25B.

Notably, the mitigation actions 116 identified for the breach event 70F and for the breach event 70B may be different, such that when viewing the second searched breach event 70F, the consumer/customer can activate interfaces 31 for any mitigation actions 116 which have not previously been adopted by the consumer/customer, to conveniently and expeditiously implement these new mitigation actions 116, thereby reducing risk of harm to the consumer/customer and the sponsoring entity 23.

Figure 3:
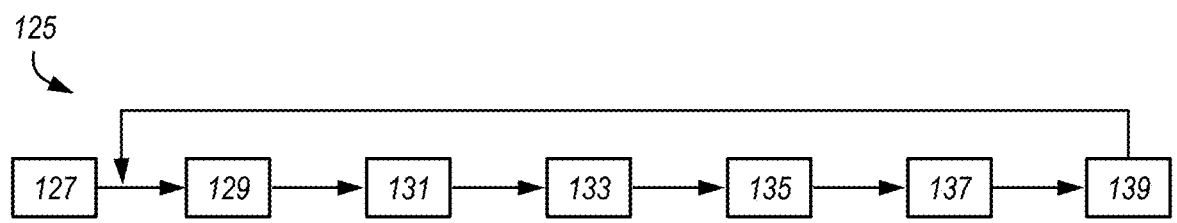
FIG. 3 is a schematic illustration of a flowchart of an exemplary process for an institution user accessing an institution interface of the BC system, also referred to herein as a BC Professional system (BC Professional) and utilizing breach reporting and assessment applications of BC Professional.

Referring now to FIG. 3, shown is a flowchart 125 illustrating an overview of a method by which an institution accesses and/or uses the BC Professional application described herein and illustrated in use in exemplary FIGS. 28 through 42. In one example, the BC Professional application is configured as a platform of applications including one or more of the BreachFeed, Build-a-Breach, breach search, consumer search and risk profile, and fraud analysis applications described herein, and provides an institution access to breach histories of the institution's consumer population resident in the BC data structures 22 and/or the Breach Intelligence Network of the BC system 100. The BC Professional application is configured for use by an institution 23, such as a financial institution, to assess risk to the institution 23 and to the institution's customer population resulting from breach events 70 which have impacted the institution's customer population, and, due to breach of the customers' personal information, also present a risk to the institution in the form of fraud on the institution, account takeover, etc. Referring to FIGS. 1 and 3, in a method 125 shown in FIG. 3, implementation of the BC Professional platform by an institution 23 can include, at 127, installation of one or more BC APIs 24 installed to the BC server 12 and installation of one or more institution APIs 43 installed to the institution server 50, where the APIs 24, 43 are configured to enable data exchange between the BC breach information data structures 22 and/or Breach Intelligence Network and an institution database 46 populated by customer information, including for example, customer personally identifiable information (PII), payment card industry (PCI) data, etc.

Figure 18:
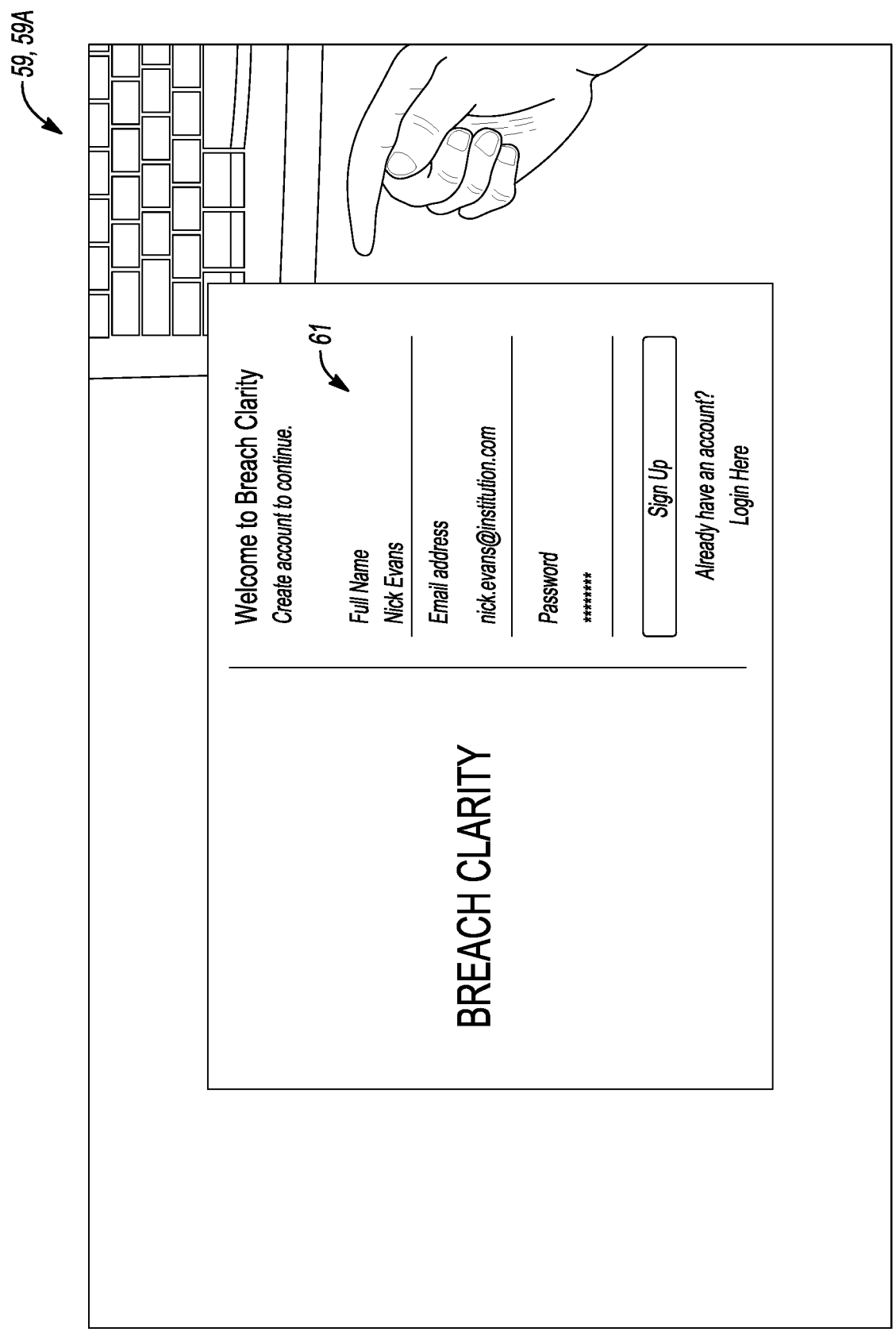
FIG. 18 is a schematic illustration of an exemplary BC Professional interface including a institution user sign-in field for use in securely accessing BC Professional.

The method 125 at 129 and referring to FIG. 18 includes an institution user entering sign-in credentials 61 to a BC Professional interface 59, 59A to authenticate an institution user 101 to the BC Professional platform. As shown in 42, the BC Professional platform can include an administrative interface 59H for use by the institution in managing access rights and account types 103 for the various institution users provided access to the BC Professional platform. For example, an institution user may be assigned an account type 103 of "user" which permits viewing and searching of the information available through the BC Professional platform however prohibits modification of the data. An account type 103 of "admin" may permit the admin user to modify and/or manipulate data within the BC Professional platform including, for example, modifying information within a customer's breach history profile and/or taking actions to modify customer controls, security levels, etc. based on the customer's risk profile, etc.

Figure 20:
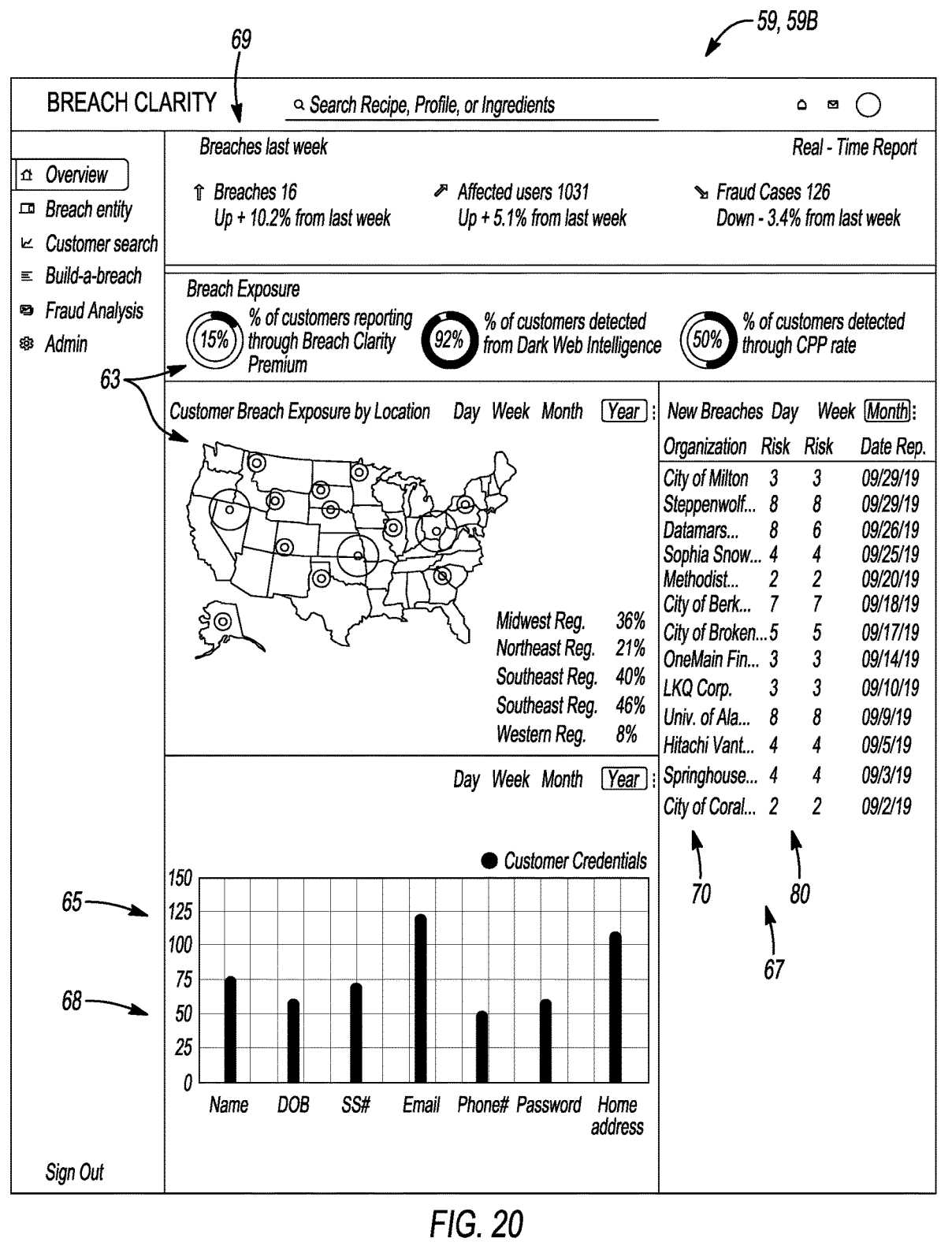
Figure 21:
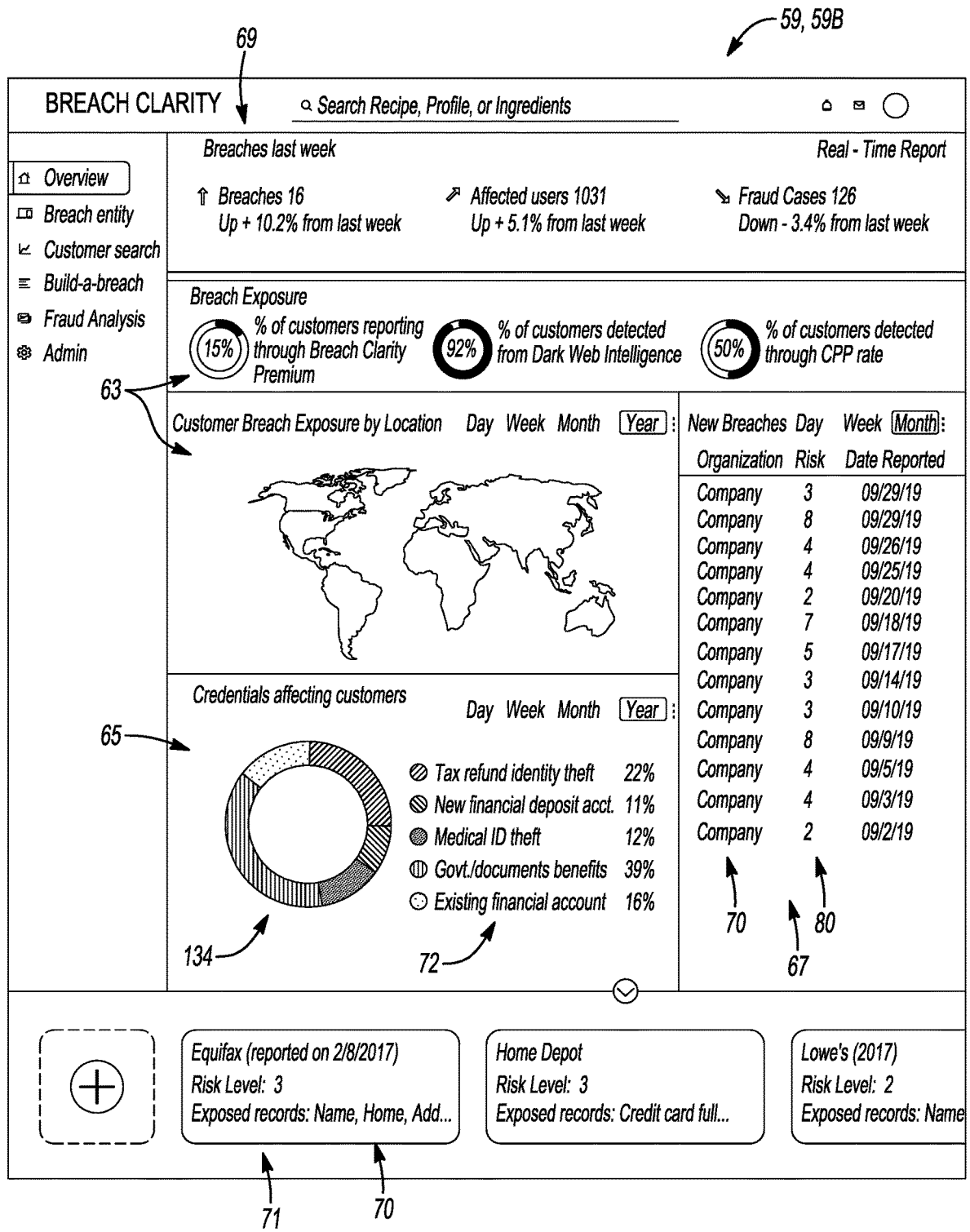
FIG. 21 is a schematic illustration of the BreachFeed display of FIG. 19, including interface elements for searching breach events.

After being authenticated to the BC Professional platform, the BC Professional platform, in the example illustrated in FIG. 19-21 and at 131 in the method 125 illustrated in FIG. 3, displays to the institution user an overview of breach activity which has occurred in a selected or specified reporting period, for example, in the week prior to the time the institution user accesses the system at 129. The overview and information displayed in the BC Professional interface 59B can be referred to herein as a BreachFeed, as it generates and displays a feed of breach data in real time to the institution user. The BreachFeed application can accumulate and consolidate breach information from one or more sources including the BC Breach Intelligence Network, breach reporting sources 36, 40, from the institution's customer information database 46, dark web reporting sources, etc. In the illustrative examples shown in FIGS. 19-21, information displayed in the BreachFeed interface 59B can include an activity summary 69 of breach activity which has been reported in the specified reporting period. The activity summary 69 can include absolute data, for example, the number of breach events reported, the number of affected users, etc., and/or can include relative data, for example, a percentage change in the level of activity in the current reporting period as compared with a prior reporting period. The BreachFeed interface 59B can further display breach exposure information 63 in relation to the institution's customer population, including, for example, the percentage of customers for which breach activity has been self-reported through BC Premium, the percentage of customers for which breach activity has been detected from dark web intelligence, etc. In an example shown in FIGS. 19 and 20, the breach exposure 63 of the institution's customer population can be displayed, as shown in FIG. 19, on a heat map or other color-based graphical display, or can be displayed, as shown in FIG. 20, using bullseye plotting to indicate areas of higher and lower exposure rates to data breaches. The BreachFeed interface 59B can display a credential exposure summary 65, which in the examples shown in FIGS. 19 and 21 can include a graphical risk distribution 134 of the harm descriptors 72 affecting the institution's customer population, which in the present example is shown as a segmented annular ring 134. The harm descriptors in the examples shown in FIGS. 19 and 21 are shown in relative incident ranking, for example, associated with the percentage of total harm descriptors affecting the institution's customer population. In another example shown in FIG. 20, the credential exposure summary 65 can be configured to show absolute incidents of credential breaches, which in FIG. 20 is displayed as a bar chart shown the incident rate at which each of the credentials shown along the horizontal axis have been breached within the specified reporting period, indicated in the present example as a one year reporting period. The BreachFeed interface 59B can include a breach listing 67 of breach events 70 newly reported within the specified reported period. In one example, a BC score 80 indicating an overall risk rating of each of the listed breach events 70 can be displayed in the breach listing 67. In one example, the BreachFeed interface 59B can include a thumbnail display 71 of selected data breach events 70, which may be selected for display by the institution user as breach events 70 the institution user is monitoring, which may be selected due to substantive changes in the risk assessment of the thumbnailed breach event 70 during the reporting period, and/or which may be selected using other criteria selected by the institution, for example, those breach events 70 which have impacted the largest numbers of the institution's customer population. In a non-limiting example, the BreachFeed interface 59B is displayed in real time, such that the displayed information is current at the time viewed by the institution user.

The method 125 at 133 can include the institution user conducting a breach search to generate an exemplary breach search report shown in a BC Professional interface 59C displayed in FIG. 22, where the breach search report interface 59C can include, for example, the overall risk rating, also referred to herein as the BC score 80, or the breach event being searched, a listing of the harms 72 which have been associated in the Breach Intelligence Network with the searched breach event, a listing of the mitigation actions 116 recommended for implementation to reduce risk of harm from the searched breached event 70, where in the illustrative example the mitigation actions 116 may be sorted between internal (institution-initiated) actions and external (customer-initiated) actions and/or rank ordered or otherwise weighted by effectiveness in one or both of these groupings. The breach search report 59C can include an institution harm assessment 73, which can display, for example, a list of potential sources of harm to the institution, which in the illustrative example shown in FIG. 22 is a banking institution, and a quantitative parameter of each potential harm to the institution, resultant from and/or attributable to the breach event impact on the institution's customer population. For example, the institution harm assessment 73 can include the number of institution customers affected by the searched breach event 70, the potential fraud losses to the institution estimated in dollars and in number of fraud claims against the institution, etc. The breach search report 59C can include an affected customer listing 75 of the institution's customers which had information compromised by the searched breach event 70. The affected customer listing 75 can report, for example, for each affected customer, the method by which the breach of the customer's information was identified, whether fraud in the use of that customer's breached data was detected, and/or the percentage of mitigation actions 116 which that customer has implemented. The method 125 at 133 can include the BC Professional breach search application outputting the exemplary BC Professional interface 59D shown in FIG. 23, which displays a summary 77 of breach searches conducted by the institution user during a specified time period, such a the user's current BC Professional session, or a history of recently viewed breach searches for the user's convenience in reviewing the search results.

Referring to FIG. 3 and FIGS. 24 and 25, the method 125 can include the institution user at 135 conducting one or more customer searches, for example, to evaluate and/or analyze the consumer risk profile 57 of the customer based on breach events 70 affecting the customer, the customer's implementation status of recommended mitigation actions 116, etc. As shown in FIG. 24, a BC Professional interface 59E for conducting a customer search can include a customer identifier field 81 for inputting an identifier 83 of a customer to be searched. In the illustrative example, the customer's name "Bob Jones" is inputted as the customer identifier however it would be understood that the customer identifier could be any type of personally identifying information associated in the institution's customer information database 46 with the customer to be searched, including for example, a government issued identification number, a customer account number, a customer telephone number, a customer email address, etc. The institution user can input the customer identifier 83 of the customer to be searched, or alternatively, the customer can be selected from a customer listing 79 which may be displayed in the customer search interface 59E. In an illustrative example, the results 85 of the customer search for customer "Bob Jones" is shown in FIG. 25 in a customer profile display interface 59E. In the example shown, the customer's identifying information, such as the customer's name, email address, phone number, and/or location is displayed, along with a listing of breach events 70 associated with the searched customer. For each of the breach events which has affected the searched customer, the reporting of the breach event, the reporting source, an indicator of whether fraud has been detected in the use of the breached customer detected, and a completion percentage of mitigation action steps can be included in the customer search results 85.

In a non-limiting example, the customer search report generated at 135 using the BC Professional customer search application illustrated in FIGS. 24 and 25 can be used in conjunction with the BreachedID application and method shown in FIG. 4. Referring to FIG. 4, shown is an exemplary method 145 for executing the BreachedID application of the BC system 100, including, for example, at 147, an account related request, e.g., a request for the institution to take an action on a customer's account, is inputted to the institution by a requestor. The requestor can be the customer, a person representing themselves as the customer or making the request on behalf of the customer, or a person or entity other than the customer. The method of input could include a request made via an email message, a telephone message, a text or SMS message, or other form of input. The action requested could include, by way of example, a request to open an account, to modify transaction limits and/or authentication requirements on an account, to close and/or distribute assets from an account, and/or other account requests which when made by an unauthorized requestor or with the use of compromised data can be referred to collectively herein as an account takeover request. At 149, the institution receives the account related request made at 147, and reviews at 151 the request for one or more identifying information elements provided by the requestor, which could include, for example, a customer email address, customer telephone number, government issued customer identification number, customer account number, customer payment card number or other customer and/or account identifying information element provided by the requestor. At 153, the identifying information element(s) identified from the account related request at 151 is/are submitted by the institution to the BreachedID application for analysis to evaluate the risk potential of the account related request being a fraudulent request, e.g., an account takeover request or new account application. At 155, the BreachedID application, using one or more of BC algorithms 10, breach information data from the BC data structures 22 and/or the BC Breach Intelligence Network, customer information data from the institution customer information database 46, provided for example, via APIs 24, 43, generates a risk evaluation assessment which is outputted to the institution. At 157, the institution reviews the risk evaluation assessment outputted from the BreachedID application, and determines a response to the account related request. At 159, the institution actions the response to the account related request.

In one example, at 155, the BreachedID application generates a risk evaluation assessment which indicates the risk that the account related request is fraudulent and/or an account takeover request is low or minimal, based for example, on a determination that the identifying information element provided by the requestor has not been shown as compromised by any of the breach events associated with the customer/account owner in the Breach Intelligence Network, such that at 157, the institution upon receipt of the BreachedID risk assessment determines the request is likely a bona fide request and at 159 actions the request on the customer's account.

In another example, at 155, the BreachedID application generates a risk evaluation assessment which indicates the risk that the account related request is fraudulent and/or an account takeover request is high, based for example, on a determination that the identifying information element provided by the requestor has been shown as compromised by one or more breach events associated with the customer/account owner in the Breach Intelligence Network, and has been utilized in performing one or more fraudulent actions causing harm to the customer, such that at 157, the institution upon receipt of the BreachedID risk assessment determines the request is likely a fraudulent or account takeover request and at 159 refuses the request. In this case, at 159 the institution may additional initiate investigative actions to determine the source of the fraudulent request and/or refer the fraudulent request to the appropriate investigation and/or enforcement authorities.

In another example, at 155, the BreachedID application generates a risk evaluation assessment which indicates the risk that the account related request is fraudulent and/or an account takeover request is moderate, based for example, on a determination that the identifying information element provided by the requestor has been shown as compromised by at least one breach event associated with the customer/account owner in the Breach Intelligence Network, however has not been associated with the performance of a fraudulent actions causing harm to the customer, such that at 157, the institution upon receipt of the BreachedID moderate risk assessment determines the request may be a bona fide request and at 159 initiates additional actions to authenticate the request as a bona fide account related request. The additional actions initiated by the institution at 159 could include, for example, contacting the account owner directly to request confirmation of the request, requiring additional authenticating information from the requestor, etc. The BreachedID application, when utilized by the institution via the BC Professional platform, advantageously provides data-enabled scrutiny of an account related request, prior to implementation of the request, to prevent and/or reduce the occurrence of account takeover of or other fraud on a customer's account.

Figure 5:
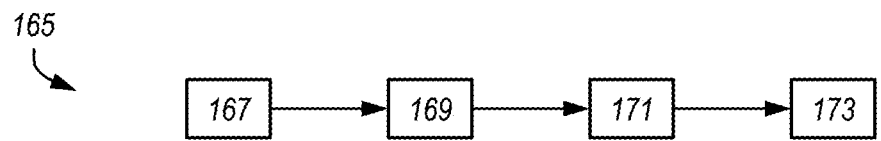
FIG. 5 is a schematic illustration of a flowchart of an exemplary process for constructing and analyzing a breach event using a Build-a-Breach application of the BC system.

Referring to again to FIG. 3 and to FIGS. 26-30, the method 125 can further include the institution user at 137 using a Build-a-Breach application illustrated in the example method 165 shown in FIG. 5 and in a non-limiting example shown in FIGS. 26-30, to construct a breach event 70 which can be populated with one or more affected customers and saved, for example, to the Breach Intelligence Network, to capture and report an identified breach activity affecting one or more customers of the institution. Referring method 165 and to the example Build-a-Breach interface 59F shown in FIG. 26, the Build-a-Breach process begins at 167 with the institution user activating the "Create New" interface element, selecting a breach type 47 associated with the breach event being built. For example, the breach event being built by the institution user could be a banking breach resultant from unintentional unauthorized release of customer information to a third party by the institution. In a next step 169 illustrated by the Build-a-Breach interfaces 59F shown in FIGS. 27-29, the institution user selects from a listing of information elements 68 those information elements which were compromised in the breach event being built, and populates a selected information elements field 91 with the compromised information elements. The institution user at 171 then activates the "Calculate Breach" interface element, to actuate the Build-a-Breach application to generate breach information for the built breach event 93, including, for example, a BC score 80 for the built breach event 93, a listing of top ranked risks 72 associated with the built breach event 93, and a list of top ranked mitigation actions 116 recommended for implementation to mitigate the risks 72. At 173, the institution user inputs a breach identifier 70, e.g., a breach name, for the built breach event 93 and uses interface elements 49 and 51 respectively, to associate affected customers of the institution with the built breach event 93, and to save the build breach event 93 to at least one of the institution customer data base 46 and the data structure 22 of the BC system 100.

In one example, the "Institution Built" breach event 70 built by the institution using the Build-a-Breach application of the BC Professional platform can be stored at step 173 to the Breach Intelligence Network and/or the data structure 22 of the BC system 100, such that other institutions accessing the Breach Intelligence Network via the BC Professional platform can access the "Institution Built" breach event. Likewise, breach events build by other institutions using the Build-a-Breach application can save those breach events to the Breach Intelligence Network such that all institutions accessing the BC Breach Intelligence Network via the BC Professional platform can utilize the build breach events in assessing, managing and mitigating risks and harms to their respective customer populations. In one example, the BC Professional platform and/or the BC Breach Intelligence Network can include a reporting capability whereby an alert can be generated and sent to each institution having access to the Breach Intelligence Network via BC Professional, to notify them when a breach event generated using the Build-a-Breach application has been reported to the Breach Intelligence Network.

In another example, still referring to FIG. 5 and FIGS. 25-30, the Build-a-Breach application can be used to build a breach event using breach event data determined by and/or provided to the institution, where the breach event built by the institution can be entered into, for example, the BC Breach Intelligence Network. In another example, the Build-a-Breach application can be used to model a simulated breach event, for example, to determine the risk potential associated with the simulated breach and use the risk and harm analysis and mitigations actions identified for the simulated breach to identify and implement preventive measures within the institution or for the benefit of the institution's customer base, to proactively prevent a breach event and/or implement mitigation actions in advance of a potential breach event.

Figure 31:
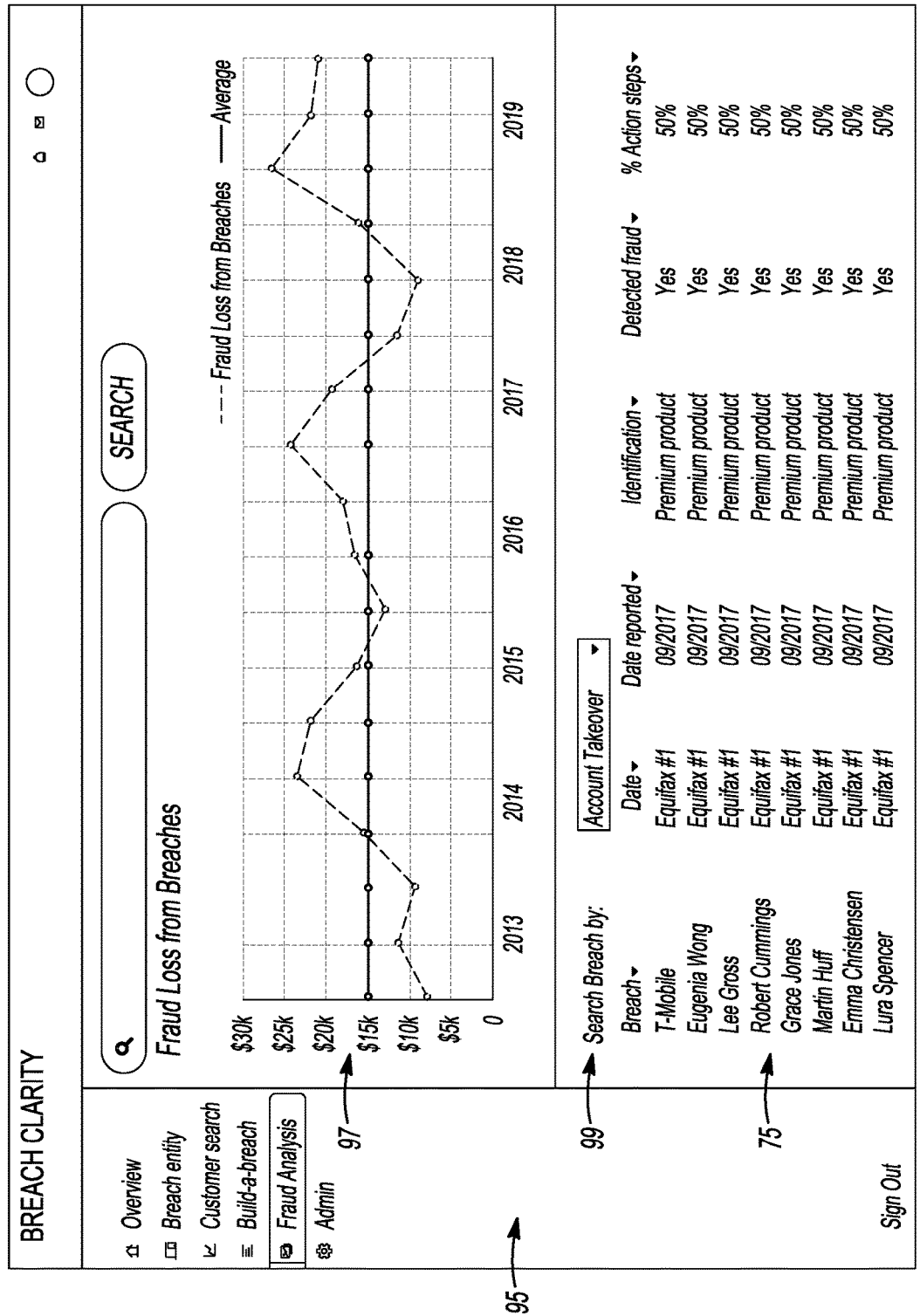
FIG. 31 is a schematic illustration of a fraud analysis generated by BC Professional including potential breach loss parameters generated for aggregate breaches affecting the institution customer population.

Referring again to FIG. 3 and FIG. 31, the method 125 can include the BC Professional platform at 139 outputting results of an institution related fraud analysis generated by a BC Professional fraud analysis application utilizing, for example, data available from the Breach Intelligence Network, data obtained from the institution's customer information database 46, for example, via an API 43, and/or data obtained from other data breach information reporting sources 36, 40. In an illustrative example, a fraud analysis reporting interface 59G is shown in FIG. 31 and includes a fraud analysis summary 95. In the example shown, the fraud analysis summary 95 includes a fraud loss parameter 97 which reports fraud losses in dollars incurred by the institution as a result of data breach events affecting the institution's customer population. The fraud loss parameter 97 is shown as a absolute value and average over time. The fraud analysis summary 95 further displays a loss parameter 99 which includes a listing of the institution's customer harmed by a particular risk, in the present example, an account takeover action perpetrated on the customer's account held by the institution. The fraud analysis summary 95 shown in FIG. 31 is illustrative, for example, the institution user can be provided with options in the fraud analysis application to select from one or a grouping of breach events, one or a grouping of harms, one or a grouping of information elements, for analysis by the fraud analysis application to evaluate the impact of certain selected breach events, harms, information elements, or combinations thereof on fraud incurred by the institution.

FIG. 6 is a schematic illustration of a flowchart of an exemplary process 175 for integrated risk assessment and mitigation of data breach events using the BC system 100 of FIG. 1. The process 175 includes at 177, receiving breach event information into the data structure 22 and/or the Breach Intelligence Network from multiple breach information sources, including, for example, from one or more reporting servers 40, resource servers 50, subscriber institutions, consumers, dark web providers 202, email servers 87 and/or payment service providers 78.

At 179, the incoming breach information is normalized for storage in the data structure 22, including, for example, inputting to the data structure 22 a breach identifier (breach name) 70 for the breach event defined by the incoming breach information, inputting to the data structure 22 one or more information elements which have been breached and associating these in the data structure 22 with the breach identifier 70, and inputting to the data structure 22 and associating with the breach identifier 70 in the data structure 22 additional elements of the incoming breach information including, for example, dates of occurrence, consumer identifying information associated with the breached information, the breach type, method of compromise, harms associated with the breach event including, for example, incidents of unauthorized use, distribution and/or sale of the breached information, etc.

At 181, for the breach event 70, the BC server 12 applies one or more algorithms 10 to associate particular risks and harms 72 with each of the breached information elements 68, and stores each information element-harm pair in the data structure 22, associating the pair with the breach event 70. The BC further applies one or more algorithms 10 to compute an element risk 74 for each information element-harm pair and stores the element risk 74 in the data structure 22, as illustrated in the non-limiting example shown in FIG. 36.

At 183, the BC server 12 applies one or more algorithms 10 to the accumulated element risks 74 identified for each information element-harm pair to generate, for each type of harm 72, a harm risk 76, and to generate, for the breach event 70, using the accumulated harm risks 76 for all harm types associated with the particular breach event 70, an overall BC score 80, where the BC score 80 is normalized to provide a relative indicator of the consumer risk associated with the breach event 70.

At 185, the BC server 12 uses the harm risks 76 to rank order the harms 72 associated with the breach event 70, and identifies mitigation actions 116 for the identified harms 72.

At 187, the BC server 12 applies one or more algorithms 10 to the identified mitigation actions 116 and harms 72 associated with the breach event 70, and using other breach information, rank orders the mitigation actions 116 to identify those mitigation actions 116 likely to prevent the greatest harm, for notification to consumers affected by the breach event 70.

Figure 35:
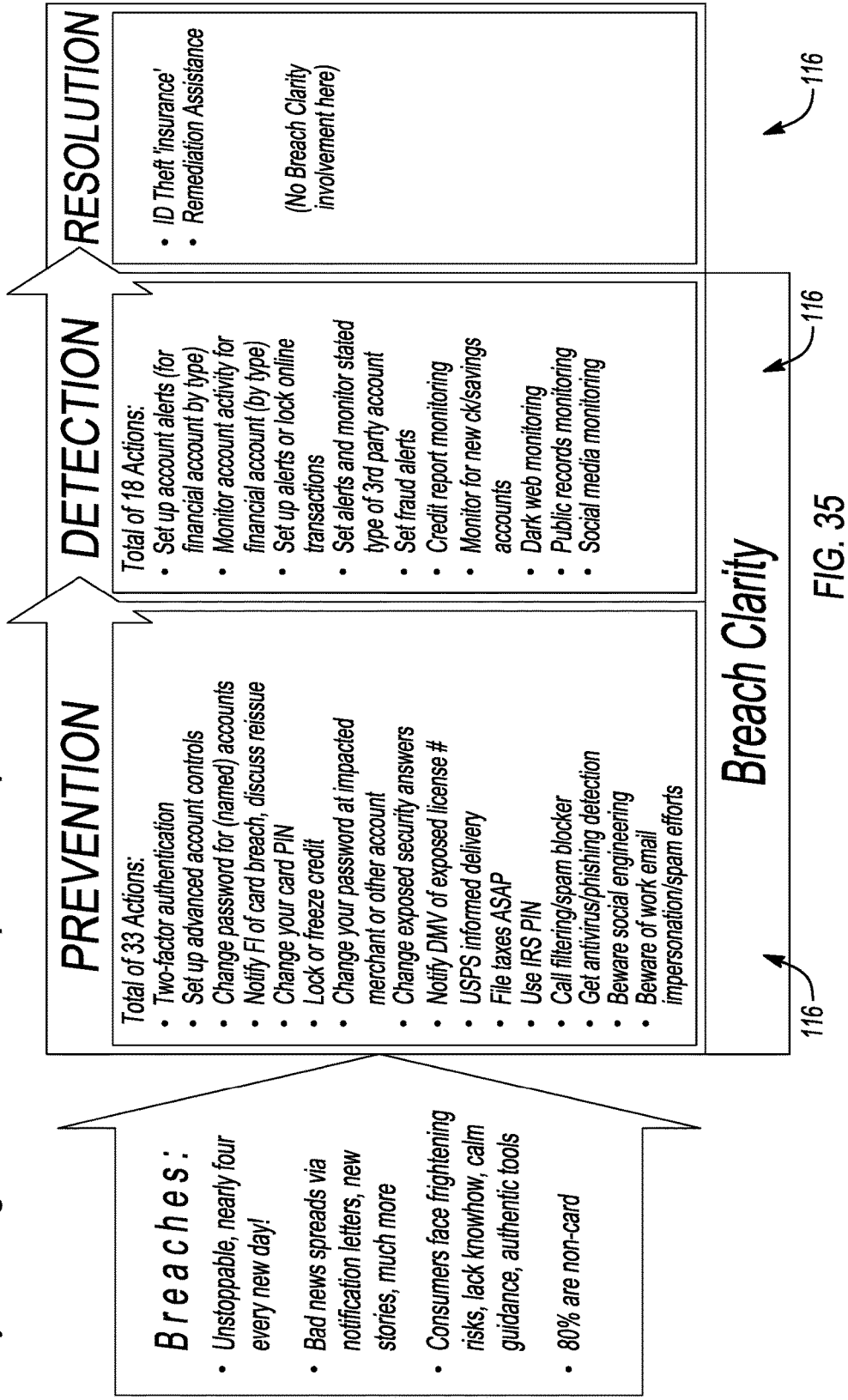
FIG. 35 is a schematic illustration of a non-limiting summary of mitigating actions for prevention and detection of data breach harms.

At 189, the BC server 12 associates the breach event 70 in the data structure 22 with consumer breach profiles 57 (My Breach Clarity History profiles) of those consumers determined by the BC server 12 to be affected by the breach event 70. In one example, an identity roadmap 218 for the consumer is generated and/or updated to include the prioritized mitigation actions 116 for the subject breach event 70. Example mitigation actions 116, including prevention and detection actions 116 which may be implemented through the BC System 100 described herein, are shown in FIG. 35. The listing shown is illustrative and non-limiting, such that additional mitigation actions 116 are anticipated within the scope of the disclosure.

The method 175 further includes, at 191, notifying each consumer user affected by the breach event 70 of the breach event via, for example, a BC Premium interface 90 or a sponsoring institution interface 25, where the consumer user can be a customer of the sponsoring institution 50.

At 193, and referring to the examples shown in FIGS. 15, 33 and 34, an identity roadmap 218 can be generated by the BC system 100 for the consumer subscriber, including a listing of the priority ordered mitigation actions 116 for execution by the consumer subscriber. In the illustrative examples shown, at least some of the mitigation elements 31 can be activated, e.g., completed, by actuation of a interface element 31 associated in the display interface 90 with the mitigation action 116, as previously described herein.

The method 175 further includes, at 195, notifying each consumer subscriber of the mitigation actions 116 pending for completion in the consumer's identity roadmap 218, by an electronic message transmitted to the consumer, for example, as an email message, SMS, text message, or notification displayed in at least one of the BC interface 90 and/or the institution interface 25.

At 197, in response to completion of a mediation action 116 by the consumer, the BC system 100 updates the consumer's identity roadmap 218 including the listing of mediation actions 116, to either indicate completion of the mediation action 116 or to remove the mediation action 116 from the listing 218 of mediation actions 116.

At 199, the process returns to step 177, either in response to receipt of additional breach information, on a continuing basis, and/or at a predetermined interval, for example, hourly, daily, weekly, etc.

Figure 37:
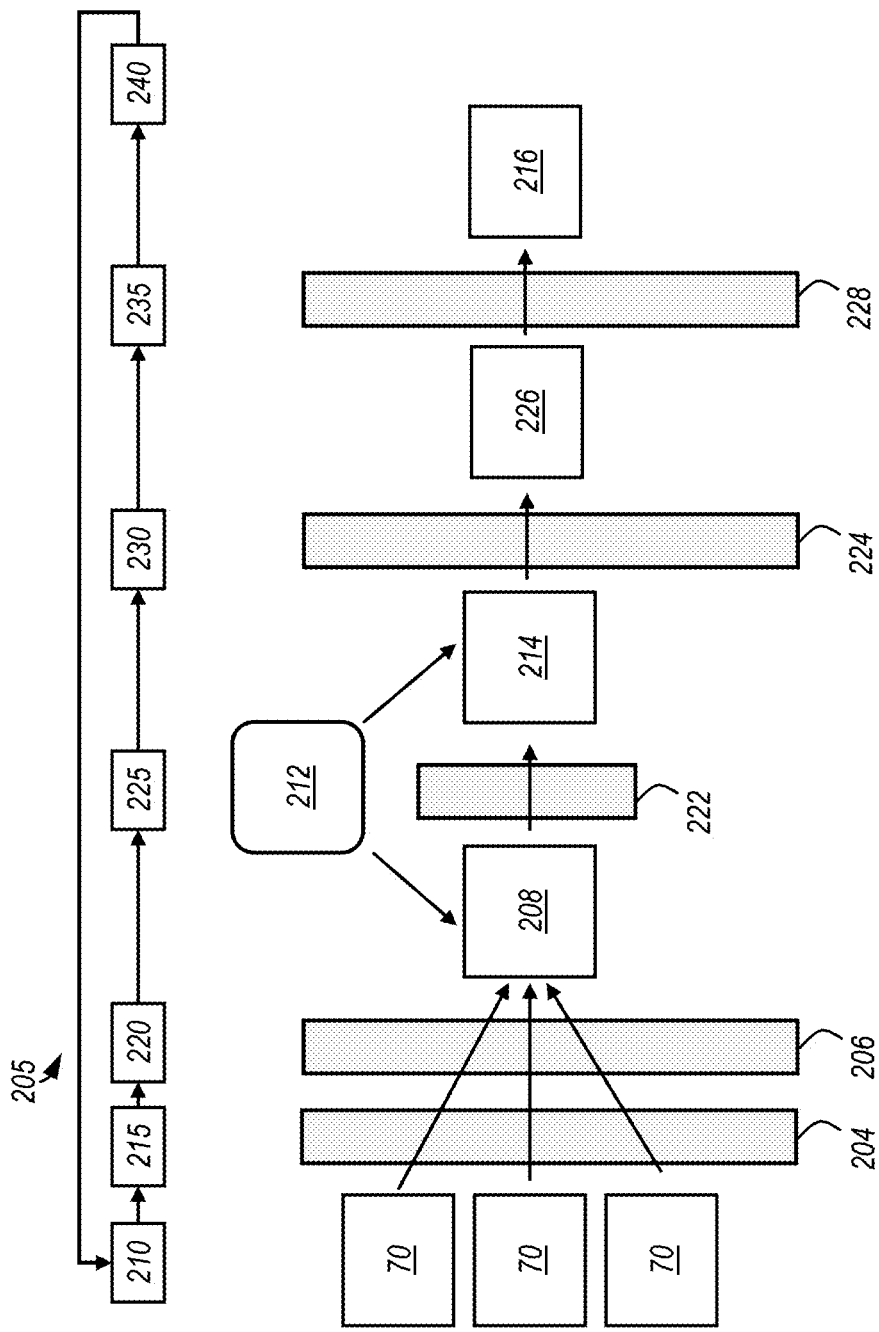
FIG. 37 is a schematic illustration of a flowchart of an exemplary process for generating an aggregated consumer identity risk score for a consumer user of the BC system, also referred to herein as a Consumer Identity Score.

Referring now to FIG. 37, shown is a schematic illustration of a flowchart 205 of an exemplary process 205 for generating an aggregated consumer identity risk score 216 for a consumer user of the BC system 100, where the aggregated consumer identity risk score, also referred to herein as a Consumer Identity Score 216 is determined individually for each consumer, based on the consumer's breach history profile 57, the completion status of mitigation actions 116 recommended to the consumer based on the consumer's breach history profile 57 modified by the application of one or more algorithms 204, 206, 222, 224, 228 as described herein. By generating and providing the consumer with an individualized Consumer Identity Score 216, the consumer can monitor, over time, a quantified indicator of the consumer's identity risk, and can also observe the effect of mitigation actions 116 completed by the consumer on the consumer's identity risk, reflected, for example, as a reduction (improvement) in their Consumer Identity Score 216 as mitigation actions 116 are completed, when all other factors are constant. The consumer can also quickly assess the impact of new breach events 70 affecting the consumer, by viewing the relative change in the their Consumer Identity Score 216. As such, the Consumer Identity Score 216 provides an advantage to the consumer by consolidating a significant amount of breach information into a single indicator of identity risk which the consumer can monitor as a measure of identity risk over time and in response to new breach events, and which the consumer can directly influence, e.g., improve, by completing mitigation actions 116 recommended to the consumer via the consumer's My Breach Clarity History profile 57 and/or included in the consumer's identity roadmap 218.

Referring to FIG. 37, shown is an illustrative example of a method 205 for generating a Consumer Identity Score 216 for an individual consumer. At 210, breach information from the breach event 70 associated with the consumer breach history profile 57 in the data structure 22 are compiled. At 215, a deprecating algorithm 204 is applied to the breach information to remove and/or modify elements of the breach information which should be devalued for the purposes of generating the Consumer Identity Score 216. For example, a consumer account number which has been breached, and is associated with an account which is closed or has had the account number changed, may be deprecated and/or removed from the breach information as the risk of harm is from the breach of the consumer account number has been fully mitigated and/or is estimated to be null. Likewise, aging factors may be applied for certain types of harms which are less likely to occur as time elapses after the breach event occurs. Other forms of information elements which are of limited longevity, for example, term limited or expiring payment cards, may be deprecated at step 215.

At 220, the deprecated breach information provided from 215 is combined with and/or modified by breach intelligence information 206, which can include, for example, information related to the type of breach, the age of the breach, criminal activity associated with a breach event and/or consumer's breached information elements, including, for example, the recent appearance of the consumer's breached credentials on a dark website, reported fraud on the consumer's accounts, etc., to supplement and/or modify the consumer's breach information forward to step 225.

At step 225, an algorithm 222 is applied to the breach information received from step 220 to manipulate the breach information using factors derived substantially in part from the consumer's breach history profile 57, including, in a non-limiting illustrative example, manipulating an information element risk vector 208 derived from the consumer's aggregated breached information elements 68, and a harm risk vector 214 derived from the aggregated harms 72 associated with the aggregated breached information elements 68, each of these vectors 208, 214, in a non-limiting example, modified by and/or including a frequency of breach of each information element 68 and/or a frequency of harm exposure to each harm 72, and/or further modified for cumulative effect of combinations of breached information elements 68 and or harms 72, where the vectors 208, 214 are further manipulated by application of mitigation action data 212, where the mitigation action data 212 is derived from the completion status of mitigation actions 116 recommended to the consumer, the relative ranking of the completed and uncompleted mitigation actions 116 in impact on risk reduction, and the cumulative effects (interactions) of combinations of mitigation actions 116 to affect the risk exposure from one or more of the harms 72 associated with the consumer's breach history profile 57.

At 230, a scoring logic algorithm is applied to the output received from step 225, to generate a raw risk score 226. At 235, a normalizing algorithm 228 is applied to the raw risk score 226, to normalize the raw risk score 226 to a index or scale, for example, to normalize the raw risk score 226 to saturate to a scale of 100, to output a normalized risk score 216. The normalized risk score 216 is also referred to herein as the Consumer Identity Score 216. At step 240, the Consumer Identity Score 216 can be reported to the consumer, for example, via an electronic message or via one or more consumer BC interfaces 90, 25.

The process 205 returns to step 210, where the Consumer Identity Score 216 is regenerated, for example, when a change in the consumer's breach history profile is detected, when the consumer completes a mitigation action 116, at the consumer's request, or on a predetermined frequency, for example, daily, weekly, or monthly. In one example, the consumer's Consumer Identity Score 216 can be displayed over time via the consumer BC 90, 25 to provide a visual indicator of the trend (improving, deteriorating, constant) in the Consumer Identity Score 216, as a visual reminder to the consumer to complete mitigation actions 116, and/or to visually alert the consumer to changes in their identity risk exposure.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A method of generating a consumer breach history profile of a consumer over an electronic network via a computer server, comprising:
   receiving, via a network, consumer profile information corresponding to a consumer;
   generating, in a first database and using the consumer profile information, the consumer breach history profile;
   associating, in the first database, the consumer breach history profile with the consumer profile information;
   accessing, via a network, an electronic transaction account associated with the consumer;
   wherein the electronic transaction account is configured to execute a consumer transaction between the consumer and a party to the consumer transaction;
   generating, via the electronic transaction account, electronic transaction information associated with the consumer transaction;
   retrieving, via the network, the electronic transaction information;
   wherein the electronic transaction information includes:
      a consumer identifier corresponding to the consumer;
      a party identifier corresponding to the party; and
      a transaction time corresponding to the time the consumer transaction was executed;
      associating, in a second database, the electronic transaction information with the consumer;
   wherein the second database includes breach information corresponding to a plurality of data breaches;
   comparing the electronic transaction information with the breach information of the plurality of data breaches;
   wherein comparing the electronic transaction information includes:

determining a match between the electronic transaction information and the breach information of a respective data breach;

appending the consumer breach history profile with each match; and wherein appending the consumer breach history profile includes:
  associating, in the second database, the respective data breach with the consumer breach history profile;
  identifying the data breach for each match within a breach listing, the breach listing being accessible for display to the consumer through an interface; and
  displaying an accumulated harm risk score with the breach listing, the accumulated harm risk score providing a relative indicator of risk accumulated for the consumer as result of the data breaches; and
generating a breach notification to apprise the consumer of the appending to the consumer breach history profile.

2. The method of claim 1, wherein the transaction time includes the date on which the consumer transaction occurred.

3. The method of claim 1, wherein the consumer profile information includes account credentials corresponding to the electronic transaction account;
the method further comprising:
  accessing the electronic transaction account using the account credentials.

4. The method of claim 1, wherein accessing the electronic transaction account includes:
  receiving, via the network, an account plug-in for accessing the electronic transaction account;
  executing the account plug-in to transmit the transaction account information via the network; and
  retrieving, via the account plug-in, the electronic transaction information from the account.

5. The method of claim 1, wherein:
  the electronic transaction account is an email account;
  the consumer transaction is an email transaction between an email sender and an email recipient; and
  the party to the consumer transaction is one of the email sender and the email recipient.

6. The method of claim 5, wherein comparing the electronic transaction information with the breach information includes:
  determining a match between the breach information of the respective data breach and at least one of the email sender or the email recipient.

7. The method of claim 5, wherein the consumer identifier is an email address associated with the consumer.

8. The method of claim 1, wherein:
  the electronic transaction account is an electronic payment account;
  the consumer transaction is an electronic payment transaction between a payor and a payee; and
  the party to the consumer transaction is one of the payor and the payee.

9. The method of claim 8, wherein comparing the electronic transaction information with the breach information includes:
  determining a match between the breach information of the respective data breach and at least one of the payor and the payee.

10. The method of claim 8, wherein the consumer identifier is a payment account number associated with the consumer.

11. The method of claim 10, wherein the payment account number is a payment card number.

12. A method of generating a consumer breach history profile of a consumer over an electronic network via a computer server, comprising:
  receiving, via a network, consumer profile information including at least one consumer information element corresponding to the consumer;
  generating, in a database and using the consumer profile information, a consumer breach history profile;
  associating, in the database, the consumer breach history profile with the consumer profile information;
  wherein the database includes a plurality of breach events, each breach event associated with at least one breached information element;
  matching the consumer profile information to a respective breach event of the plurality of breach events;
  wherein matching the consumer profile information to the respective breach event includes:
    determining a plurality of matches between the at least one consumer information element and the at least one breached information element associated with the respective breach event;
  associating, in the database, the consumer breach history profile with the respective breach events;
  selecting, via the server, at least one mitigation actions defined by the at least one breached information element;
  associating, in the database, the at least one mitigation action with the consumer breach history profile;
  generating a notification to the consumer, wherein the notification includes the at least one mitigation action; and
  displaying, via a user device, a breach system interface, including displaying with the breach system interface an accumulated harm risk score and a plurality of data breach scores, the accumulated harm risk score providing the consumer a relative indicator of overall risk accumulated as result of a total harm of the breach events, each data breach score being associated with one of the matches and providing the consumer a relative indicator of risk for the corresponding breach event.

13. The method of claim 12, further comprising:
  displaying, via the breach system interface, the at least one mitigation action; and
  associating, in the breach system interface, the at least one mitigation action with an interface element, wherein the interface element is actuable to complete the at least one mitigation action.

14. The method of claim 13, further comprising:
  displaying, in the breach system interface, a visual indicator configured to indicate whether the at least one mitigation action is completed or incomplete; and
  removing the at least one mitigation action from the breach system interface when the mitigation action is completed.

15. The method of claim 12, further comprising:
  indicating, in the breach system interface, a completion status of the mitigating action;
  indicating, in the breach system interface, a consumer identity score, the consumer identity score defined by a combination of the at least one breached information element and the one or more mitigation actions associated with the consumer breach history profile; and indicating, in the breach system interface, a plurality of harms, the harms each describing potential harm for the consumer from the breach event of a corresponding one of the matches.

16. A method of generating a consumer breach history profile of a consumer over an electronic network via a computer server, comprising:

receiving, via a network, consumer profile information corresponding to a consumer;

generating, in a database and using the consumer profile information, a consumer breach history profile;

associating, in the database, the consumer breach history profile with the consumer profile information;

retrieving, via the network, breach event information from a breach information source;

comparing the breach event information with the consumer profile information;

wherein comparing the breach event information includes:

determining a plurality of breach events associated with a plurality of matches between the breach event information and the consumer profile information;

appending the consumer breach history profile when each match is determined; and wherein appending the consumer breach history profile includes:

associating, in the database, the breach event information with the consumer breach history profile; and identifying the breach event information for each match within a breach listing, the breach listing presenting each of the breach events and being accessible for display to the consumer through an interface; and generating a breach notification to apprise the consumer of the appending to the consumer breach history profile.

17. The method of claim 16, wherein the breach information source is the consumer.

18. The method of claim 16, wherein the breach information source is a dark web service provider, the method further comprising:

identifying, via the dark web service provider, dark web content including a breached information element;

retrieving, via the network, the dark web content; and excerpting from the dark web content, the breached information element.

19. The method of claim 16, further comprising:

displaying an accumulated harm risk score within the breach listing, the accumulated harm risk score providing the consumer a relative indicator of overall risk accumulated as result of the breach events.

20. The method of claim 19, further comprising:

displaying a plurality of data breach scores within the breach listing, each of the data breach scores providing the consumer a relative indicator of risk for a corresponding one of the breach events.

* * * * *